(12) United States Patent
Soci et al.

(10) Patent No.: US 10,151,858 B2
(45) Date of Patent: Dec. 11, 2018

(54) DEVICE INCLUDING HALIDE PEROVSKITE STRUCTURE, METHODS OF FORMING AND OPERATING THE SAME

(71) Applicant: NANYANG TECHNOLOGICAL UNIVERSITY, Singapore (SG)

(72) Inventors: Cesare Soci, Singapore (SG); Behrad Gholipour, Singapore (SG); Giorgio Adamo, Singapore (SG); Daniele Cortecchia, Singapore (SG)

(73) Assignee: NANYANG TECHNOLOGICAL UNIVERSITY, Bugis (SG)

( * ) Notice: Subject to any disclaimer, the term of this patent is extended or adjusted under 35 U.S.C. 154(b) by 0 days.

(21) Appl. No.: 15/471,694

(22) Filed: Mar. 28, 2017

(65) Prior Publication Data
US 2017/0276836 A1   Sep. 28, 2017

(30) Foreign Application Priority Data

Mar. 28, 2016 (SG) .......................... 10201602400W

(51) Int. Cl.
| | |
|---|---|
| G02B 1/00 | (2006.01) |
| G02B 5/00 | (2006.01) |
| C09K 11/06 | (2006.01) |
| C09K 11/66 | (2006.01) |

(52) U.S. Cl.
CPC .............. *G02B 1/002* (2013.01); *C09K 11/06* (2013.01); *C09K 11/664* (2013.01); *G02B 5/008* (2013.01)

(58) Field of Classification Search
CPC ... G02F 1/0126; G02F 2203/10; B82Y 20/00; G02B 26/02; G02B 5/23

USPC .......................................................... 359/244
See application file for complete search history.

(56) References Cited

U.S. PATENT DOCUMENTS

| | | | | |
|---|---|---|---|---|
| 2017/0346024 A1* | 11/2017 | Lee | .................... | H01L 51/0077 |
| 2017/0358757 A1* | 12/2017 | Lee | .................... | C01G 21/16 |
| 2017/0358759 A1* | 12/2017 | Lee | .................... | H01L 51/0077 |

OTHER PUBLICATIONS

Zheludev et al., "From Metamaterials to Metadevices", Nature Materials, vol. 11, Nov. 2012, pp. 917-924. (8 pages total).
Smith et al., "Metamaterials and Negative Refractive Index", Science, vol. 305, Aug. 6, 2004, pp. 788-792. (5 pages total).
Gholipour et al., "An All-Optical, Non-volatile, Bidirectional, Phase-Change Meta-Switch", Advanced Materials, 2013, pp. 1-5. (5 pages total).
Chen et al., "Active Terahertz Metamaterial Devices", Nature, vol. 444, Nov. 30, 2006, pp. 597- 600. (5 pages total).

(Continued)

*Primary Examiner* — Mohammed Hasan
(74) *Attorney, Agent, or Firm* — Sughrue Mion, PLLC

(57) ABSTRACT

Various embodiments may provide a device for providing a first optical light of a first wavelength and a second optical light of a second wavelength. The device may include a halide perovskite structure including a first pattern and a second pattern different from the first pattern, so that the first pattern is configured to provide the first optical light of the first wavelength and the second pattern is configured to provide the second optical light of a second wavelength different from the first wavelength, upon a light incident on the first pattern and the second pattern. The halide perovskite structure may include a halide perovskite material.

27 Claims, 66 Drawing Sheets
(59 of 66 Drawing Sheet(s) Filed in Color)

(56) References Cited

OTHER PUBLICATIONS

Yang et al., "All-Dielectric Metasurface Analogue of Electromagnetically Induced Transparency", Nature Communications, vol. 5, No. 5753, Dec. 16, 2014, pp. 1-7. (7 pages total).
Boltasseva et al., "Low-Loss Plasmonic Metamaterials", Science, vol. 331, Jan. 21, 2011, pp. 290-291. (4 pages total).
Vasudev et al. "Nanophotonic Light Trapping with Patterned Transparent Conductive Oxides", Optics Express, vol. 20, No. S3, May 7, 2012. (10 pages total).
Shi et al., "A New Dielectric Metamaterial Building Block with a Strong Magnetic Response in the Sub-1.5-Micrometer Region: Silicon Colloid Nanocavities" Advanced Materials, vol. 24, 2012, pp. 5934-5938. (5 pages total).
Zhao et al., "Mie Resonance-Based Dielectric Metamaterials", Materials Today, vol. 12, No. 12, Dec. 2009, pp. 60-69. (10 pages total).
Zhang et al., "Near-Infrared Trapped Mode Magnetic Resonance in an All-Dielectric Metamaterial", Optics Express, vol. 21, No. 22, Nov. 4, 2013. (8 pages total).
Wu et al., "Spectrally Selective Chiral Silicon Metasurfaces Based on Infrared Fano Resonances", Nature Communications, vol. 5, No. 3892, May 27, 2014, pp. 1-9 (9 pages total).
Moitra et al., "Experimental Demonstration of a Broadband All-Dielectric Metamaterial Perfect Reflector", Applied Physics Letters, vol. 104, No. 171102, 2014, pp. 1-5. (6 pages total).
Moitra et al., "Realization of an All-Dielectric Zero-Index Optical Metamaterial", Nature Photonics, vol. 7, 2013, pp. 1-15. (15 pages total).
Lin et al., "Dielectric Gradient Metasurface Optical Elements", Science, vol. 345, No. 6194, Jul. 18, 2014, pp. 298-302 (6 pages total).
Wehrenfennig et al., "High Charge Carrier Mobilities and Lifetimes in Organolead Trihalide Perovskites", Advanced Materials, vol. 26, 2014, pp. 1584-1589. (6 pages total).
Green et al., "The Emergence of Peroskite Solar Cells", Nature Photonics, vol. 8, Jul. 2014, pp. 506-514. (9 pages total).
Lee et al., "Efficient Hybrid Solar Cells Based on Meso-Superstructured Organometal Halide Perovskites", Science Express, vol. 338, Oct. 4, 2012, pp. 643-647. (6 pages total).
Salim et al., "Perovskite-Based Solar Cells: Impact of Morphology and Device Architecture on Device Performance", Journal of Materials Chemistry A, 2015, pp. 8943-8969. (27 pages total).
Luo et al., "Water Photolysis at 12.3% Efficiency via Perovskite Photovoltaics and Earth-Abundant Catalysts", Science, vol. 345, No. 6204, Sep. 26, 2014, pp. 1593-1596. (5 pages total).
Chin et al., "Lead Iodide Perovskite Light-Emitting Field-Effect Transistor", Nature Communications, vol. 6, No. 7383, Jun. 25, 2015, pp. 1-9. (9 pages total).
Tan et al., "Bright Light-Emitting Diodes Based on Organometal Halide Perovskite", Nature Nanotech, vol. 9, 2014, pp. 687-692. (12 pages total).
Xing et al., "Low-Temperature Solution-Processed Wavelength-Tunable Perovskites for Lasing", Nature Materials, vol. 13, 2014, pp. 476-480. (19 pages total).
West et al., "All-Dielectric Subwavelength Metasurface Focusing Lens", Optics Express, vol. 22, No. 21, Oct. 20, 2014. (10 pages total).
Ginn et al., "Realizing Optical Magnetism from Dielectric Metamaterials", Physical Review Letters, vol. 108, 2012, pp. 1-5. (5 pages total).
Cao et al., "Engineering Light Absorption in Semiconductor Nanowire Devices", Nature Materials, vol. 8, Aug. 2009, pp. 643-647. (5 pages total).
Cao et al., "Semiconductor Nanowire Optical Antenna Solar Absorbers", Nano Letters, vol. 10, 2010, pp. 439-445. (7 pages total).
Kransnok et al., "All-Dielectric Optical Nanoantennas", Optics Express, vol. 20, No. 18, Aug. 27, 2012. (6 pages total).
Wang et al., "Optically Reconfigurable Metasurfaces and Photonic Devices Based on Phase Change Materials", Nature Photonics, vol. 10, Jan. 2016, pp. 60-65. (7 pages total).
Kim et al., "Creating Semiconductor Metafilms with Designer Absorption Spectra", Nature Communications, vol. 6, No. 7591, Jul. 17, 2015, pp. 1-8. (8 pages total).
Stranks et al., "Electron-Hole Diffusion Lengths Exceeding 1 Micrometer in an Organometal Trihalide Perovskite Absorber", Science, vol. 342, Oct. 18, 2013, pp. 341-344. (4 pages total).
Deschler et al., "High Photoluminescence Efficiency and Optically Pumped Lasing in Solution-Processed Mixed Halide Perovskite Semiconductors", The Journal of Physical Chemistry Letters, vol. 5, 2014, pp. 1421-1426. (6 pages total).
Eperon et al., "Formamidinium Lead Trihalide: a Broadly Tunable Perovskite for Efficient Planar Heterojunction Solar Cells", Energy & Environmental Science, vol. 7, 2014, pp. 982-988. (7 pages total).
Zhang et al., "Continuous Metal Plasmonic Frequency Selective Surfaces", Optics Express, vol. 19, No. 23, Nov. 7, 2011. (7 pages total).
Tan et al., "Plasmonic Color Palettes for Photorealistic Printing with Aluminum Nanostructures", Nano Letters, vol. 14, 2014, pp. 4023-4029. (7 pages total).
Vukusic et al., "Photonic Structures in Biology", Nature, vol. 424, Aug. 14, 2003, pp. 852-855. (5 pages total).
Kolle et al., "Mimicking the Colourful Wing Scale Structure of the Papilio Blumei Butterfly", Nature Nanotechnology, vol. 5, Jul. 2010, pp. 511-515. (5 pages total).
Kats et al., "Nanometre Optical Coatings Based on Strong Interference Effects in Highly Absorbing Media", Nature Materials, vol. 12, Jan. 2013, pp. 20-24. (5 pages total).
Zhang et al., "Highly Efficient Perovskite Solar Cells with Tunable Structural Color", Nano Letters, vol. 15, 2015, pp. 1698-1702. (5 pages total).
Fan et al., "Temporal Coupled-Mode Theory for the Fano Resonance in Optical Resonators", Journal of the Optical Society of America A, vol. 20, No. 3, Mar. 2003, pp. 569-572. (4 pages total).
D'Aguanno et al., "All-Optical Switching at the Fano Resonances in Subwavelength Gratings with very Narrow Slits", Optics Letters, vol. 36, No. 11, Jun. 1, 2011, pp. 1984-1986. (3 pages total).
Green et al., "Optical Properties of Photovoltaic Organic-Inorganic Lead Halide Perovskites", The Journal of Physical Chemistry Letters, vol. 6, Nov. 12, 2015, pp. 4774-4785. (12 pages total).
Poon et al. "Multimode Resonances in Square-Shaped Optical Microcavities", Optics Letters, vol. 26, No. 9, May 1, 2001, pp. 632-634. (3 pages total).
Kippenberg et al., "Fabrication, Coupling and Nonlinear Optics of Ultra-High-Q Micro-Sphere and Chip-Based Toroid Microcavities", Chapter 5, Department of Applied Physics, California Institute of Technology, Optical Microcavities Downloaded from www.worldscientific.com on Apr. 18, 2017, pp. 177-238. (62 pages total).
Yang et al., "Terahertz Magnetic and Electric Mie Resonances of an All-Dielectric One-Dimensional Grating", Applied Physics Letters, vol. 106, No. 111106, Mar. 18, 2015, pp. 1-5. (6 pages total).
Kim et al., "Light Trapping for Solar Fuel Generation with Mie Resonances", Nano Letters, vol. 14, Feb. 13, 2014, pp. 1446-1452. (7 pages total).
Dohner et al., "Intrinsic White-Light Emission from Layered Hybrid Perovskites", Journal of the American Chemical Society, vol. 136, Aug. 27, 2014, pp. 13154-13157. (4 pages total).
Yangui et al. "Optical Investigation of Broadband White-Light Emission in Self-Assembled Organic-Inorganic Perovskite ($C_6H_{11}NH_3$)$_2PbBr_4$", The Journal of Physical Chemistry, vol. 119, Sep. 11, 2015, pp. 23638-23647. (10 pages total).
Zhang et al., "Ultrasmooth Organic-Inorganic Perovskite Thin-Film Formation and Crystallization for Efficient Planar Heterojunction Solar Cells", vol. 6, No. 6142, Jan. 30, 2015, pp. 1-10. (10 pages total).
Giannozzi et al., "Quantum Espresso: a Modular and Open-Source Software Project for Quantum Simulations of Materials", Journal of Physics: Condensed Matter, vol. 21, 2009, pp. 1-19. (20 pages total).
Marini et al., "Yambo: an AB Initio Tool for Excited State Calculations", Computer Physics Communications, vol. 180, 2009, pp. 1392-1403. (12 pages total).

(56) References Cited

OTHER PUBLICATIONS

Rohlfing et al., "Electron-Hole Excitations and Optical Spectra from First Principles", Physical Review B, vol. 62, No. 8, Aug. 15, 2000, pp. 4927-4944. (18 pages total).
Alias et al., "Focused-Ion Beam Patterning of Organolead Trihalide Perovskite for Subwavelength Grating Nanophotonic Applications", Journal of Vacuum Science & Technology B, Nanotechnology and Microelectronics: Materials, Processing, Measurement, and Phenomena, vol. 33, No. 5,2015, pp. 1-9 (11 pages total).
Hsu et al. "Two-Step Thermal Annealing Improves the Morphology of Spin-Coated Films for Highly Efficient Perovskite Hybrid Photovoltaics", Nanoscale, vol. 6, 2014, pp. 10281-10288. (8 pages total).
Alias et al., "Enhanced Etching, Surface Damage Recovery, and Submicron Patterning of Hybrid Perovskites using a Chemically Gas-Assisted Focused-Ion Beam for Subwavelength Grating Photonic Applications", The Journal of Physical Chemistry Letters, vol. 7, 2016, pp. 137-142 (7 pages total).

* cited by examiner

Form a pattern on a halide perovskite structure

Form a first pattern and a second pattern on a halide perovskite structure

Direct a (source) light to a halide perovskite structure — 1902

Direct a (source) light to a first halide perovskite structure — 2002

Direct the (source) light to a first halide perovskite structure — 2004

Provide or supply electrical energy to a halide perovskite structure

Direct an optical light to a halide perovskite structure

2202

DEVICE INCLUDING HALIDE PEROVSKITE STRUCTURE, METHODS OF FORMING AND OPERATING THE SAME

CROSS-REFERENCE TO RELATED APPLICATION

This application claims the benefit of priority of Singapore application No. 10201602400W filed on Mar. 28, 2016, the contents of it being hereby incorporated by reference in its entirety for all purposes.

TECHNICAL FIELD

Various aspects of this disclosure may relate to devices including halide perovskite structures. Various aspects of this disclose may relate to methods of forming and/or operating the same.

BACKGROUND

Metamaterials allow the controlling and tailoring of the optical response of natural materials to achieve unprecedented functionalities. These artificial electromagnetic media can be engineered by structuring on the sub-wavelength scale.

Originally created for achieving extraordinary electromagnetic response (e.g., negative refraction, giant chirality, terahertz magnetism and subwavelength switches) in passive media, metamaterials have been conventionally made out of noble plasmonic metals. As the vast majority of photonic metamaterial architectures today include sub-wavelength metallic resonators arrays, these metamaterial architectures suffer from high energy dissipation due to Ohmic losses, in particular in the near-IR to visible spectral range, which may compromise some applications.

Conversely, all-dielectric resonant metamaterials offer the possibility to alleviate the substantial Ohmic losses while allowing similar functionalities. As the Lorenz-Mie solution to Maxwell's equations reveals, dielectric structures that possess a high refractive index and a size that are comparable or smaller than the wavelength of the incident light support strong optical resonances, known as Mie or leaky-mode resonances. As such, proper control of the resonator geometry and composition allows control of the effective permittivity and permeability of these structures. Due to the absence of Ohmic loss, dielectric metamaterials can be much less absorptive than their metallic counterparts. Recent work has shown that many important attributes of plasmonic metamaterials such as narrow resonances, magnetic response and negative refraction can also be achieved within all-dielectric systems.

Thus far, a wide variety of dielectric metadevice functionalities such as filtering, chirality, broadband reflection, zero index, focusing, as well as optical magnetism, have been demonstrated in silicon and its various alloys as well as high index chalcogenides. Notable applications of such dielectric structures include the realization of strong and tunable light scattering and absorption resonances in nanowires, as well as high efficiency solar cells, photodetectors, resonant nanoantennas, and reconfigurable metasurfaces, predominantly in the near to mid infrared parts of the spectrum.

SUMMARY

Various embodiments may provide a device for providing a first optical light of a first wavelength and a second optical light of a second wavelength. The device may include a halide perovskite structure including a first pattern and a second pattern different from the first pattern, so that the first pattern is configured to provide the first optical light of the first wavelength and the second pattern is configured to provide the second optical light of a second wavelength different from the first wavelength, upon a light incident on the first pattern and the second pattern. The halide perovskite structure may include a halide perovskite material.

Various embodiments may provide a method of forming a device for providing a first optical light of a first wavelength and a second optical light of a second wavelength. The method may include forming a first pattern and a second pattern on a halide perovskite structure, the second pattern different from the first pattern, so that the first pattern is configured to provide the first optical light of the first wavelength and the second pattern is configured to provide the second optical light of a second wave length different from the first wavelength, upon a light incident on the first pattern and the second pattern. The halide perovskite structure may include a halide perovskite material.

Various embodiments may provide a method of operating a device to provide a first optical light of a first wavelength and a second optical light of a second wavelength. The method may include directing a light to a halide perovskite structure, the halide perovskite structure including a first pattern and a second pattern different from the first pattern, so that the first pattern provides the first optical light of the first wavelength and the second pattern provides the second optical light of a second wavelength different from the first wavelength, upon the light incident on the first pattern and the second pattern. The halide perovskite structure may include a halide perovskite material.

BRIEF DESCRIPTION OF THE DRAWINGS

The patent or application file contains at least one drawing executed in color. Copies of this patent or patent application publication with color drawings will be provided by the Office upon request and payment of the necessary fee.

The invention will be better understood with reference to the detailed description when considered in conjunction with the non-limiting examples and the accompanying drawings, in which:

FIG. 17 is a schematic showing a method of forming a device for providing optical light according to various embodiments.

FIG. 18 is a schematic showing a method of forming a device for providing a first optical light of a first wavelength and a second optical light of a second wavelength according to various embodiments.

FIG. 19 is a schematic showing a method of operating a device according in various embodiments.

FIG. 20 is a schematic showing a method of providing a first optical light of a first wavelength and a second optical light of a second wavelength according to various embodiments.

FIG. 21 is a schematic showing a method of operating a device according to various embodiments.

FIG. 22 is a schematic showing a method of operating a device according to various embodiments.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or devices/systems are analogously valid for the other methods or devices/systems. Similarly, embodiments described in the context of a method are analogously valid for a device/system, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may also be used herein to mean that the deposited material may be formed "indirectly on" the implied side or surface with one or more additional layers being arranged between the implied side or surface and the deposited material. In other words, a first layer "over" a second layer may refer to the first layer directly on the second layer, or that the first layer and the second layer are separated by one or more intervening layers.

The device/system as described herein may be operable in various orientations, and thus it should be understood that the terms "top", "bottom", etc., when used in the following description are used for convenience and to aid understanding of relative positions or directions, and not intended to limit the orientation of the device/system.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Figure 1A:
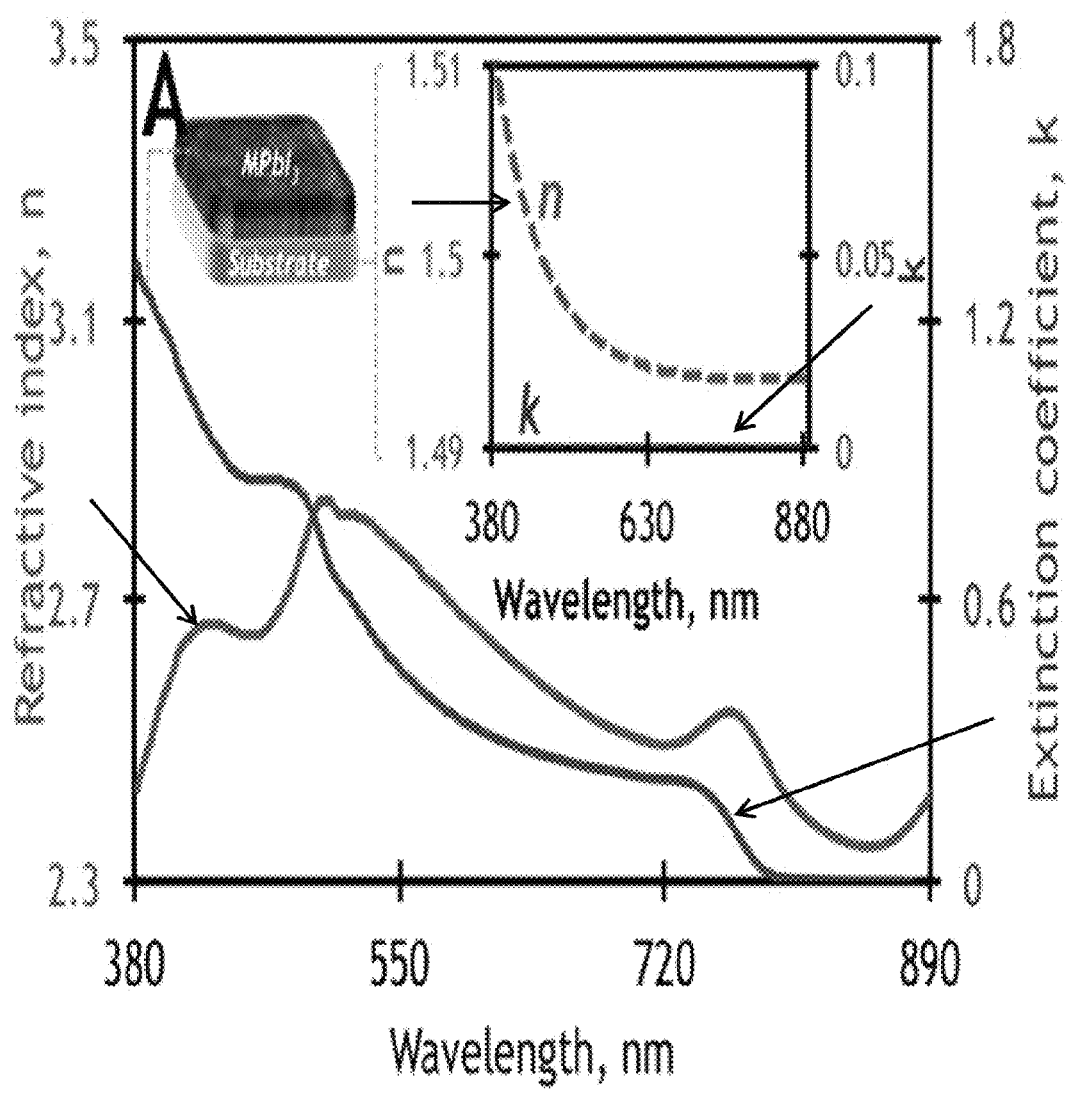
FIG. 1A is a plot of refractive index (n) and extinction coefficient (k) as a function of wavelength (in nanometers or nm) showing experimental optical constants obtained from variable angle spectroscopic ellipsometry on a representative sample according to various embodiments.
Figure 1B:
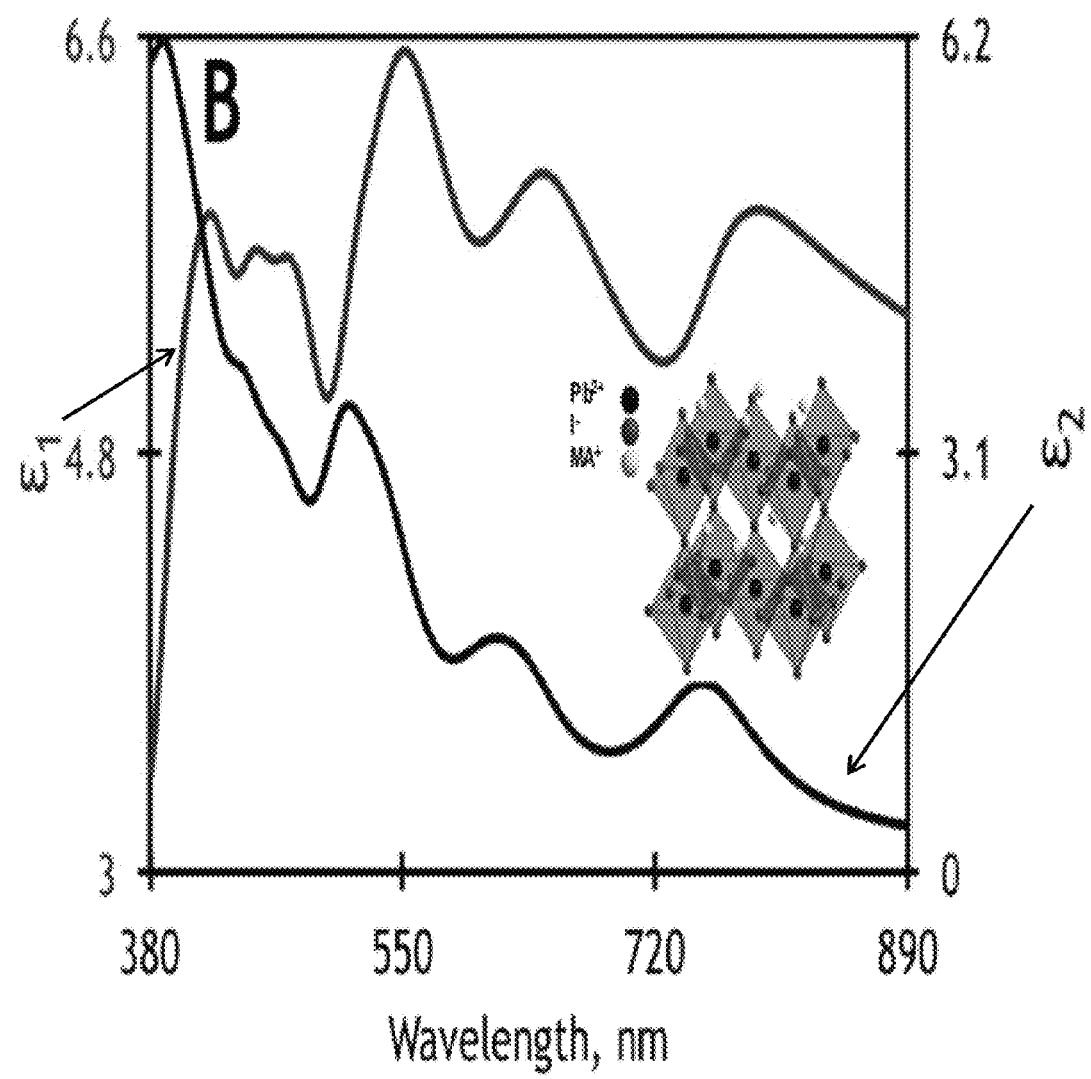
FIG. 1B is a plot of dielectric function ($\varepsilon$) as a function of wavelength (in nanometers or nm) showing dielectric functions $\varepsilon_1$, $\varepsilon_2$ of the methylammonium lead perovskite according to various embodiments predicted from density functional theory.
Figure 1C:
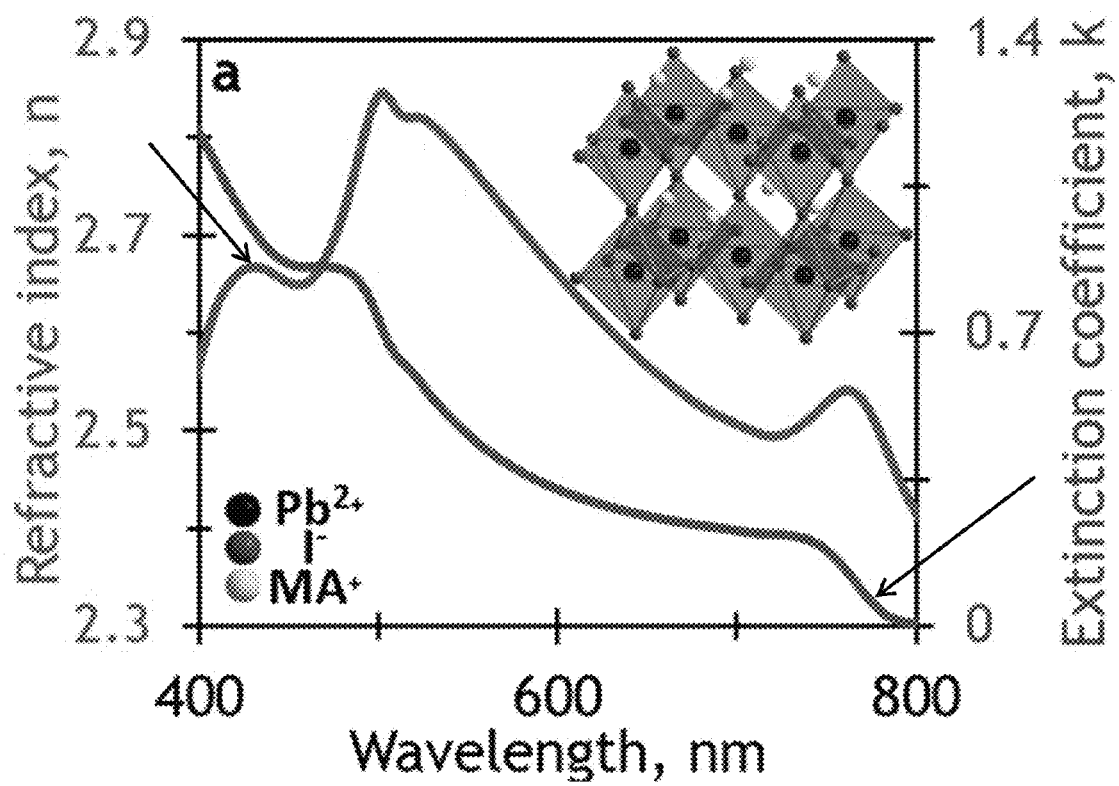
FIG. 1C is a further plot of refractive index (n) as a function of wavelength (in nanometers or nm) showing experimental optical constants obtained from variable angle spectroscopic ellipsometry on a representative sample according to various embodiments. The inset shows the crystal structure of MAPbI$_3$, where MA=CH$_3$NH$_3^+$.
Figure 1D:
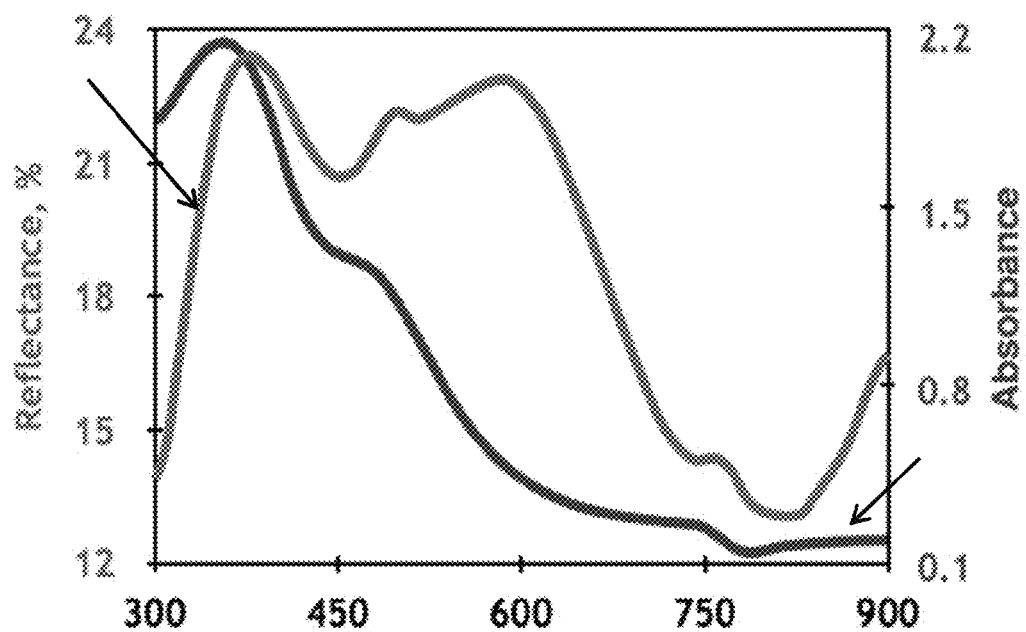
FIG. 1D is a plot of percentage reflectance and absorbance as a function of wavelength (in nanometers or nm) showing the reflectance and absorbance of a representative unstructured organolead halide perovskite according to various embodiments.
Figure 1E:
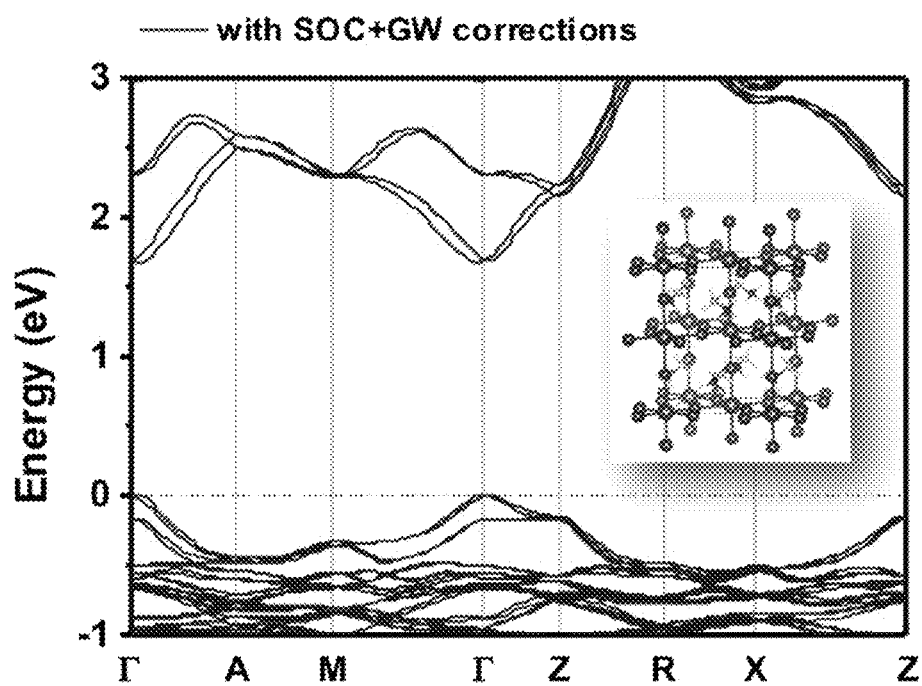
FIG. 1E is a plot of energy (electron volts or eV) as a function of lattice planes showing the band diagram of organolead halide perovskite ($CH_3NH_3PbI_3$) according to various embodiments calculated using first principle density functional theory.
Figure 1F:
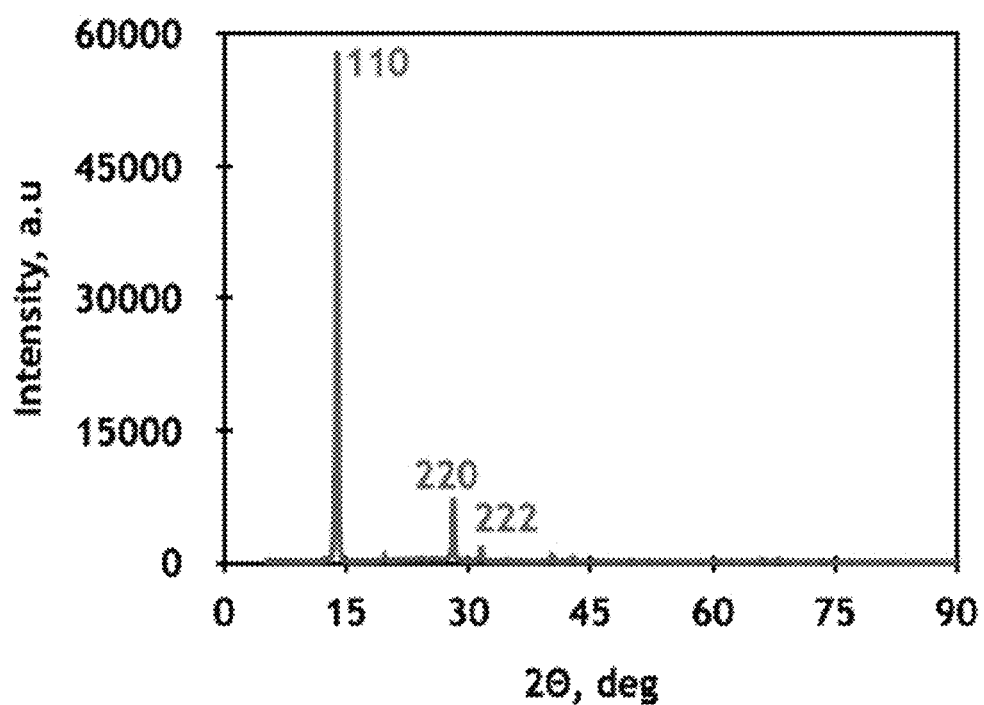
FIG. 1F is a plot of intensity (in arbitrary units or a.u.) as a function of degree (deg) showing the X-ray diffraction of a representative unstructured organolead halide perovskite according to various embodiments.
Figure 1G:
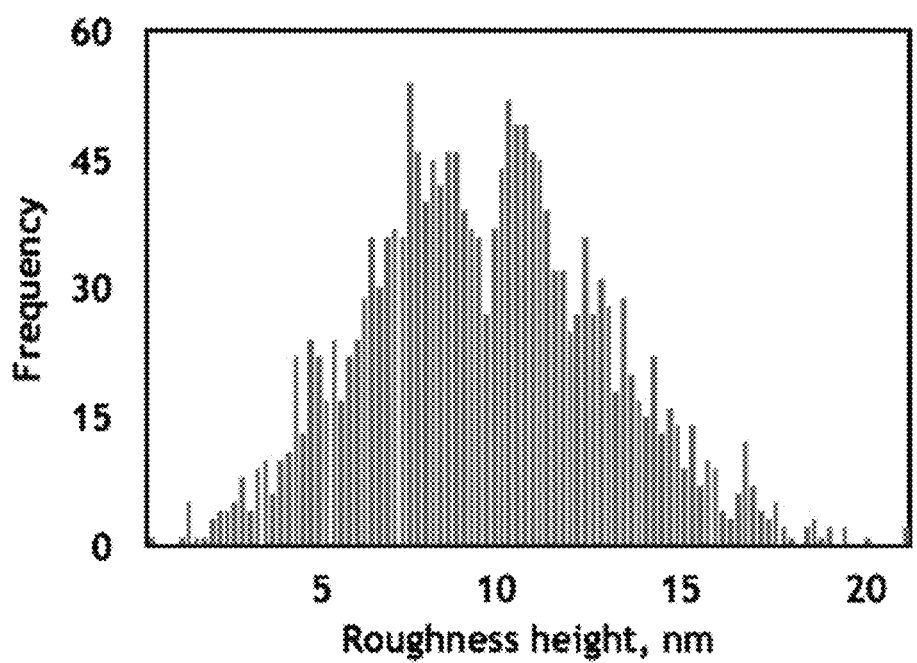
FIG. 1G is a plot of frequency (counts) as a function or roughness height (in nanometers or nm) showing the roughness of spin-coated solution organolead halide perovskite according to various embodiments.

In the search for photonic materials needed to take advantage of the evolution from metals to dielectrics, solution processed organolead halide perovskites may provide a high index, low-loss platform for realising all-dielectric metasurfaces with high Q-factor resonances at visible frequencies. FIG. 1A is a plot $100a$ of refractive index (n) and extinction coefficient (k) as a function of wavelength (in nanometers or nm) showing experimental optical constants obtained from variable angle spectroscopic ellipsometry on a representative sample according to various embodiments. The inset is another plot of refractive index (n) and extinction coefficient (k) as a function of wavelength (in nanometers or nm) showing corresponding constants for the glass substrate used. FIG. 1B is a plot $100b$ of dielectric function ($\varepsilon$) as a function of wavelength (in nanometers or nm) showing dielectric functions $\varepsilon_1$, $\varepsilon_2$ of the methylammonium lead perovskite according to various embodiments predicted from density functional theory. The inset shows the crystal structure of MAPbI$_3$, where MA=CH$_3$NH$_3^+$. The perovskite structure is formed by a 3D network of corner-sharing PbI$_6^{4-}$ octahedra, with the methylammonium cation MA$^+$ occupying the cubo-octahedral cavities. FIG. 1C is a further plot $100c$ of refractive index (n) as a function of wavelength (in nanometers or nm) showing experimental optical constants obtained from variable angle spectroscopic ellipsometry on a representative sample according to various embodiments. The inset shows the crystal structure of MAPbI$_3$, where MA=CH$_3$NH$_3^+$. FIG. 1D is a plot $100d$ of percentage reflectance and absorbance as a function of wavelength (in nanometers or nm) showing the reflectance and absorbance of a representative unstructured organolead halide perovskite according to various embodiments. FIG. 1E is a plot $100e$ of energy (electron volts or eV) as a function of lattice planes showing the band diagram of organolead halide perovskite (CH$_3$NH$_3$PbI$_3$) according to various embodiments calculated using first principle density functional theory. FIG. 1F is a plot $100f$ of intensity (in arbitrary units or a.u.) as a function of degree (deg) showing the X-ray diffraction (XRD) of a representative unstructured organolead halide perovskite according to various embodiments. The XRD pattern on thin film confirms the formation of MAPbI$_3$ with strong preferential orientation towards the 110 direction. The pattern obtained is consistent with the tetragonal crystal system, space group I4/mcm and lattice parameters a=8.889 Å and c=12.562 Å. FIG. 1G is a plot 100g of frequency (counts) as a function or roughness height (in nanometers or nm) showing the roughness of spin-coated solution organolead halide perovskite according to various embodiments. The roughness analysis of the unstructured organohalide perovskite may be obtained using atomic force microscopy.

Organolead halide perovskites are emerging solution-processable materials with outstanding optoelectronic properties. Among them, methylammonium lead iodide perovskite, $CH_3NH_3PbI_3$ has proven to be an exceptional light harvester for hybrid organic-inorganic solar cells, which in just a few years has achieved an impressive non-radiative electroluminescence (NREL) certified power conversion efficiency over 20%, and remarkable performance in a variety of device architectures. Such perovskites have been touted as a potential candidate for building-integrated photovoltaics (BIPV), which require large-area, semi-transparent solar cells. Furthermore, thanks to their cost-effectiveness and ease of processing, hybrid perovskites are attracting vast interest for potential applications beyond the photovoltaic domain, such as water splitting, light-emitting devices, and displays, as well as tunable, electrically pumped lasers. To obtain the wide colour gamut required for these applications, research has focused on chemical tuning by varying the perovskite composition. This limits the choice of materials to the natural colour variation of unstructured perovskite films. Alternatively, the photonic response of materials can be effectively tuned across the visible frequency range by nanostructuring at sub-wavelength scales. Indeed, in nature many plants and animals display dramatic 'structural colours' derived from astonishingly intricate spatial assemblies of intrinsically colourless bio-materials. While the physics of structural colouring is in many cases well understood, replicating them remains a significant technological challenge, and typically requires complex multilayer deposition or nanofabrication procedures.

Tunable-colour perovskite metasurfaces including nanogratings or nanoslit metamolecules etched into sub-wavelength (thickness ~200 nm) $CH_3NH_3PbI_3$ films deposited from solution is described herein. Various embodiments may include patterns other than nanogratings or nanoslits.

The spectral position and quality factor of the reflection resonances may be precisely engineered by varying several degrees of freedom in the geometrical parameter space, providing a simple toolset to create coloured perovskite metasurfaces over the entire ultraviolet, visible, or near-infrared frequency range.

Various embodiments may relate to a device including a halide perovskite structure including one or more patterns and/or a device including such a halide perovskite structure. Various embodiments may seek to address the various issues faced by conventional devices. Various embodiments may be able to provide or absorb a wide range of colours. Various embodiments may be easy to fabricate compared to patterning of other materials.

Figure 2A:
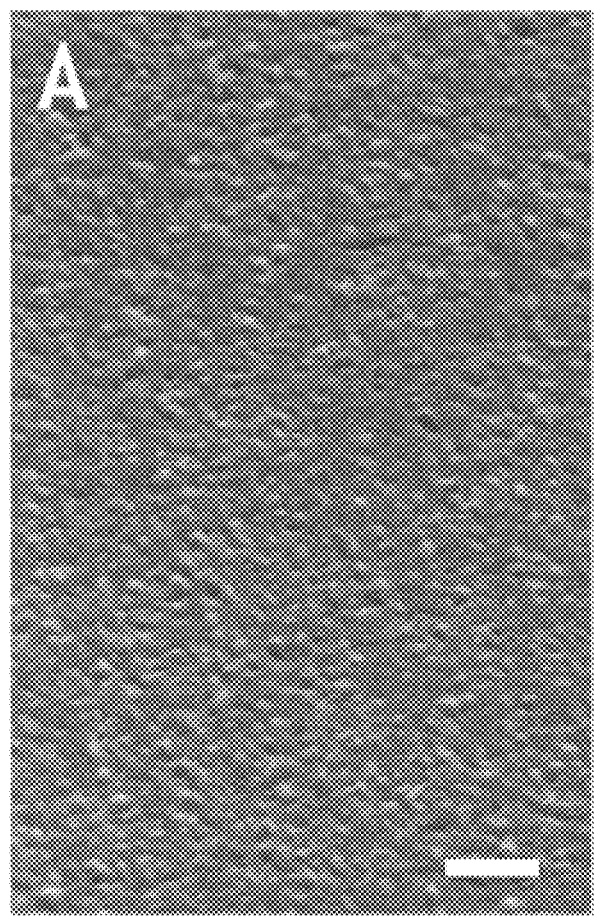
FIG. 2A is a scanning electron microscopy (SEM) image of an unstructured spin coated 200 nm film of methylammonium lead iodide perovskite ($CH_3NH_3PbI_3$) according to various embodiments.
Figure 2B:
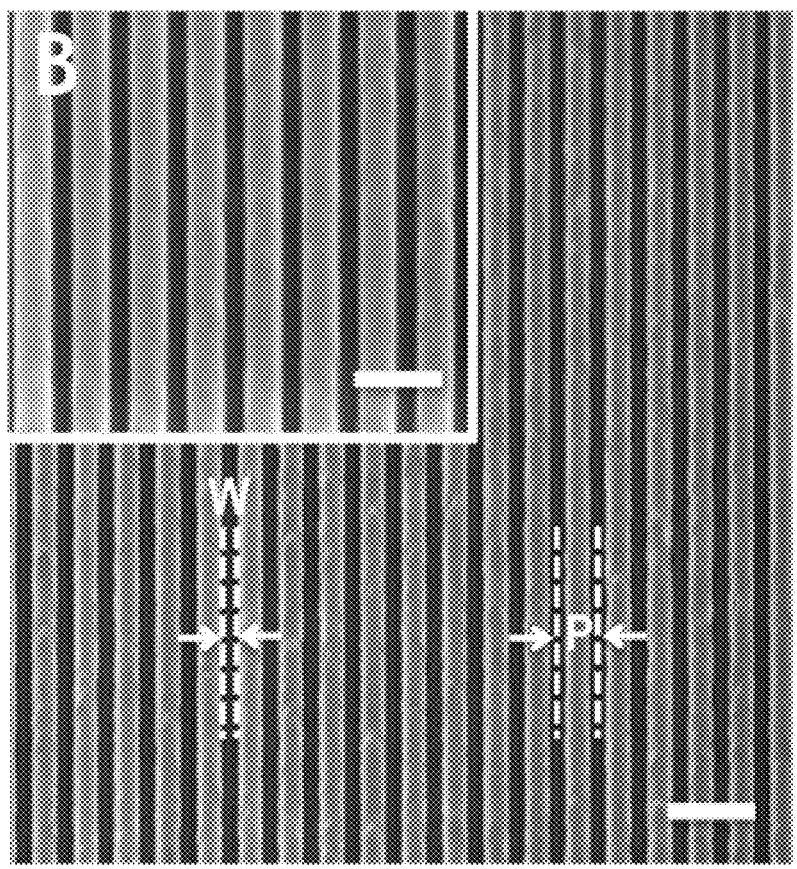
FIG. 2B is a scanning electron microscopy (SEM) image of the film shown in FIG. 2A patterned with asymmetric nano-bar metamaterial according to various embodiments. The inset shows the magnified image of a portion of the patterned film.
Figure 2C:
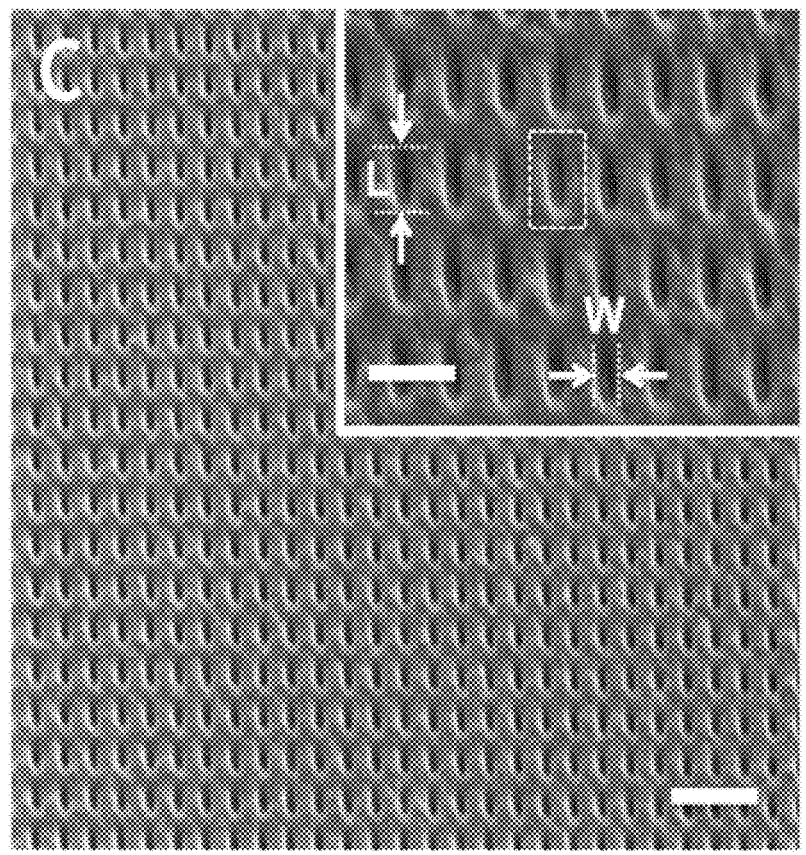
FIG. 2C is a scanning electron microscopy (SEM) image of the film shown in FIG. 2A patterned with asymmetric nanoslit metamaterial according to various embodiments. The inset shows the magnified image of a portion of the patterned film.

FIG. 2A is a scanning electron microscopy (SEM) image 200a of an unstructured spin coated 200 nm film of methylammonium lead iodide perovskite ($CH_3NH_3PbI_3$) according to various embodiments. FIG. 2B is a scanning electron microscopy (SEM) image 200b of the film shown in FIG. 2A patterned with asymmetric nano-bar metamaterial according to various embodiments. The inset shows the magnified image of a portion of the patterned film. FIG. 2C is a scanning electron microscopy (SEM) image 200c of the film shown in FIG. 2A patterned with asymmetric nanoslit metamaterial according to various embodiments. The inset shows the magnified image of a portion of the patterned film.

Normal incidence reflection and transmission of unstructured subwavelength films may be entirely determined by their thickness and complex refractive index. However, subwavelength aperiodic or periodic structuring of such films may introduce narrow reflection/transmission resonances due to the interaction between the thin film interference and the grating modes. The structuring of such films may control the phase and/or amplitude of the emitted optical light beams. These structures are non-diffractive, therefore behaving as homogenous layers in the far field. Based on these principles, trihalide perovskite metasurface structures may be designed to introduce pronounced resonances in their reflection properties.

Perovskite films with a thickness ranging from 100 to 200 nm were synthesized from organic precursors and spin-coated onto quartz substrates. Nanograting and nanoslit metasurface patterns, with a fixed groove width (W) of ~100 nm were patterned onto the halide perovskite film by milling to various depths (from 20 to 200 nm) using focused ion beam (FIB), covering an area of approximately 20 μm×20 μm. The nanograting period (P) ranged from 300 to 450 nm; corresponding periods were fabricated for the nanoslits, with slit length (L) varying from 100 to 200 nm.

Figure 3A:
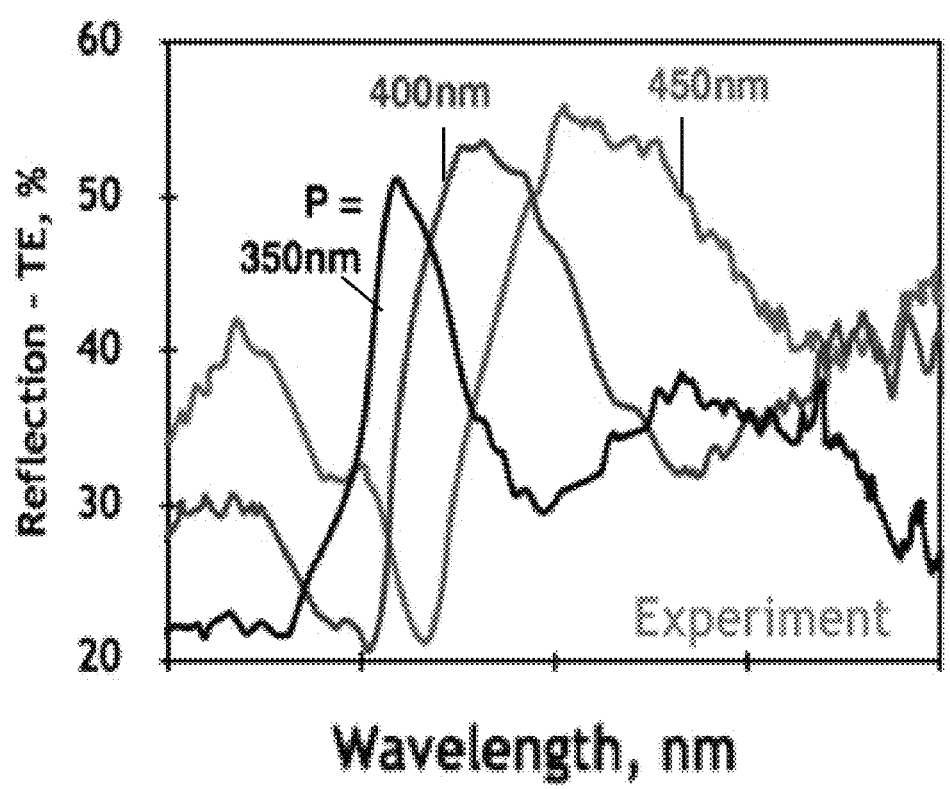
FIG. 3A is a plot of the reflection (in percentage or %) of the traverse electric (TE) mode as a function of wavelength (in nanometers or nm) showing the experimental reflection spectra for nanograting metasurfaces tuned by period from 350 nm to 450 nm according to various embodiments.
Figure 3B:
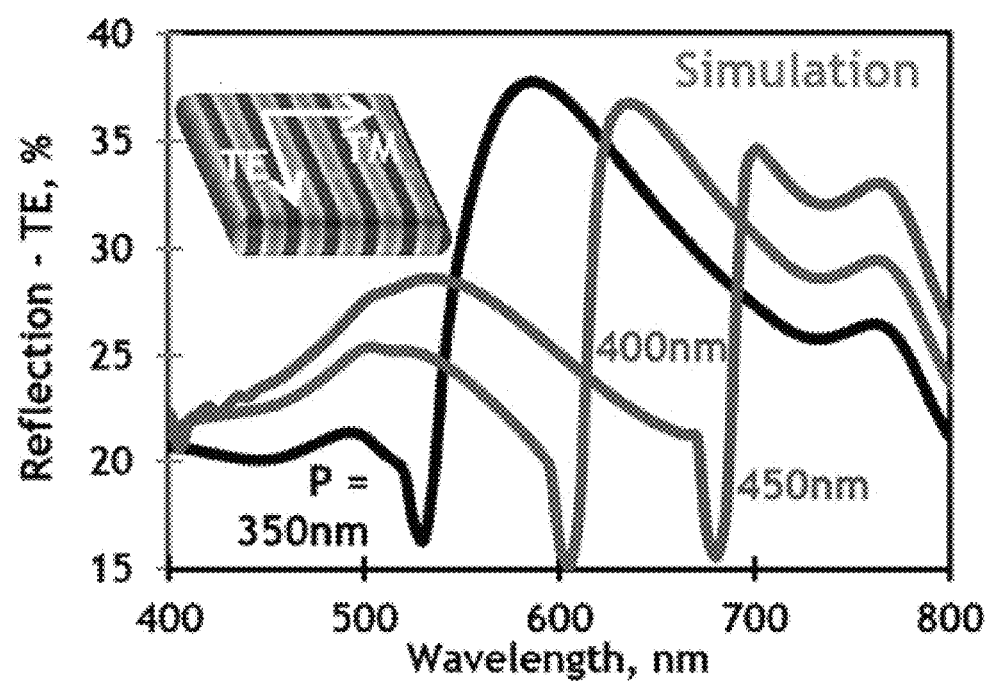
FIG. 3B is a plot of the reflection (in percentage or %) of the traverse electric (TE) mode as a function of wavelength (in nanometers or nm) showing the simulated reflection spectra for nanograting metasurfaces tuned by period from 350 nm to 450 nm according to various embodiments.

FIG. 3A is a plot 300a of the reflection (in percentage or %) of the traverse electric (TE) mode as a function of wavelength (in nanometers or nm) showing the experimental reflection spectra for nanograting metasurfaces tuned by period from 350 nm to 450 nm according to various embodiments. As the period of the metasurfaces is increased, their resonances redshift in energy and broaden, and higher order resonances may start appearing. FIG. 3B is a plot 300b of the reflection (in percentage or %) of the traverse electric (TE) mode as a function of wavelength (in nanometers or nm) showing the simulated reflection spectra for nanograting metasurfaces tuned by period from 350 nm to 450 nm according to various embodiments.

Figure 3C:
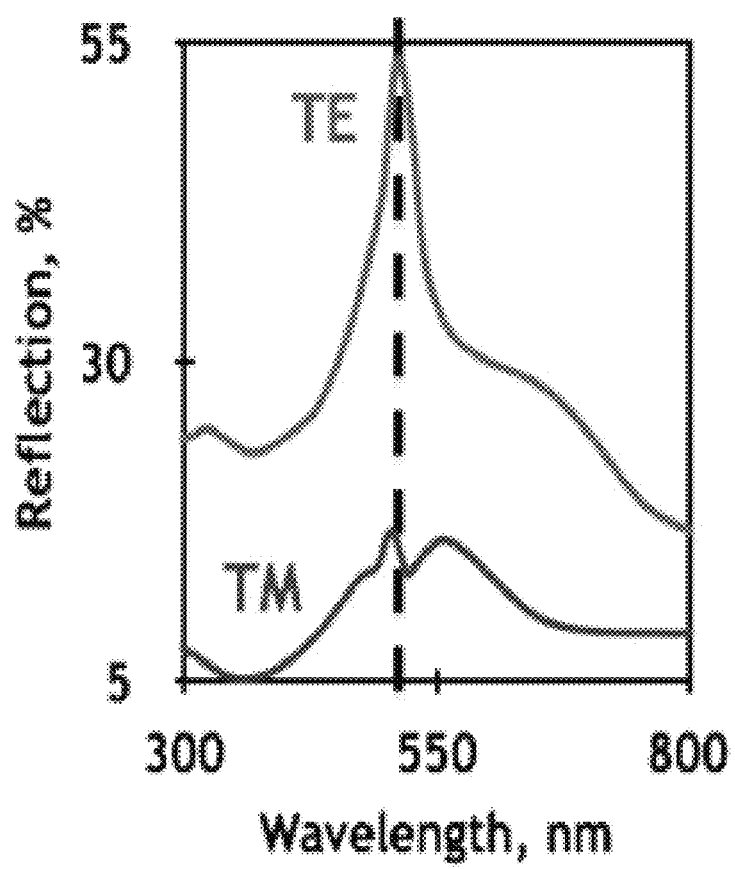
FIG. 3C is a plot of the reflection (in percentage or %) as a function of wavelength (in nanometers or nm) showing reflection spectra of the traverse electric (TE) mode and traverse magnetic (TM) mode polarized light exhibited by the nanograting metasurfaces according to various embodiments.
Figure 3D:
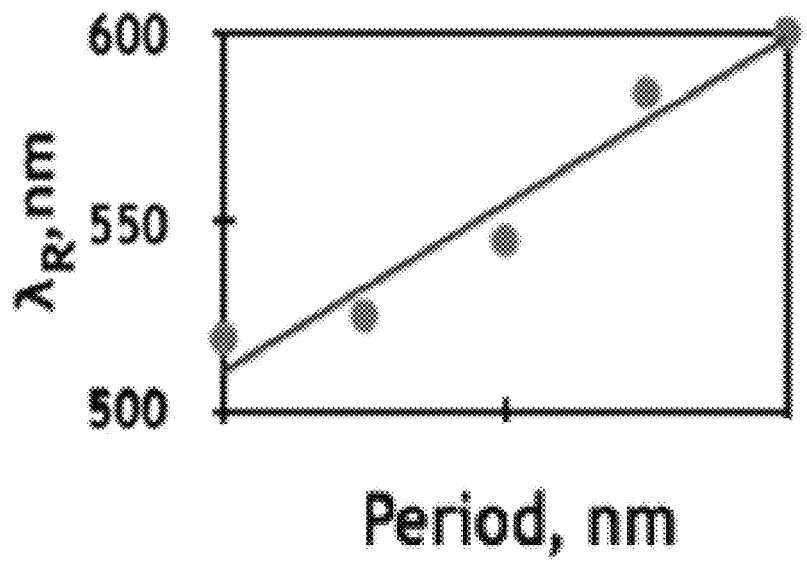
FIG. 3D is a plot of wavelength (in nanometers or nm) as a function of period (in nanometers or nm) showing variation of wavelength of optical light showing resonance as a function of period of the grating according to various embodiments.
Figure 3E:
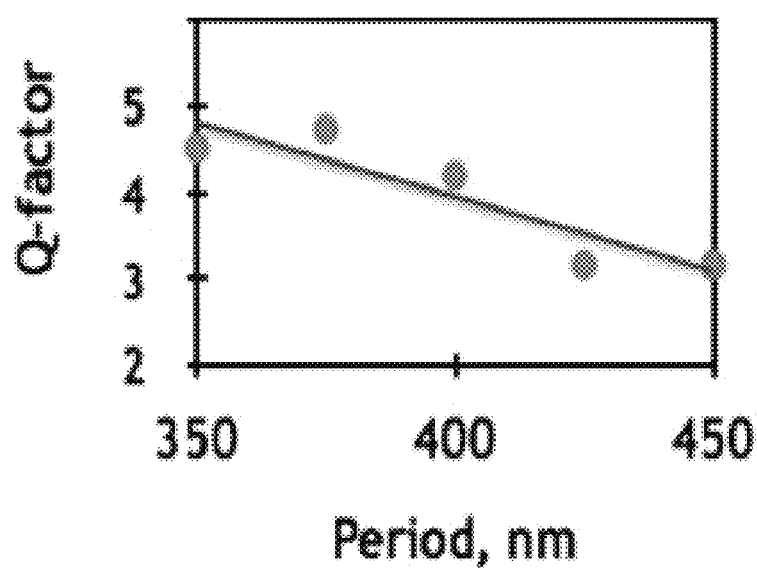
FIG. 3E is a plot of quality factor (Q-factor) as a function of period (in nanometers or nm) showing variation of quality factors of optical light showing resonance as a function of period of the grating according to various embodiments.

FIG. 3C is a plot 300c of the reflection (in percentage or %) as a function of wavelength (in nanometers or nm) showing reflection spectra of the traverse electric (TE) mode and traverse magnetic (TM) mode polarized light exhibited by the nanograting metasurfaces according to various embodiments. FIG. 3D is a plot 300d of wavelength (in nanometers or nm) as a function of period (in nanometers or nm) showing variation of wavelength of optical light showing resonance as a function of period of the grating according to various embodiments. FIG. 3E is a plot 300e of quality factor (Q-factor) as a function of period (in nanometers or nm) showing variation of quality factors of optical light showing resonance as a function of period of the grating according to various embodiments.

Figure 3F:
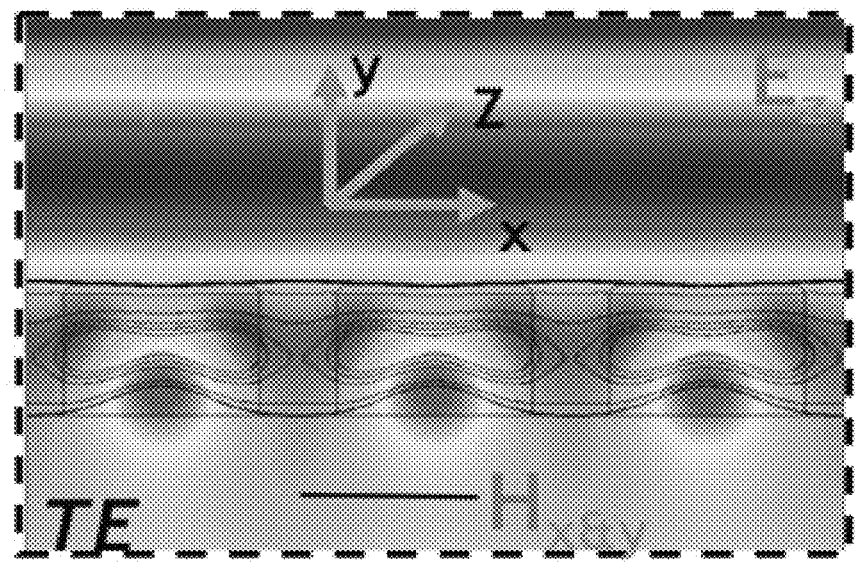
FIG. 3F is an image showing simulated electric field distribution for traverse (TE) incident polarized light according to various embodiments.
Figure 3G:
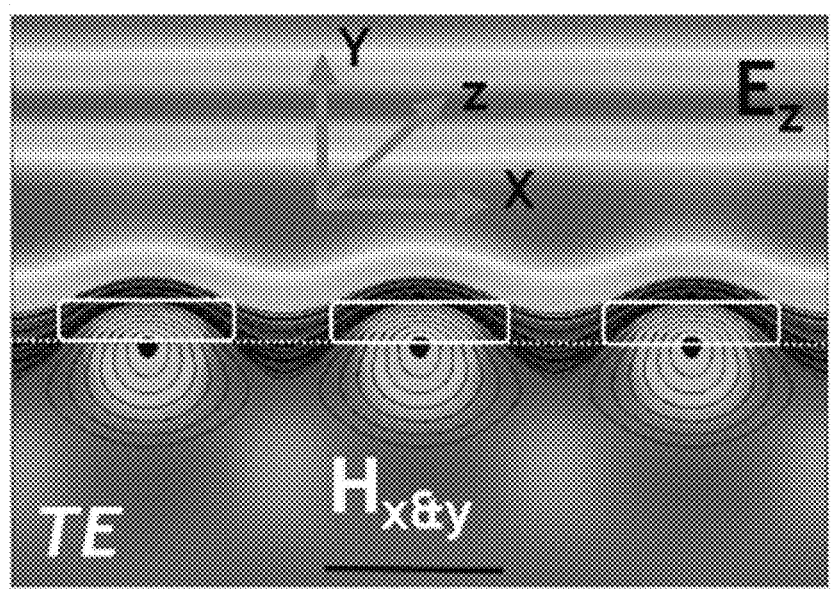
FIG. 3G is another image showing simulated electric field distribution for traverse (TE) incident polarized light according to various embodiments.
Figure 3H:
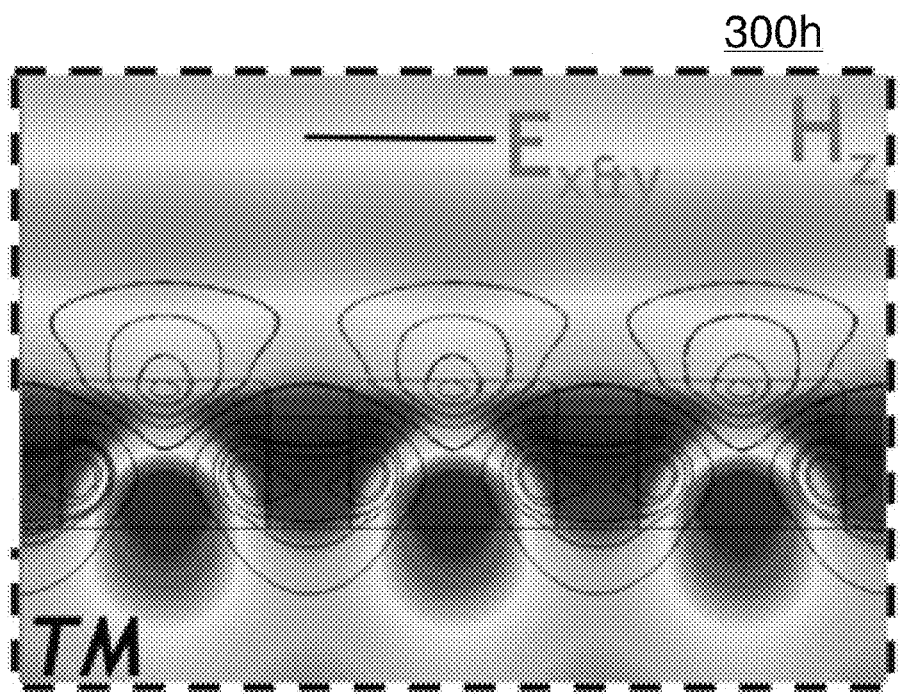
FIG. 3H is an image showing simulated magnetic field distribution for traverse (TM) incident polarized light according to various embodiments.
Figure 3I:
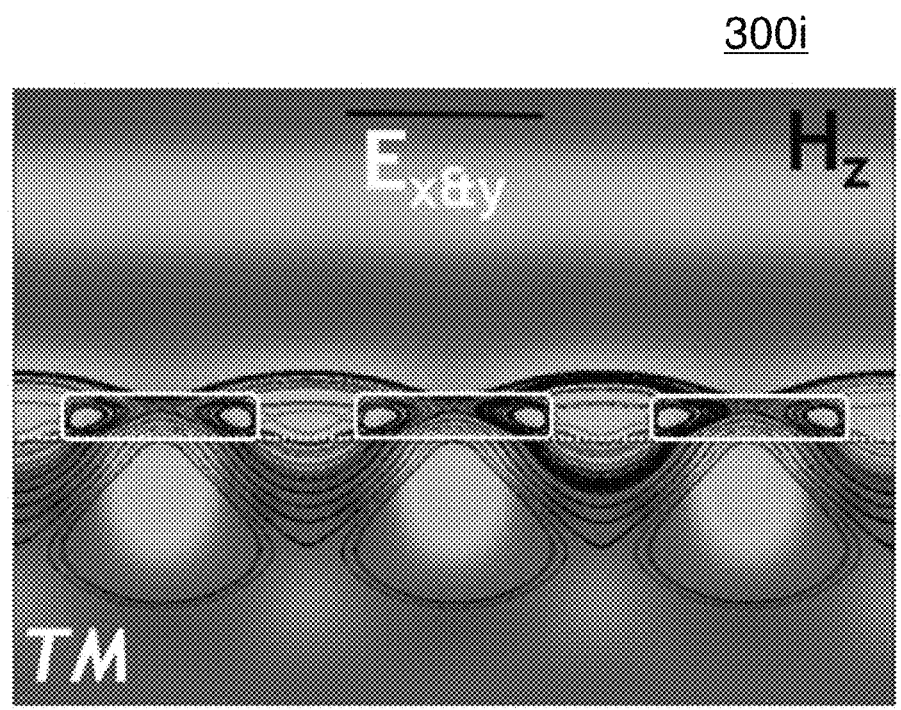
FIG. 3I is another image showing simulated magnetic field distribution for traverse (TM) incident polarized light according to various embodiments.

FIG. 3F is an image 300f showing simulated electric field distribution for traverse (TE) incident polarized light according to various embodiments. FIG. 3G is another image 300g showing simulated electric field distribution for traverse (TE) incident polarized light according to various embodiments. FIG. 3H is an image 300h showing simulated magnetic field distribution for traverse (TM) incident polarized light according to various embodiments. FIG. 3I is another image 300i showing simulated magnetic field distribution for traverse (TM) incident polarized light according to various embodiments.

Figure 3J:
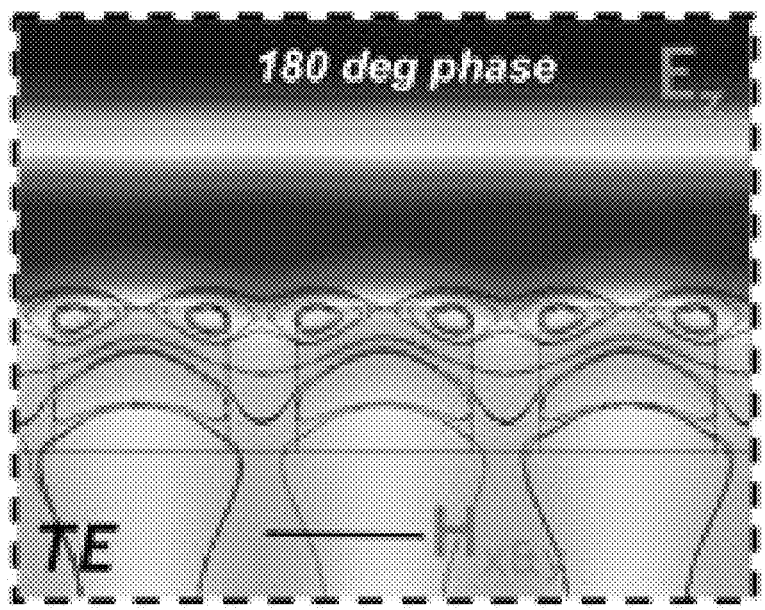
FIG. 3J is yet another image showing simulated electric field distribution for traverse (TE) incident polarized light according to various embodiments.
Figure 3K:
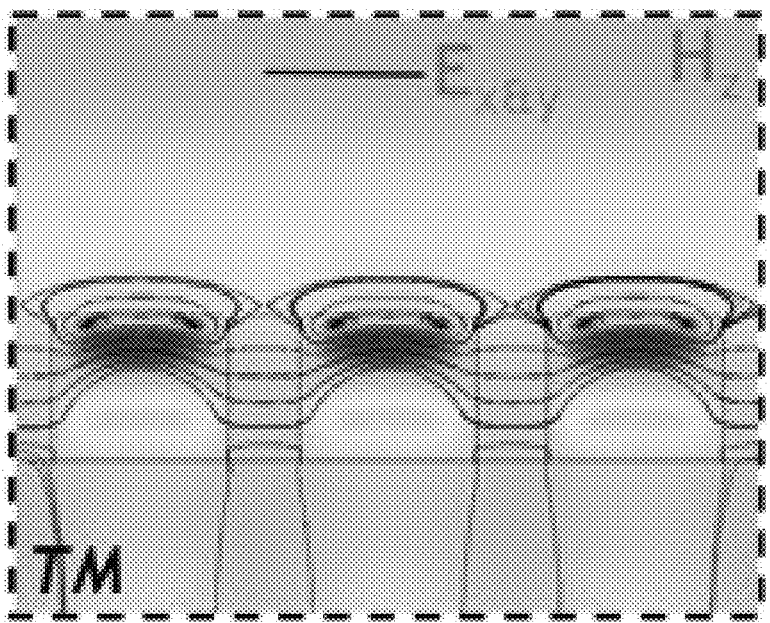
FIG. 3K is yet another image showing simulated magnetic field distribution for traverse (TM) incident polarized light according to various embodiments.

FIG. 3J is yet another image 300j showing simulated electric field distribution for traverse (TE) incident polarized light according to various embodiments. FIG. 3K is yet another image 300k showing simulated magnetic field distribution for traverse (TM) incident polarized light according to various embodiments.

FIGS. 3A-B show the experimental and simulated reflection response for incident polarization parallel (TE) to the nanograting metasurfaces. As seen from the data, the reflectivity of nanograting metasurfaces may effectively be structurally tuned by varying the grating period. Discrepancies between experiment and numerical simulations may be related to manufacturing imperfections—deviations from the ideal model geometry such as beveled edges of the ridges, and possible edges of the ridges, and possible stoichiometric drift in the perovskite induced by focused ion beam (FIB) milling, which may cause slight changes in the refractive index from that of the unstructured films, as well as discrepancies in the modelled optical constants obtained from ellipsometry, due to the complex morphology of such organolead halide perovskites.

In the case of nanostructuring with anisotropic resonator geometries, the observed optical properties may depend on the polarization of the incident light. As such, the optical response of nanograting metasurfaces may be highly sensitive to polarisation, with resonant peaks almost disappearing with TM incident polarization (FIG. 3C). On the other hand, for TE incident polarization, the resonances in reflectivity spectra exhibit high quality factor of Q>3 ($Q=\Delta\lambda/\lambda_R$, where $\lambda_R$ is the resonance wavelength and $\Delta\lambda$ is the spectral half-maximum linewidth), and can be tuned across a range of visible frequencies by varying the grating period (FIGS. 3D, 3E).

Within dielectric metasurfaces, the distribution of electric and magnetic fields at the resonant frequencies may be confined inside the nanostructured dielectric medium, due to the relatively high refractive index of the perovskite. This may facilitate coupling of incident light to guided and diffracted modes in the structure, resulting in the constructive interference of light trapped inside of the perovskite nanostructure (FIGS. 3F-I), similar to whispering-gallery or leaky-mode resonances in larger square and microdisc resonator. The resonant TE response may be characterised by the excitation of anti-phased displacement currents (in the ±z direction) along the core and sides of each perovskite ridge, and a circulating pattern of magnetic field within the ridges. It should be noted that the field distribution in dielectric gratings may be in contrast to the case of metallic gratings, where the spatial distribution of the fields is mainly concentrated at the interface metal-air or metal-substrate. This may give rise to the strong resonances in TE, rather than TM mode of our perovskite grating structures. Conversely, the TM response may result from displacement currents circulating in the xy plane (forming magnetic dipoles oriented along z).

While nanograting metasurfaces present an attractive anisotropic resonant geometry, with distinct response in the TM and TE polarisations, many practical applications may require polarisation independent optical response. Perovskite nanoslit metasurfaces that present an additional degree of geometrical freedom, i.e. the slit length, may enable the design of metamolecules with nearly isotropic response in the TM and TE polarisations.

Figure 4A:
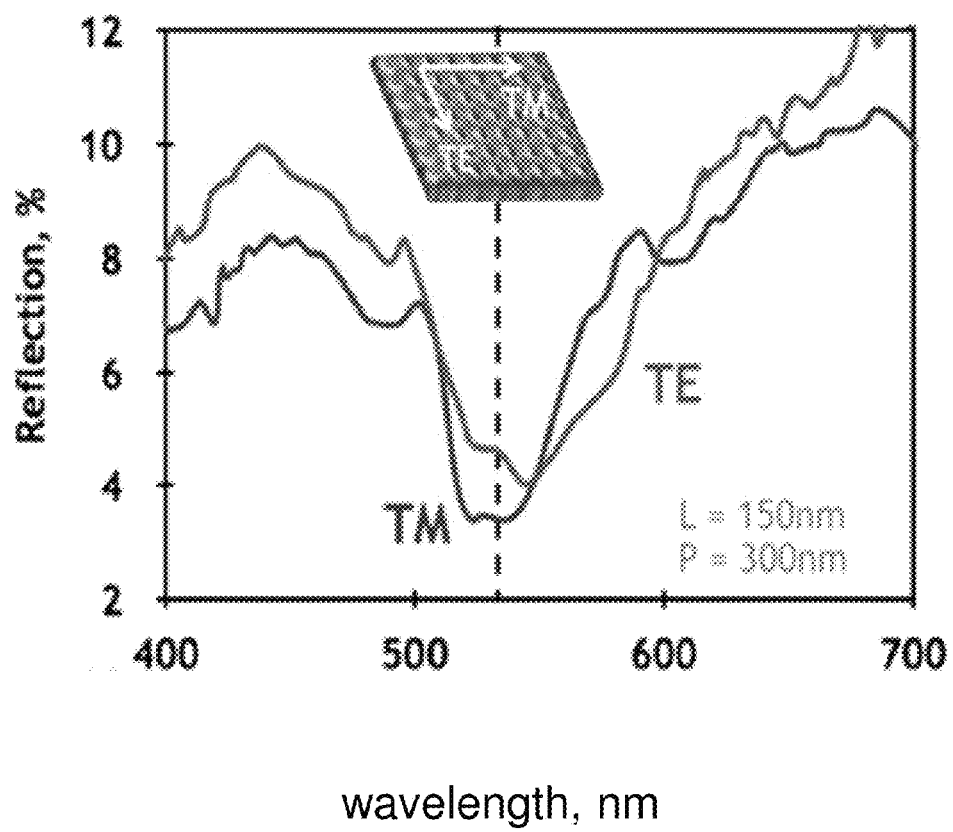
FIG. 4A is a plot of reflection (in percentage or %) as a function of wavelength (in nanometers or nm) showing the reflection response of a nanoslit metasurface with length (L) of 150 nm and period (P) of 300 nm according to various embodiments showing similar response for both traverse magnetic (TM) and traverse electric (TE) polarized incident light.
Figure 4B:
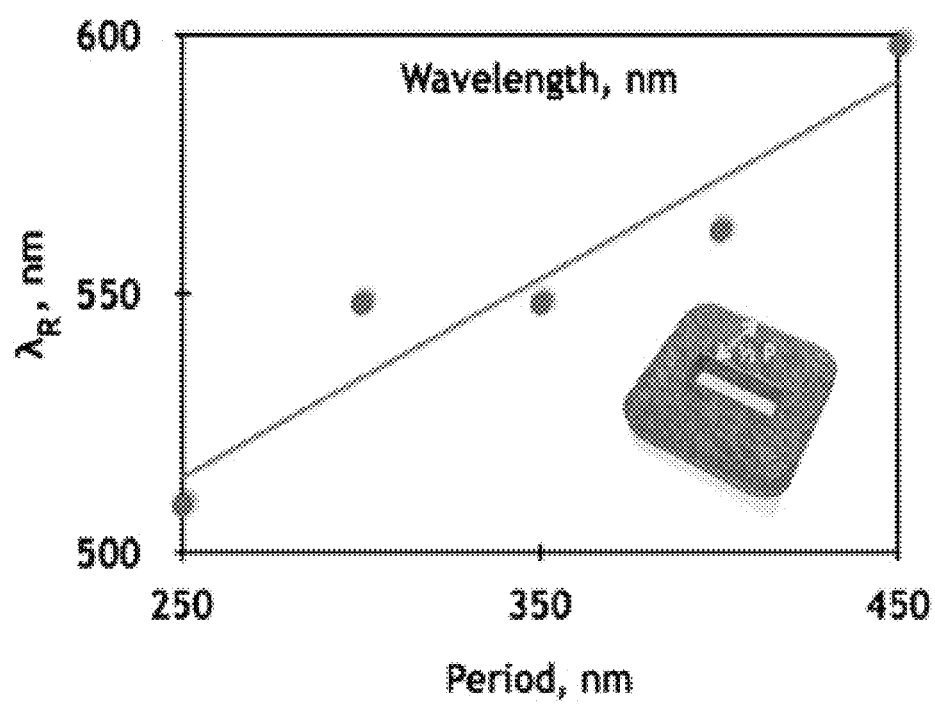
FIG. 4B is a plot of wavelength (in nanometers or nm) as a function of period (in nanometers or nm) showing structural tuning (from period of 250 nm to period of 450 nm) of reflection spectra for traverse electric (TE) polarized incidence light in the nanoslit metasurface according to various embodiments.
Figure 4C:
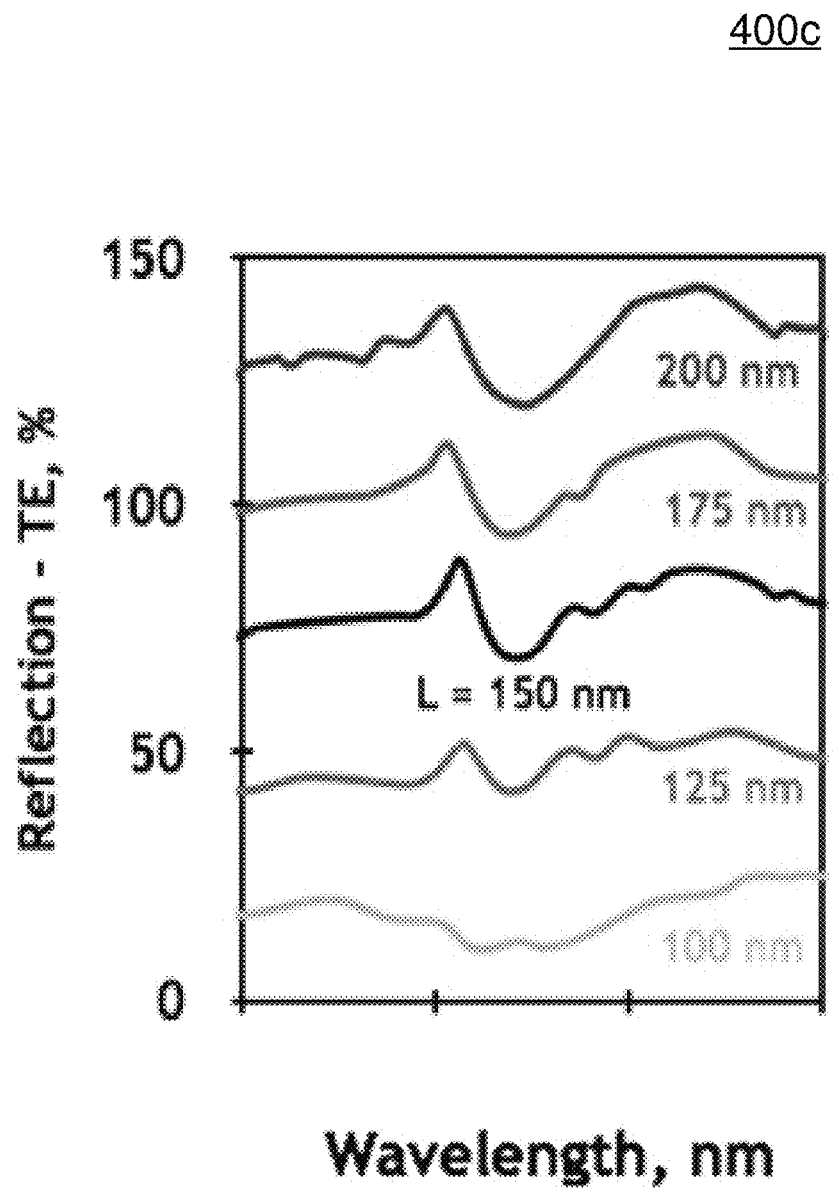
FIG. 4C is a plot of reflection percentage (%) as a function of wavelength (in nanometers or nm) showing tuning of reflected traverse electric (TE) incident light by adjusting the length (L) of the nanoslits according to various embodiments.
Figure 4D:
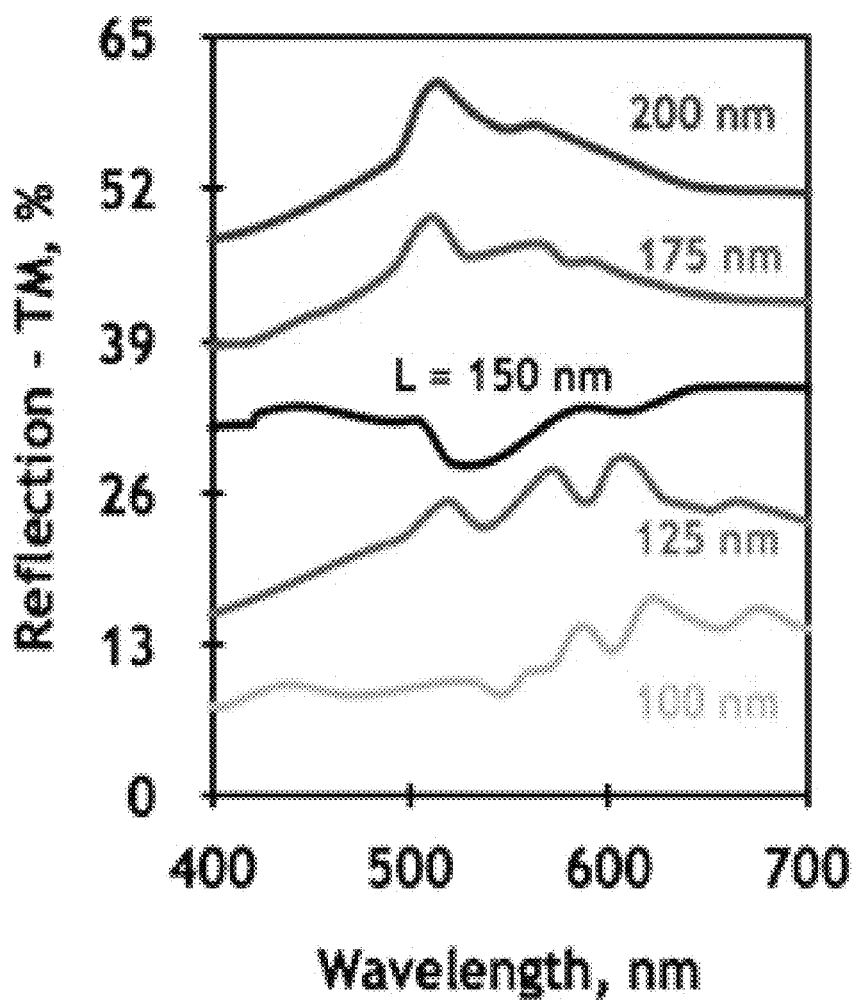
FIG. 4D is a plot of reflection percentage (%) as a function of wavelength (in nanometers or nm) showing tuning of reflected traverse magnetic (TM) incident light by adjusting the length (L) of the nanoslits according to various embodiments.
Figure 4E:
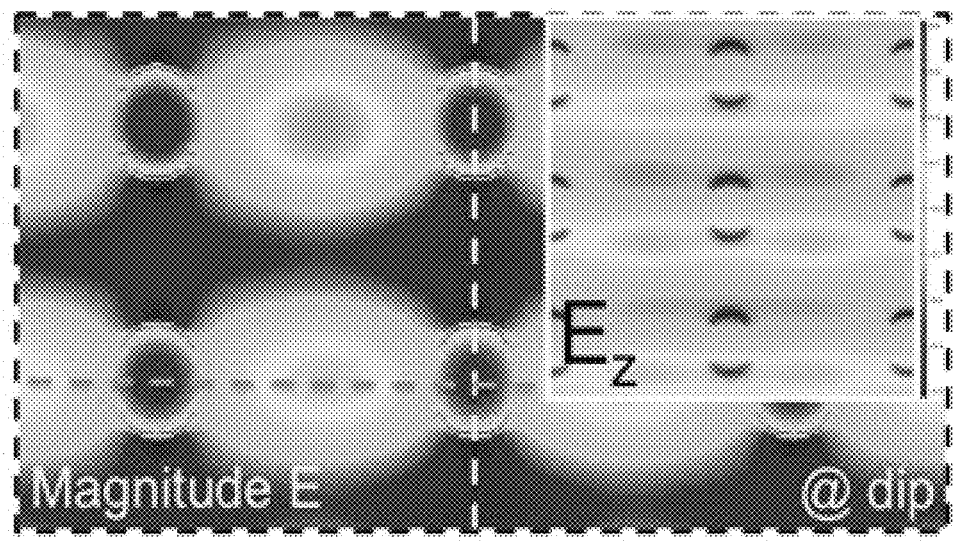
FIG. 4E is an image showing a bird's eye view for traverse electric polarized light according to various embodiments.
Figure 4F:
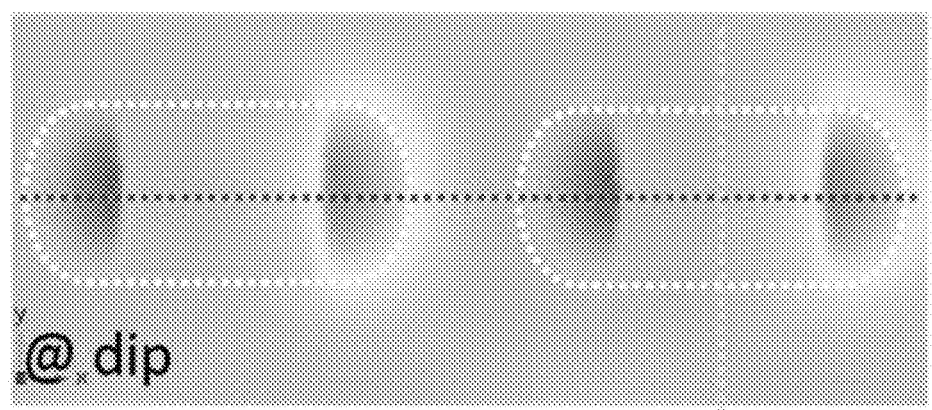
FIG. 4F is another image showing a bird's eye view for traverse electric (TE) polarized light according to various embodiments.
Figure 4G:
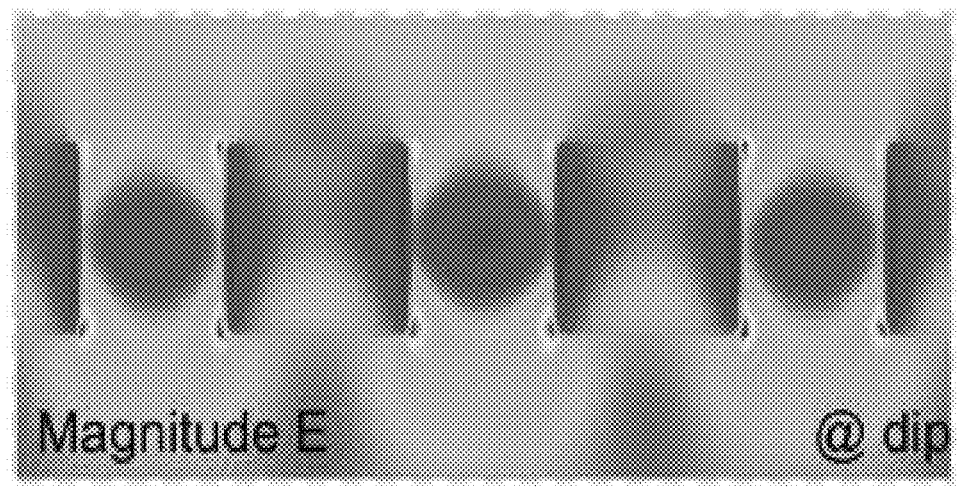
FIG. 4G is an image showing a cross-sectional view of simulated electric field distribution for traverse electric (TE) polarized light according to various embodiments.
Figure 4H:
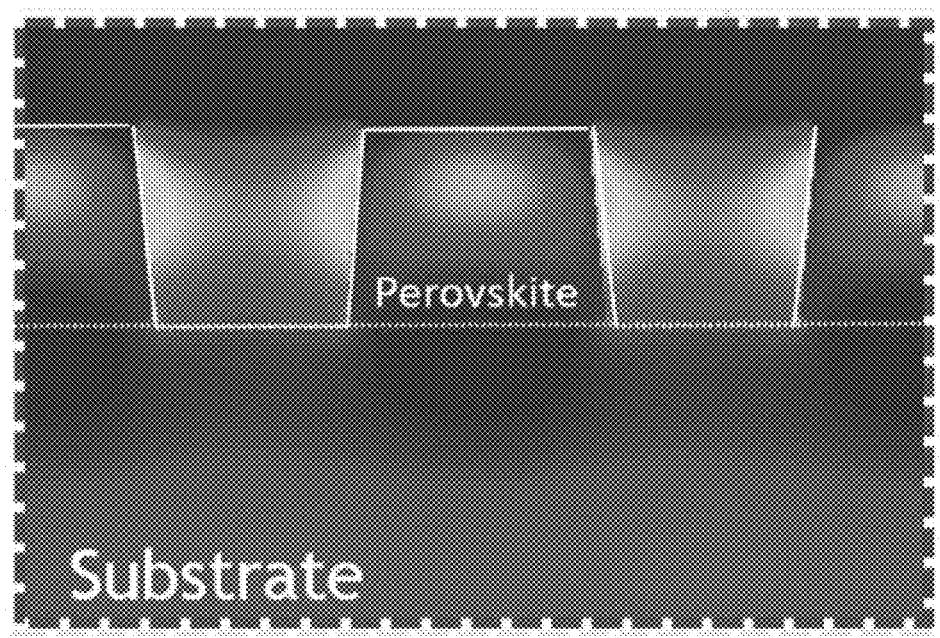
FIG. 4H is another image showing a cross-sectional view of simulated electric field distribution for traverse electric (TE) polarized light according to various embodiments.
Figure 4I:
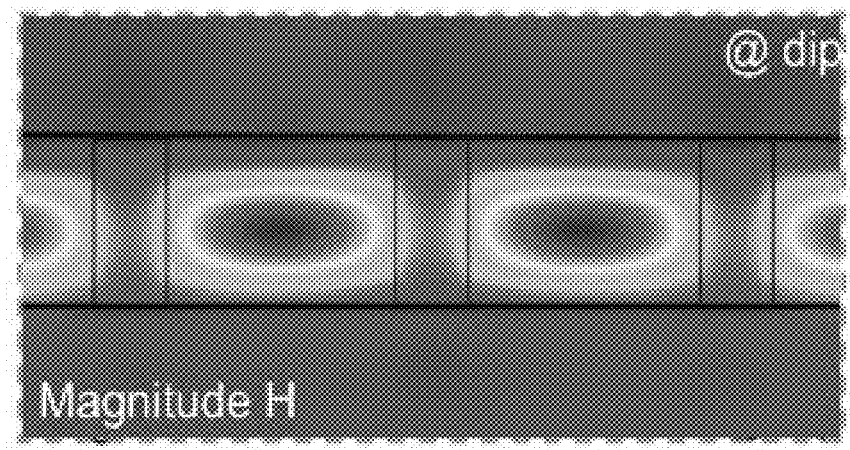
FIG. 4I is an image showing a cross-sectional view of simulated magnetic field distribution for traverse electric (TE) polarized light according to various embodiments.
Figure 4J:
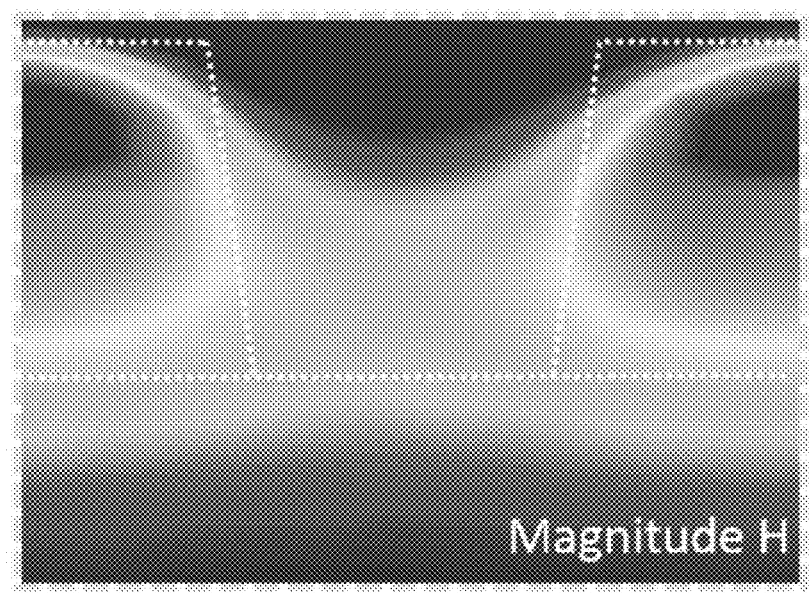
FIG. 4J is another image showing a cross-sectional view of simulated magnetic field distribution for traverse electric (TE) polarized light according to various embodiments.

FIG. 4A is a plot 400a of reflection (in percentage or %) as a function of wavelength (in nanometers or nm) showing the reflection response of a nanoslit metasurface with length (L) of 150 nm and period (P) of 300 nm according to various embodiments showing similar response for both traverse magnetic (TM) and traverse electric (TE) polarized incident light. FIG. 4B is a plot 400b of wavelength (in nanometers or nm) as a function of period (in nanometers or nm) showing structural tuning (from period of 250 nm to period of 450 nm) of reflection spectra for traverse electric (TE) polarized incidence light in the nanoslit metasurface according to various embodiments. FIG. 4C is a plot 400c of reflection percentage (%) as a function of wavelength (in nanometers or nm) showing tuning of reflected traverse electric (TE) incident light by adjusting the length (L) of the nanoslits according to various embodiments. FIG. 4D is a plot 400d of reflection percentage (%) as a function of wavelength (in nanometers or nm) showing tuning of reflected traverse magnetic (TM) incident light by adjusting the length (L) of the nanoslits according to various embodiments. FIG. 4E is an image 400e showing a bird's eye view for traverse electric polarized light according to various embodiments. FIG. 4F is another image 400f showing a bird's eye view for traverse electric (TE) polarized light according to various embodiments. FIG. 4G is an image 400g showing a cross-sectional view of simulated electric field distribution for traverse electric (TE) polarized light according to various embodiments. FIG. 4H is another image 400h showing a cross-sectional view of simulated electric field distribution for traverse electric (TE) polarized light according to various embodiments. FIG. 4I is an image 400i showing a cross-sectional view of simulated magnetic field distribution for traverse electric (TE) polarized light according to various embodiments. FIG. 4J is another image 400j showing a cross-sectional view of simulated magnetic field distribution for traverse electric (TE) polarized light according to various embodiments.

Figure 4K:
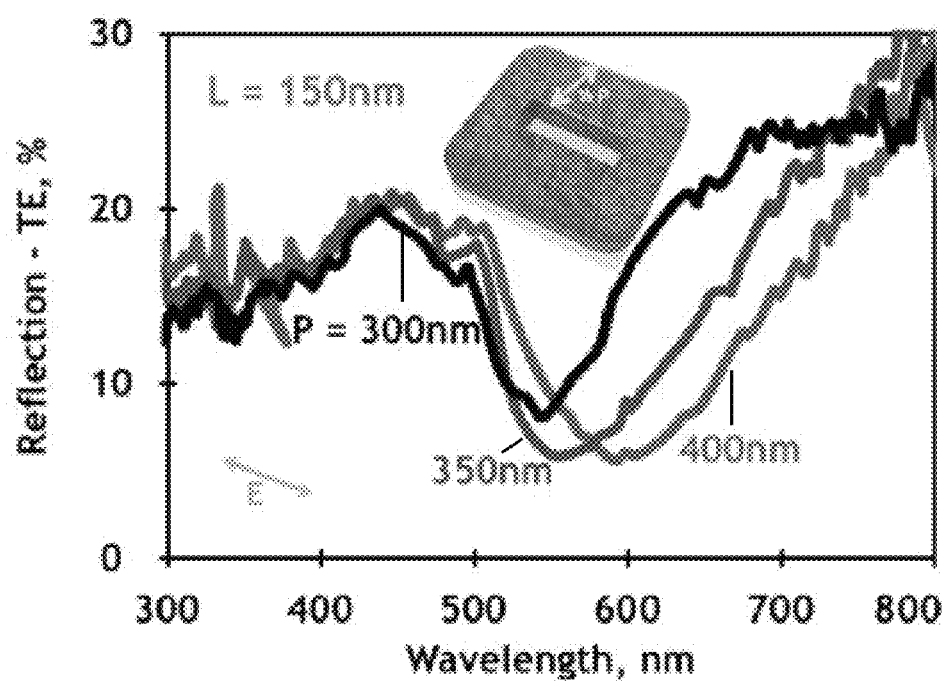
FIG. 4K is a plot of reflection percentage (%) as a function of wavelength (in nanometers or nm) showing the structural tuning (from period (P) of 300 nm to period of 400 nm) of the experimental reflection spectra for traverse electric (TE) polarized light according to various embodiments.
Figure 4L:
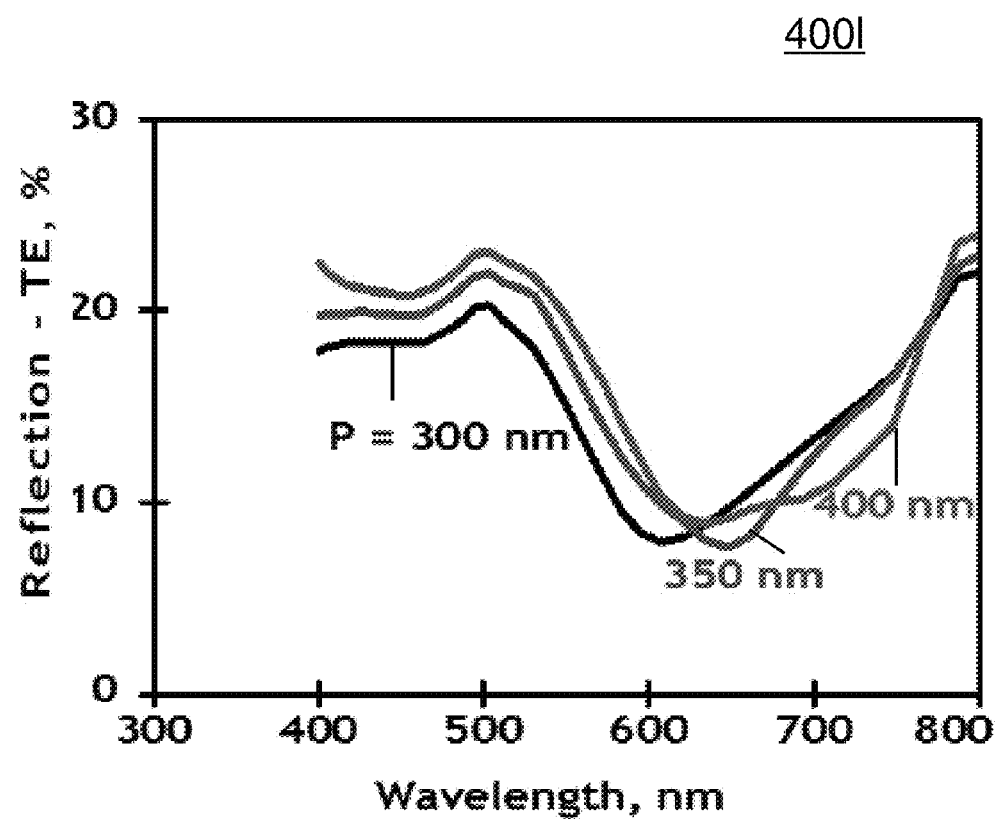
FIG. 4L is a plot of reflection percentage (%) as a function of wavelength (in nanometers or nm) showing the structural tuning (from period (P) of 300 nm to period of 400 nm) of the simulated reflection spectra for traverse electric (TE) polarized light according to various embodiments. The experimental results show good agreement with the simulated results.
Figure 4M:
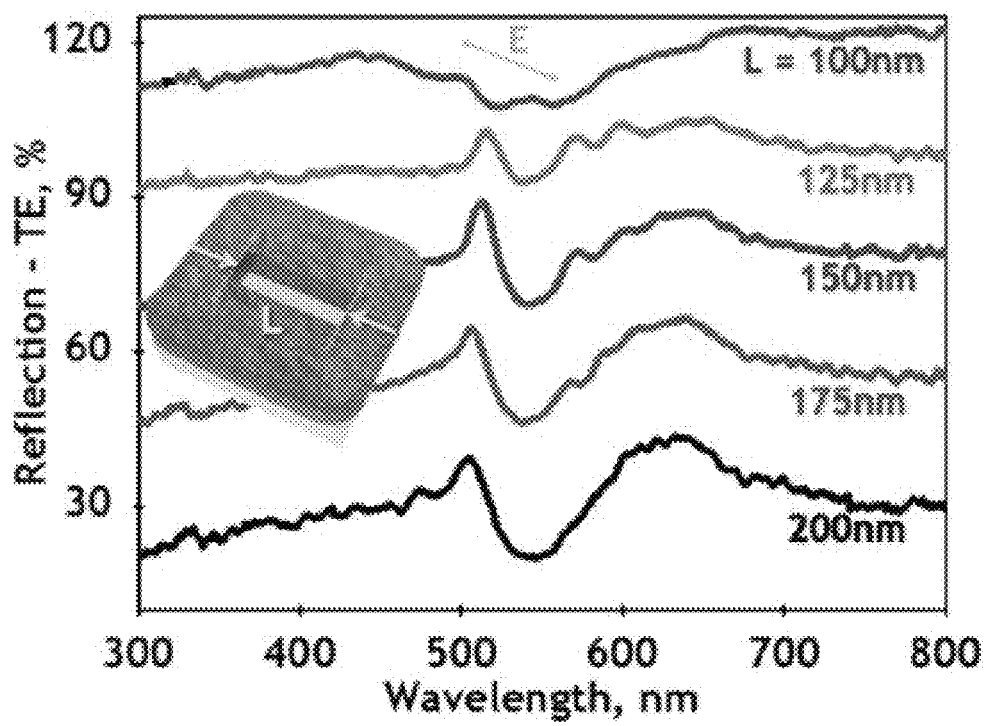
FIG. 4M is a plot of reflection percentage (%) as a function of wavelength (in nanometers or nm) showing experimental structural tuning of traverse electric (TE) incident light by adjusting the length (L) of the nanoslits according to various embodiments.
Figure 4N:
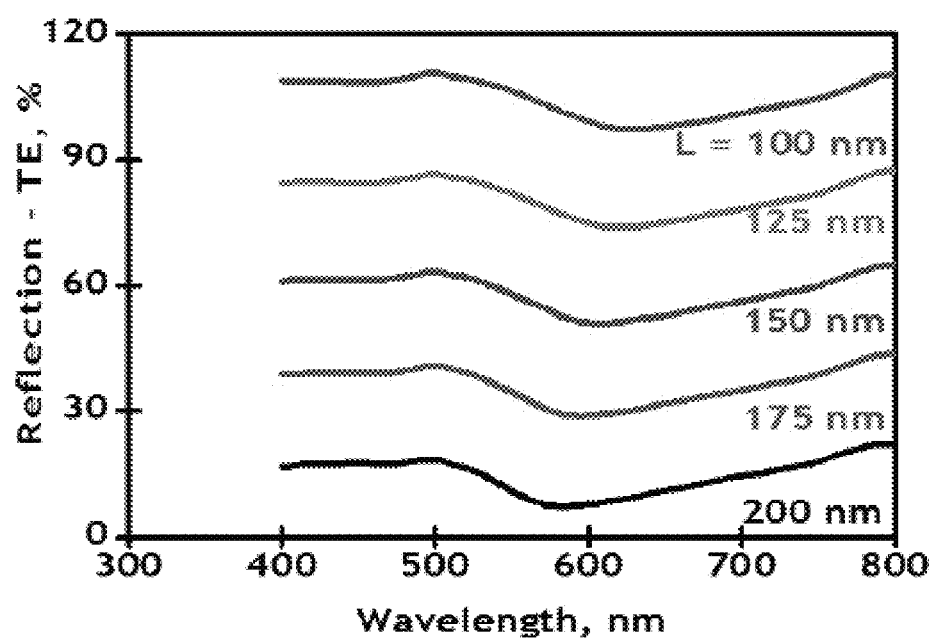
FIG. 4N is a plot of reflection percentage (%) as a function of wavelength (in nanometers or nm) showing simulated structural tuning of traverse electric (TE) incident light by adjusting the length (L) of the nanoslits according to various embodiments.

FIG. 4K is a plot 400k of reflection percentage (%) as a function of wavelength (in nanometers or nm) showing the structural tuning (from period (P) of 300 nm to period of 400 nm) of the experimental reflection spectra for traverse electric (TE) polarized light according to various embodiments. FIG. 4L is a plot 400l of reflection percentage (%) as a function of wavelength (in nanometers or nm) showing the structural tuning (from period (P) of 300 nm to period of 400 nm) of the simulated reflection spectra for traverse electric (TE) polarized light according to various embodiments. The experimental results show good agreement with the simulated results. FIG. 4M is a plot 400m of reflection percentage (%) as a function of wavelength (in nanometers or nm) showing experimental structural tuning of traverse electric (TE) incident light by adjusting the length (L) of the nanoslits according to various embodiments. FIG. 4N is a plot 400n of reflection percentage (%) as a function of wavelength (in nanometers or nm) showing simulated structural tuning of traverse electric (TE) incident light by adjusting the length (L) of the nanoslits according to various embodiments. The different plots in each of FIGS. 4C and 4M-N are off-setted by different amounts along the y axes.

Similar to their nanograting counterparts, the optical resonances of nanoslit metasurfaces for TE incident polarization may appear at spectral positions directly proportional to their respective periods (FIG. 4B). As the period of the metasurfaces is increased, their resonances may redshift in energy and broaden, which is in agreement with simulated spectra of the respective structures (FIGS. 4L, 4M). Within nanoslit metasurfaces, the optical response for TM incident light may be effectively tuned by varying the length of each nanoslit metamolecule. This may allow controlling the anisotropy of the structures: for more isotropic geometries of the metamolecules (e.g., L=150 nm, P=300 nm), the response to TM and TE incident light becomes almost identical (FIGS. 4C, 4D). Governed by the same principles as the nanograting metasurfaces, the distribution of electric and magnetic fields at the resonant frequencies may be strongly confined within the dielectric perovskite films (FIGS. 4E-4G). Similarly, the enhancement of reflectivity in particular spectral windows may result from the interplay between the single nanoslit scattering resonances and the coupling to guided and diffracted modes in the perovskite film. In this case, both TE and TM responses may be characterised by the excitation of anti-phased displacement currents (in the ±z direction), along the edges of the nanoslits and leaky modes in the perovskite/substrate interface (FIGS. 4E, 4F), alongside a circulating pattern of magnetic field within the perovskite (FIGS. 4I, 4J).

So far, it has been shown that a wide palette of structural resonances may be achieved in thin perovskite films by adjusting nanograting periods and slit metamolecule geometries. In addition, variations in the milling depth may provide access to a significant portion of the visible colour space.

Figure 5A:
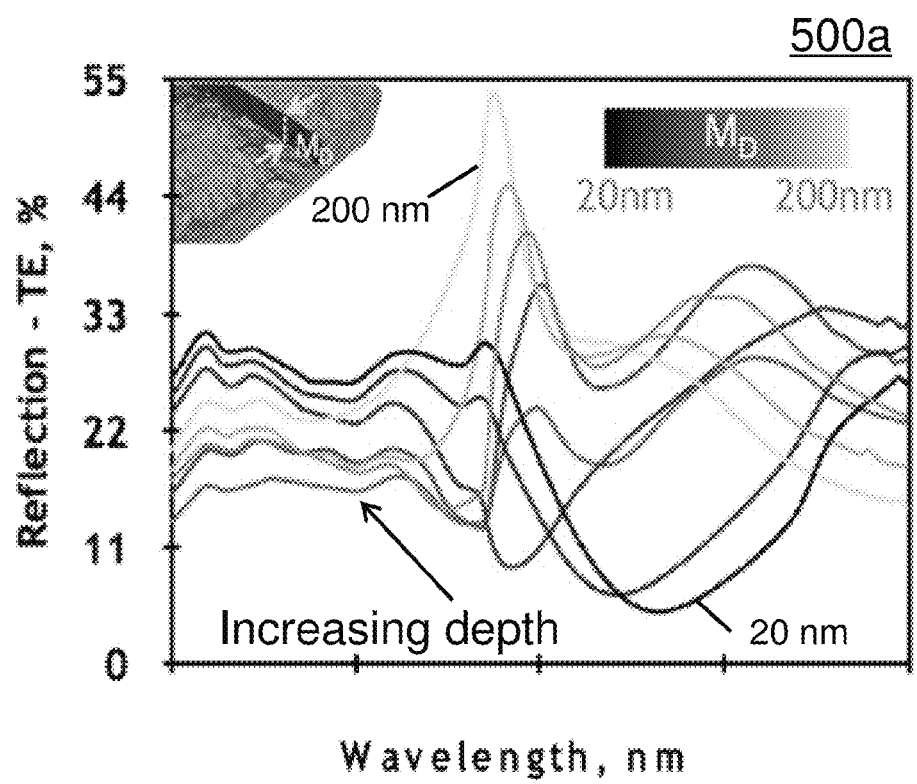
FIG. 5A is a plot 500a of percentage reflection (in percent or %) of the traverse electric (TE) mode as a function of wavelength (in nanometers or nm) showing the reflection spectra for nanograting metasurface with varying mill depths from 200 nm (fully etched) to 20 nm etch depth according to various embodiments.
Figure 5B:
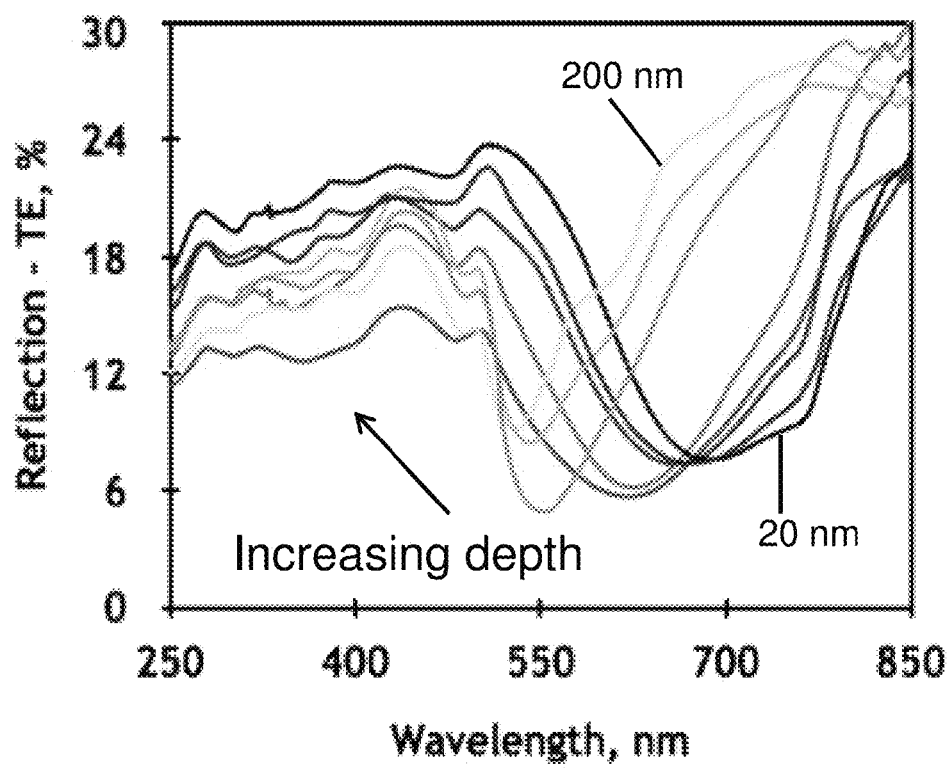
FIG. 5B is a plot of percentage reflection (in percent or %) of the traverse electric (TE) mode as a function of wavelength (in nanometers or nm) showing the reflection spectra for nanoslit metasurface with varying mill depths from 200 nm (fully etched) to 20 nm etch depth according to various embodiments.

FIG. 5A is a plot 500a of percentage reflection (in percent or %) of the traverse electric (TE) mode as a function of wavelength (in nanometers or nm) showing the reflection spectra for nanograting metasurface with varying mill depths from 200 nm (fully etched) to 20 nm etch depth according to various embodiments. FIG. 5B is a plot 500b of percentage reflection (in percent or %) of the traverse electric (TE) mode as a function of wavelength (in nanometers or nm) showing the reflection spectra for nanoslit metasurface with varying mill depths from 200 nm (fully etched) to 20 nm etch depth according to various embodiments.

Figure 5C:
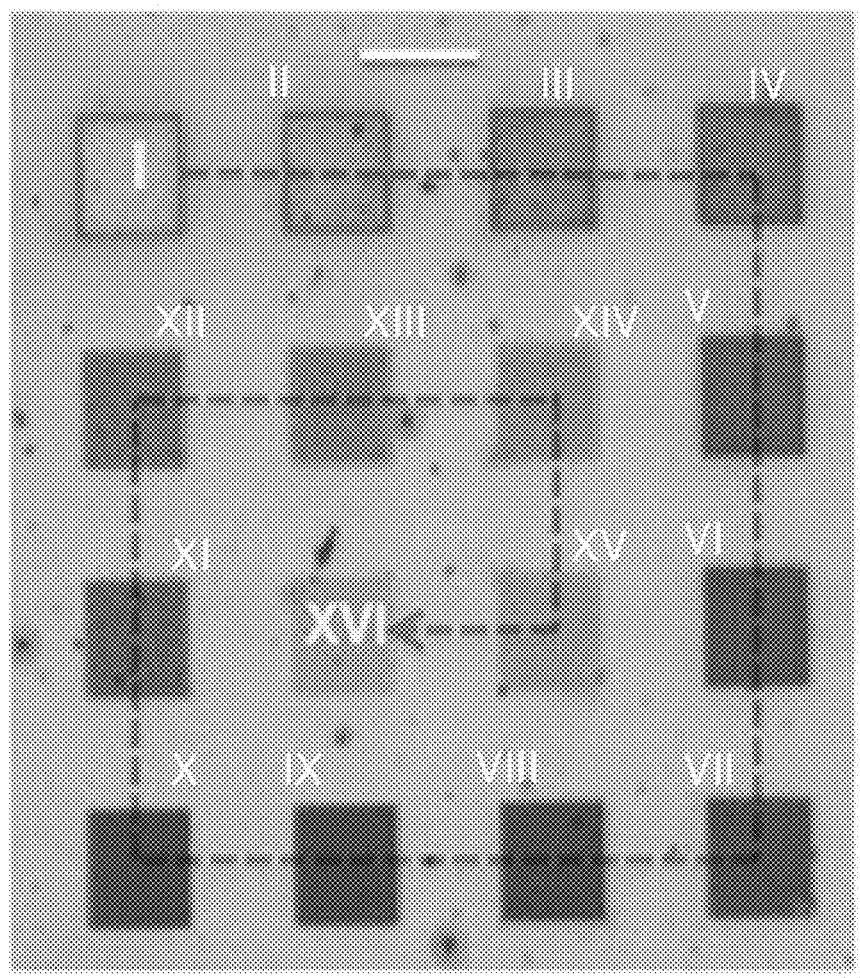
FIG. 5C is an unpolarised optical microscope image of nanograting metasurfaces (with a period (P) of 350 nm) with 16 different mill depths ranging from ~200 nm (grating I) to ~20 nm (grating XVI) mill depths according to various embodiments.

FIG. 5C is an unpolarised optical microscope image 500c of nanograting metasurfaces (with a period (P) of 350 nm) with 16 different mill depths ranging from ~200 nm (grating I) to ~20 nm (grating XVI) mill depths according to various embodiments.

Figure 5D:
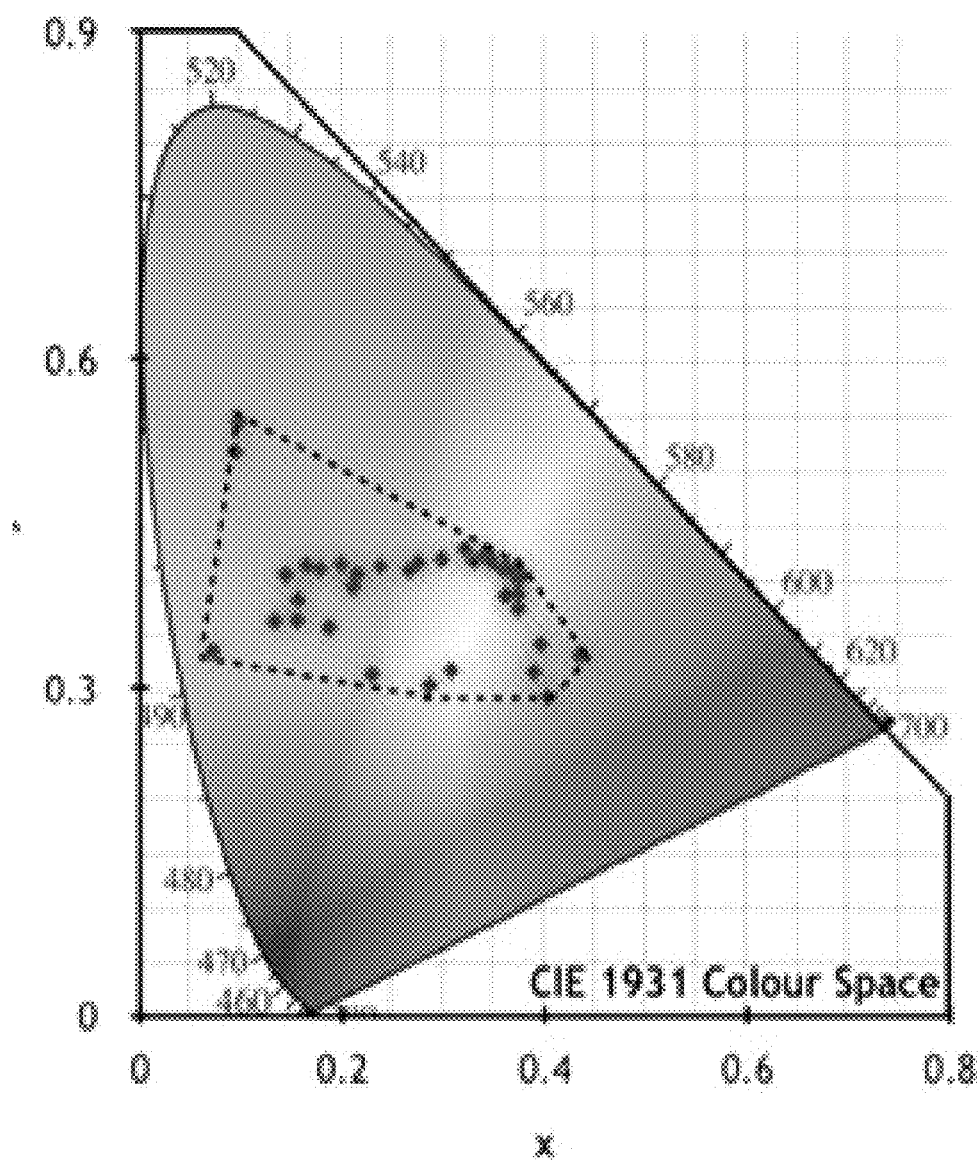
FIG. 5D shows a CIE 1931 colour space palette with marked points for a selection of the nanograting metasurfaces created according to various embodiments.

FIG. 5D shows a CIE 1931 colour space palette 500d with marked points for a selection of the nanograting metasurfaces created according to various embodiments.

Figure 5E:
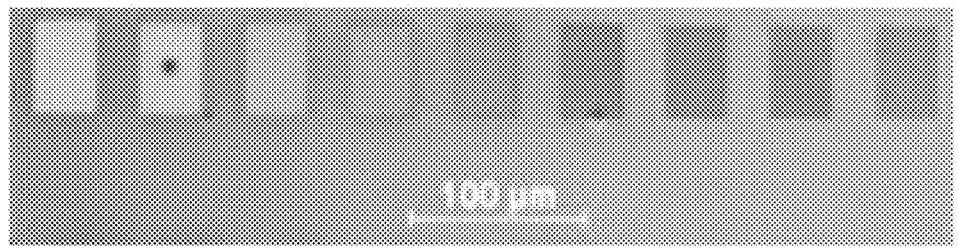
FIG. 5E is an optical microscope image of nanoslits according to various embodiments showing a range of vibrant colours.

FIG. 5E is an optical microscope image 500e of nanoslits according to various embodiments showing a range of vibrant colours.

FIGS. 5A-B show the spectral response of nanograting and nanoslit metasurfaces with a constant period of about 350 nm to TE incident light polarization, as a function of milling depths into the perovskite film. For example, in the case of the nanogratings as shown in FIG. 5A, for large mill depths, reflection resonances red shift by decreasing etch depth, while at shallower mill depths, the pronounced peak in reflection is eventually suppressed and a resonant dip starts to dominate the response, which red shifts and broadens at shallower depths. As illustrated in the optical microscope image in FIGS. 5C, 5E and CIE 1931 colour space in FIG. 5D, the colour variation may cover a wide range of colour coordinates from yellow, red, green to blue. As opposed to colouring achieved by chemical and compositional variation of the perovskite film, the vibrant colouring observed from nanograting and nanoslit metasurfaces may be completely determined by structural design, and may be made dependent or independent on the polarization of incident light by the choice of metamolecule geometry. The parameter space for metamolecule design may be almost unlimited and different resonator geometries may extend the accessible colour range shown for a selection of various metasurfaces fabricated. That said, 'pure' colours found at the boundaries of the CIE 1931 standard colour space may present a significant challenge, as they require suppression of reflectivity across all but a narrow band of the visible spectrum.

Among other high index dielectric platforms, organolead halide perovskites may offer a low cost solution processable material platform with a vast compositional space capable of being spincoated onto various substrates and may offer a range of applications in energy harvesting and light emission. In particular, demonstration of colour tunable perovskite metasurfaces combined with large area structuring techniques such as nanoimprint lithography may open up several opportunities for mass manufactured solution processed device applications. Possible areas of interest may include optimisation of thin film absorption in broadband perovskite photovoltaic cells and semi-transparent colour solar cells for building integrated photovoltaics. In addition, structural colouring may not be limited to modification of linear absorption and reflection of films; rather, it may be employed to modify the light emission properties of perovskite LEDs and lasers. Methylammonium lead iodide along with various other similar perovskites may emit strong and broad photoluminescence (PL) around their band gap energy of ~1.6 eV.

Figure 6A:
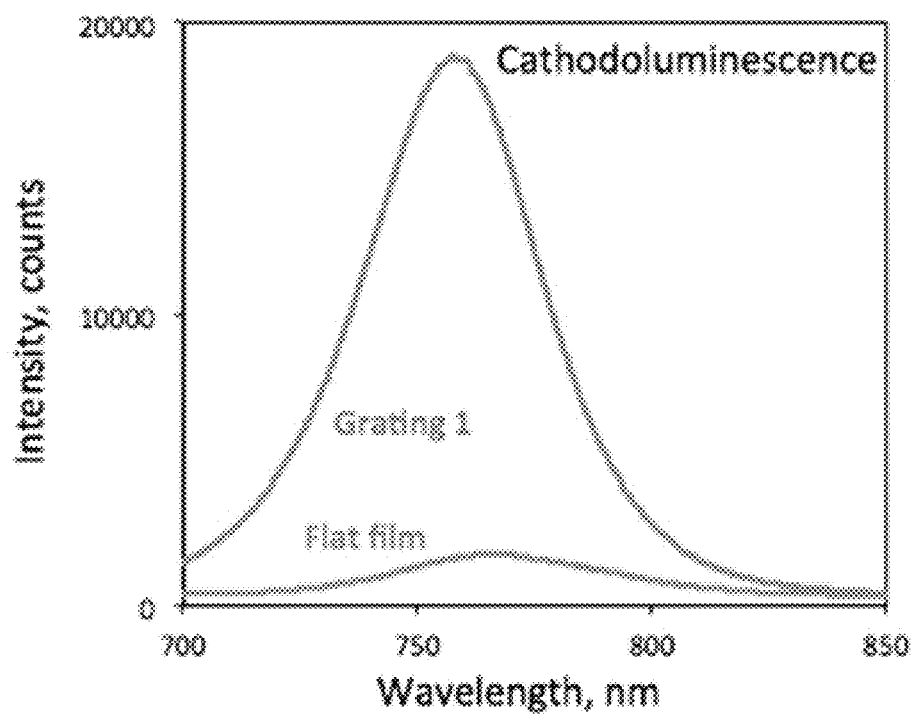
FIG. 6A is a plot of intensity (counts) as a function of wavelength (in nanometers or nm) showing the cathodoluminescence (CL) of a grating milled into a perovskite film according to various embodiments, showing a clear enhancement of above one order of magnitude when compared to an unstructured film.

FIG. 6A is a plot 600a of intensity (counts) as a function of wavelength (in nanometers or nm) showing the cathodoluminescence (CL) of a grating milled into a perovskite film according to various embodiments, showing a clear enhancement of above one order of magnitude when compared to an unstructured film.

Figure 6B:
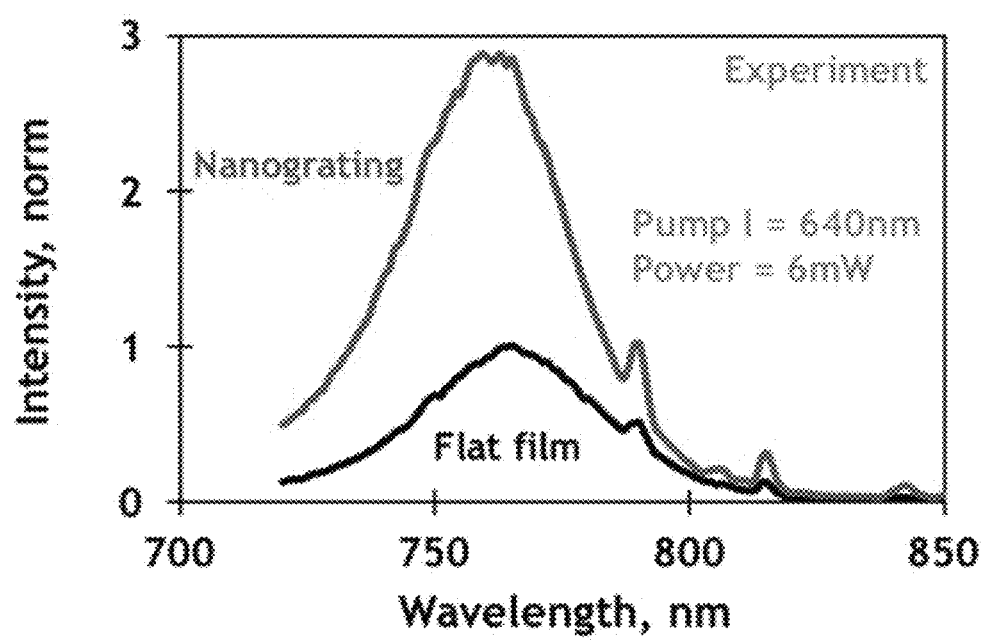
FIG. 6B is a plot of intensity (normalized) as a function of wavelength (in nanometers or nm) showing the photoluminescence (PL) of a grating milled into a perovskite film (with period (P) of 350 nm) according to various embodiments, showing a clear enhancement of about 3 when compared to an unstructured film.
Figure 6C:
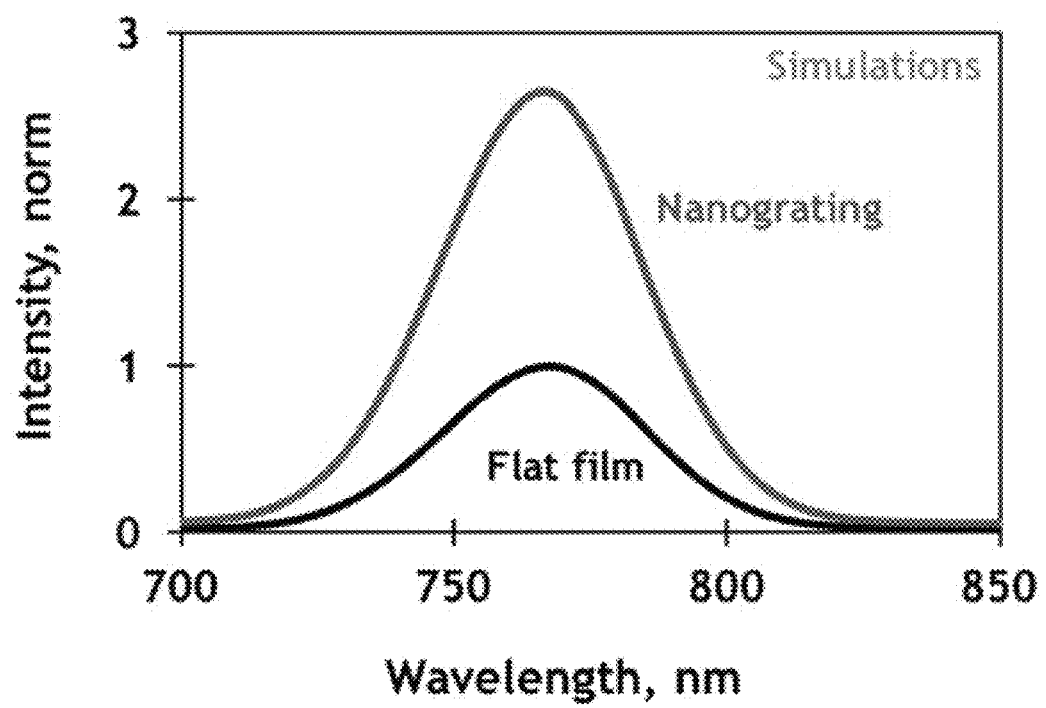
FIG. 6C is a plot of intensity (normalized) as a function of wavelength (in nanometers or nm) showing the simulated emission of unpolarized light for the flat film and the nanograting according to various embodiments.
Figure 6D:
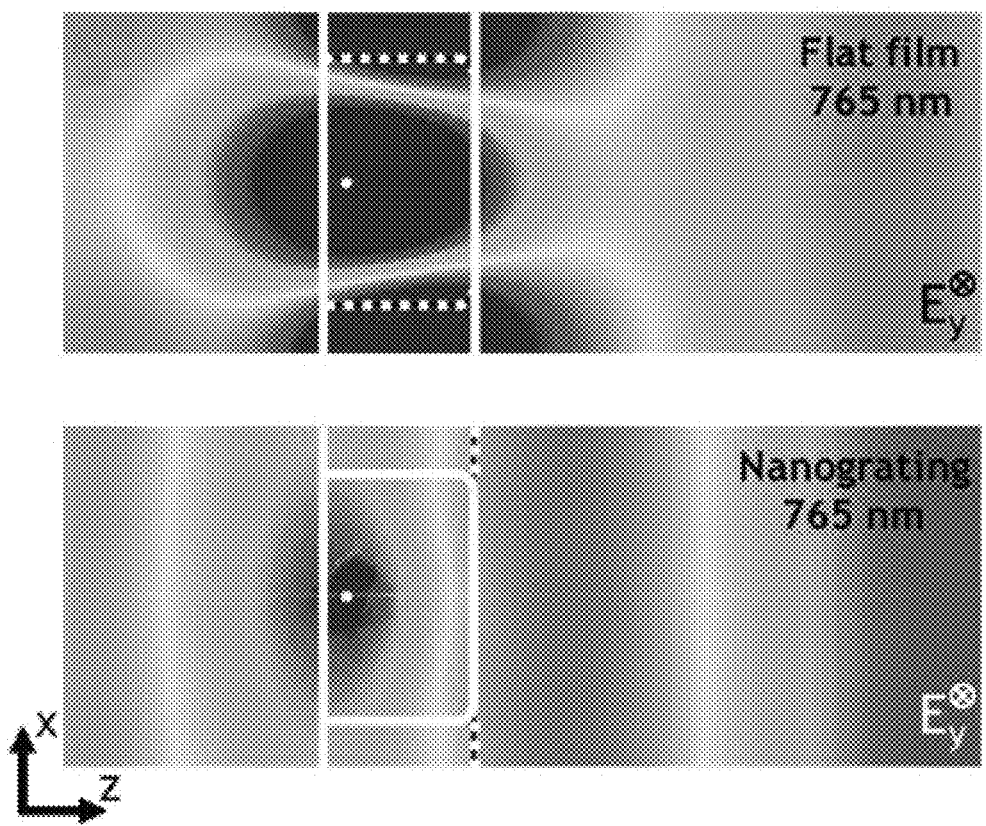
FIG. 6D shows field maps of γ-oriented dipole radiation in the case of the flat film (top panel) and the nanograting (bottom panel) according to various embodiments.
Figure 6E:
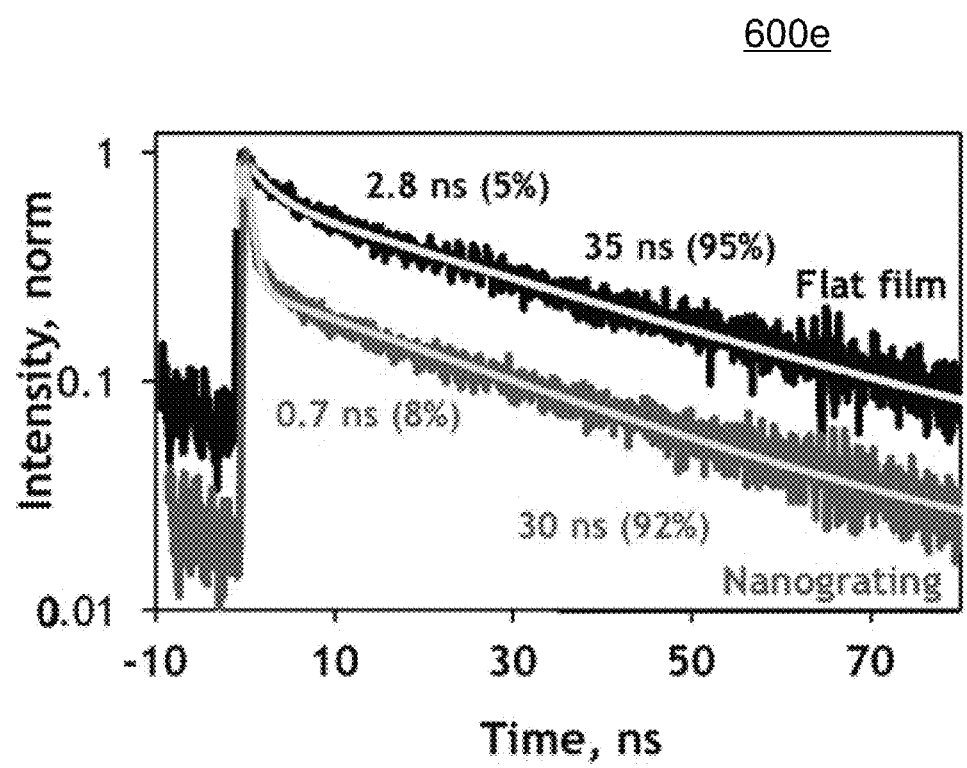
FIG. 6E is a plot of intensity (normalized) as a function of time (in nanoseconds or ns) showing the time resolved photoluminescence (PL) emission decay at the spectral maximum for the flat film and the film with the grating according to various embodiments.

FIG. 6B is a plot 600b of intensity (normalized) as a function of wavelength (in nanometers or nm) showing the photoluminescence (PL) of a grating milled into a perovskite film (with period (P) of 350 nm) according to various embodiments, showing a clear enhancement of about 3 when compared to an unstructured film. FIG. 6C is a plot 600c of intensity (normalized) as a function of wavelength (in nanometers or nm) showing the simulated emission of unpolarized light for the flat film and the nanograting according to various embodiments. FIG. 6D shows field maps 600d of γ-oriented dipole radiation in the case of the flat film (top panel) and the nanograting (bottom panel) according to various embodiments. FIG. 6E is a plot 600e of intensity (normalized) as a function of time (in nanoseconds or ns) showing the time resolved photoluminescence (PL) emission decay at the spectral maximum for the flat film and the film with the grating according to various embodiments. The TE excitation occurs at a wavelength of about 640 nm and unpolarized detection is centered at a wavelength of about 760 nm. Deconvolution fitting of double exponential decay with instrument response function has been carried out with best-fit parameters highlighted in the figure.

As demonstrated in FIGS. 6A-E, the nanostructuring of a perovskite thin film to form the nanograting structure discussed earlier shows a clear enhancement of both cathodo- and photo-luminescence. The nanostructuring bring about a clear enhancement of the CL and PL with enhancement factors exceeding 10 and 3 respectively in an all-perovskite structure. The luminescence enhancement may be a clear manifestation of the Purcell effect and may be controlled by the metamaterial's design. Indeed, the spontaneous emission decay rate may be proportional to the density of photon states that the photonic environment offers for spontaneous radiative decay.

The far-field photoluminescence enhancement may be well reproduced by full-wave electromagnetic simulations (FIG. 6C) of infinitesimally small dipoles placed within the perovskite, using spectral distribution of emitters from steady state PL, with radiation strength proportional to the simulated optical absorption at dipole location. This may also help in understanding the role played by the electromagnetic modes of the nanostructured high refractive index dielectric metamaterial in the reradiation of the light generated in the perovskite (FIG. 6D). The modes created due to nanostructuring of the film may enhance light-matter interaction and may increase the density of photon states. Time-resolved PL measurements indicate that the prompt radiative decay rate in the nanogratings ($\tau \approx 0.7$ ns) may be three or four times larger than in the unstructured film (e.g. $\tau \approx 2.8$ ns), consistent with the Purcell enhancement factor determined from steady-state PL measurements, which do not account for nonradiative processes (FIG. 6E).

As discussed earlier, due to the high refractive index of the perovskite, the electric and magnetic field distribution is confined inside the nanostructured dielectric at the resonance of the metamaterial facilitating the coupling of incident photon or electron stimuli into the guided modes of the nanograting metamaterial, enhancing light-matter interaction, creating an environment equivalent to a microcavity with a mode confined in an ultrasmall volume, that enhances the density of photon states leading to the Purcell factor enhancement of luminescence. This can also be extended to other recently emerging white-light emitting perovskite compounds ($EDBEPbX_4$, where X=Cl, Br) that when structured by for instance, nanoimprint lithography could enable large area colour LEDs and displays with a single active layer material. Furthermore, the possibility to design mode confinement and polarisation dependant response in nanostructured light emitting perovskites may also be exploited for optimising light management and improving extraction within LED and laser structures.

The concept of nanostructuring may be extended to a variety of organometallic hybrid perovskites leveraging on the great synthetic versatility which allows the fabrication of materials with different structures and tunable optoelectronic properties.

The standard perovskite structure may be identified with the general formula $AMX_3$, where A is a monovalent cation (e.g. alkali metal (e.g. $Li^+$, $Na^+$, $K^+$, $Rb^+$, $Cs^+$) or small organic cations), M may be a divalent cation, such as a group IV element (e.g. $Ge^{2+}$, $Sn^{2+}$, $Pb^{2+}$) but may also be an alkaline earth, transition and rare earth metal, and X may be a halide (e.g. $F^-$, $Cl^-$, $Br^-$, $I^-$). Such structure may be regarded as a 3D perovskite, characterized by a continuous 3D network of corner-sharing octahedra $MX_6$ with the 12-fold coordinated A cations occupying the cuboctahedral cavities of the system.

Figure 7A:
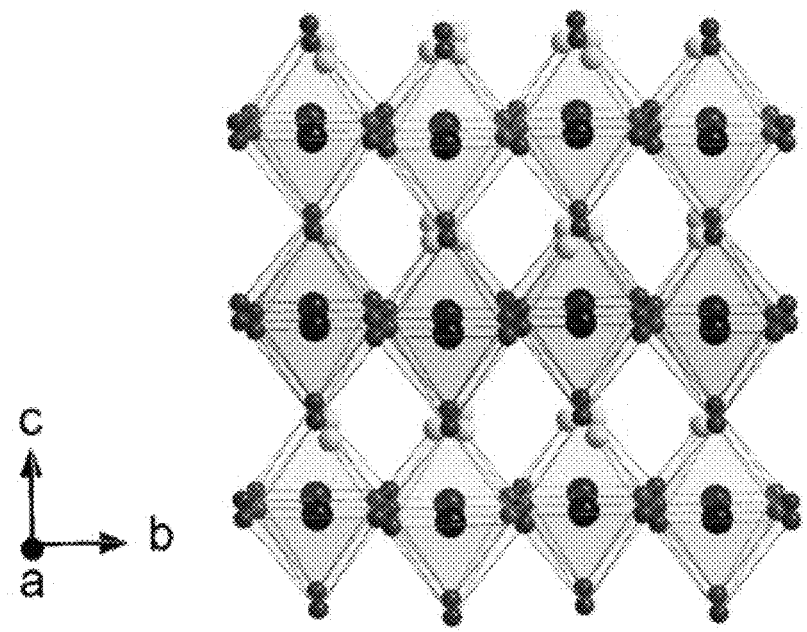
FIG. 7A is a schematic of a three-dimensional (3D) perovskite $AMX_3$ seen along the <100> crystallographic direction according to various embodiments.
Figure 7B:
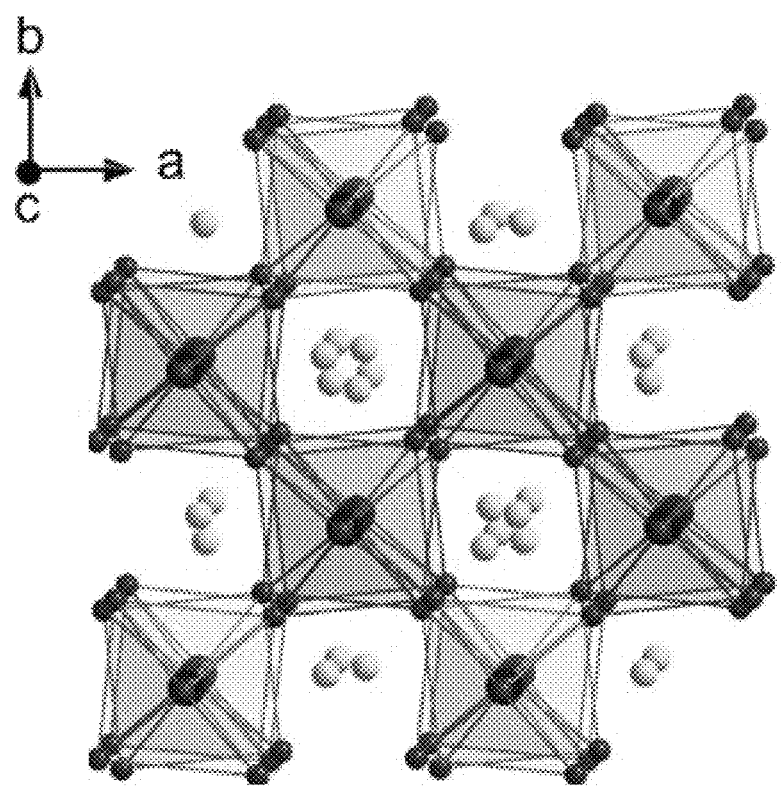
FIG. 7B is a schematic of the three-dimensional (3D) perovskite $AMX_3$ seen along the <110> crystallographic direction according to various embodiments.
Figure 7C:
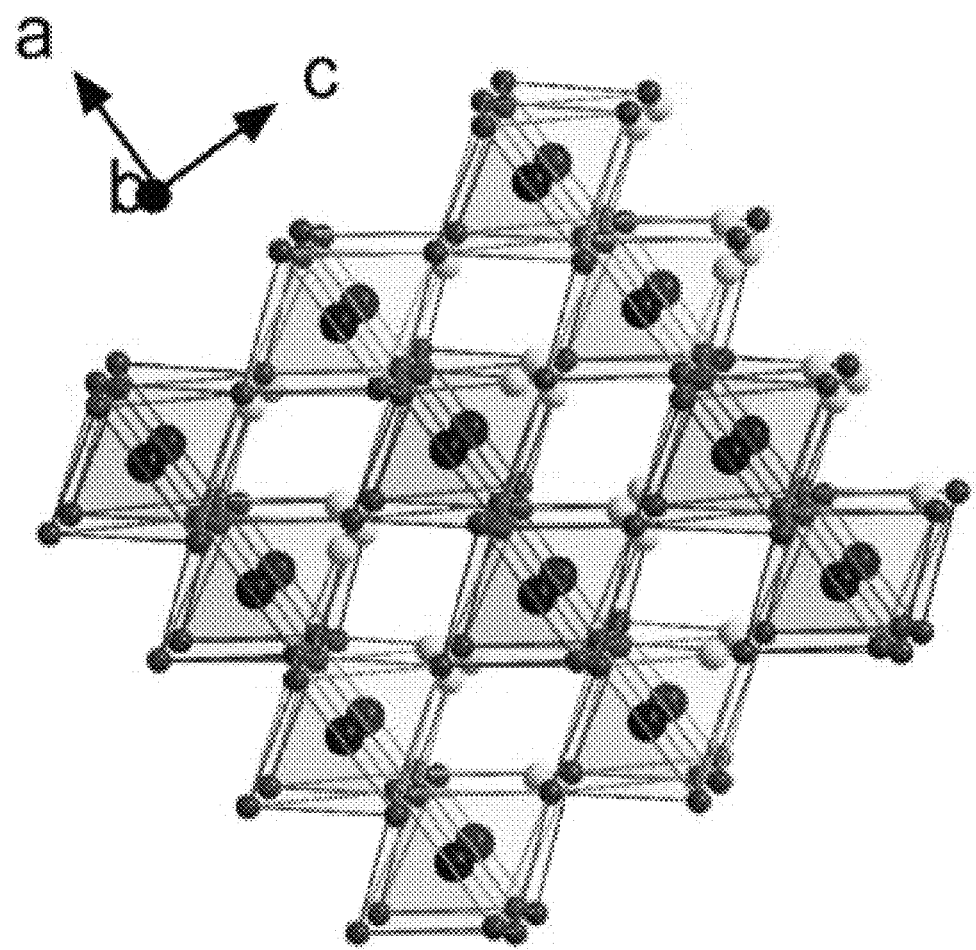
FIG. 7C is a schematic of the three-dimensional (3D) perovskite $AMX_3$ seen along the <111> crystallographic direction according to various embodiments.

FIG. 7A is a schematic 700a of a three-dimensional (3D) perovskite $AMX_3$ seen along the <100> crystallographic direction according to various embodiments. FIG. 7B is a schematic 700b of the three-dimensional (3D) perovskite $AMX_3$ seen along the <110> crystallographic direction according to various embodiments. FIG. 7C is a schematic 700c of the three-dimensional (3D) perovskite $AMX_3$ seen along the <111> crystallographic direction according to various embodiments.

If bulky organic cations (B) are used, the steric constraints may induce structural rearrangement leading to the formation of crystal lattices where the octahedra $MX_{6-}$ share only partially their corners with their neighbours and the resulting inorganic framework is not continuous along all the 3 dimensions. A common example of this behaviour is the formation of 2D perovskites with general formula $BMX_4$, where inorganic sheets are stacked in alternation with organic layers creating a self-assembled multi-quantum well structure.

2D perovskites may be conceptually derived by cutting the 3D perovskite $AMX_3$ along different orientations <100>, <110> and <111> resulting in three different families of 2D perovskites. The orientation of the perovskite cut may deeply influence the structural properties of the material with strong consequences on the optoelectronic properties.

Figure 7D:
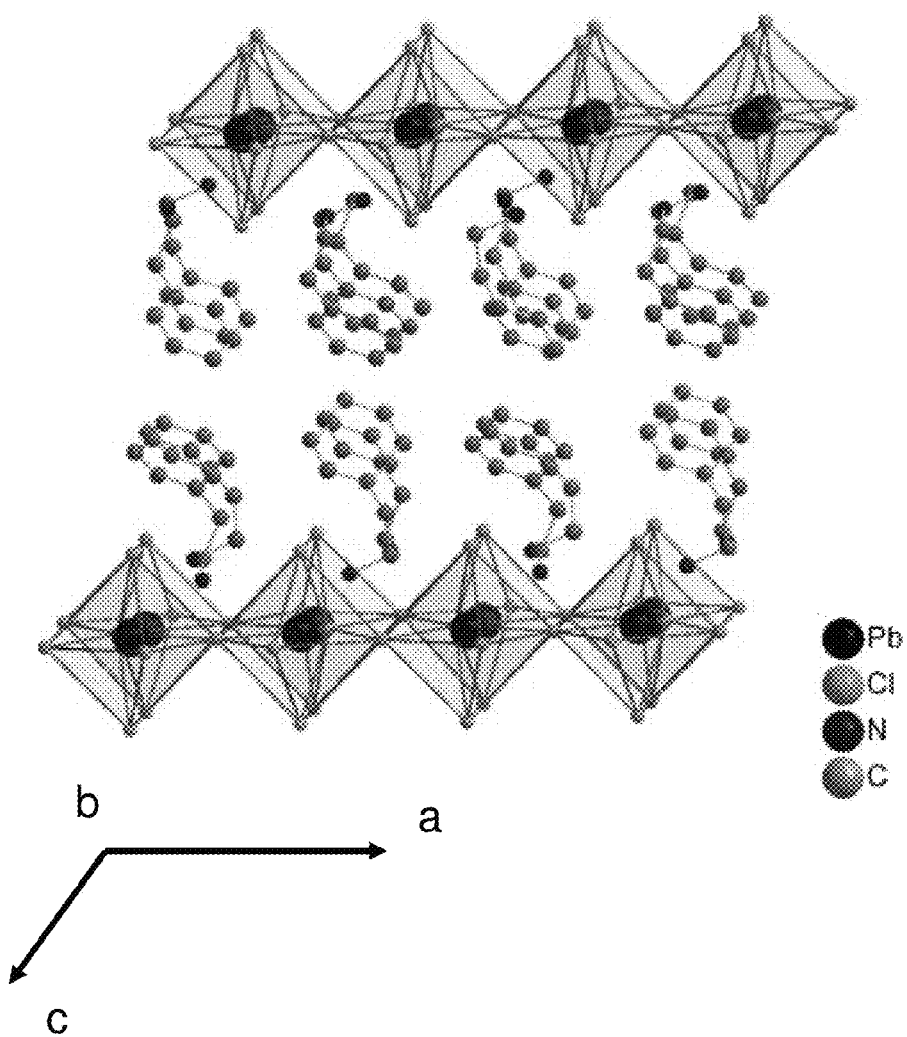
FIG. 7D is a schematic of a two-dimensional (2D) perovskite derived by cutting the three-dimensional (3D) perovskite in the <100> crystallographic direction according to various embodiments.

FIG. 7D is a schematic 700d of a two-dimensional (2D) perovskite derived by cutting the three-dimensional (3D) perovskite in the <100> crystallographic direction according to various embodiments. The <100>-oriented "flat" perovskites include, for example, $(PEA)_2PbX_4$ and and $(NBT)_2PbX_4$, where PEA=phenetylammonium and NBT=n-butylammonium.

Figure 7E:
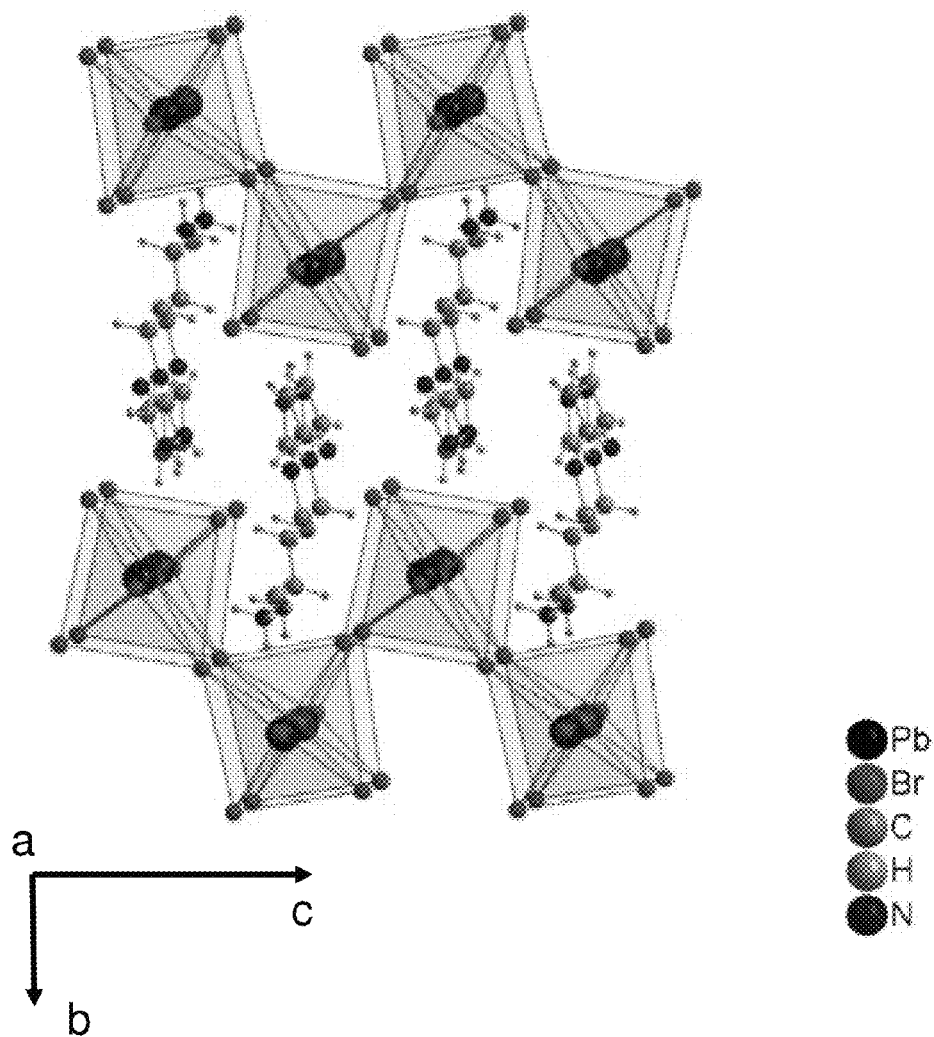
FIG. 7E is a schematic of a two-dimensional (2D) perovskite derived by cutting the three-dimensional (3D) perovskite in the <110> crystallographic direction according to various embodiments.

FIG. 7E is a schematic 700e of a two-dimensional (2D) perovskite derived by cutting the three-dimensional (3D) perovskite in the <110> crystallographic direction according to various embodiments. The "rippled"<110>-oriented perovskites include structures such as those of the broadband emitting perovskites $(EDBE)PbBr_4$ and $(API)PbBr_4$, where EDBE=2,2'-(ethylenedioxy)bis(ethylammonium) and API=N-(3-aminopropyl)imidazole.

Figure 7F:
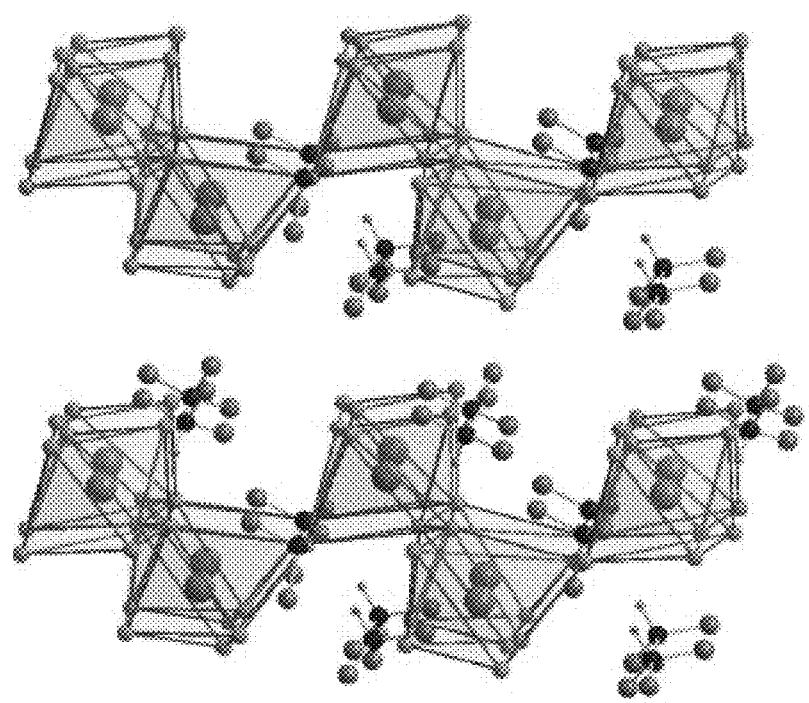
FIG. 7F is a schematic of a two-dimensional (2D) perovskite derived by cutting the three-dimensional (3D) perovskite in the <111> crystallographic direction according to various embodiments.

FIG. 7F is a schematic 700f of a two-dimensional (2D) perovskite derived by cutting the three-dimensional (3D) perovskite in the <111> crystallographic direction according to various embodiments. The <111>-oriented perovskites may be stabilized by the presence of trivalent metals like in the case of $(TMA)_3Sb_2Cl_9$, where TMA=trimethylammonium.

Figure 8A:
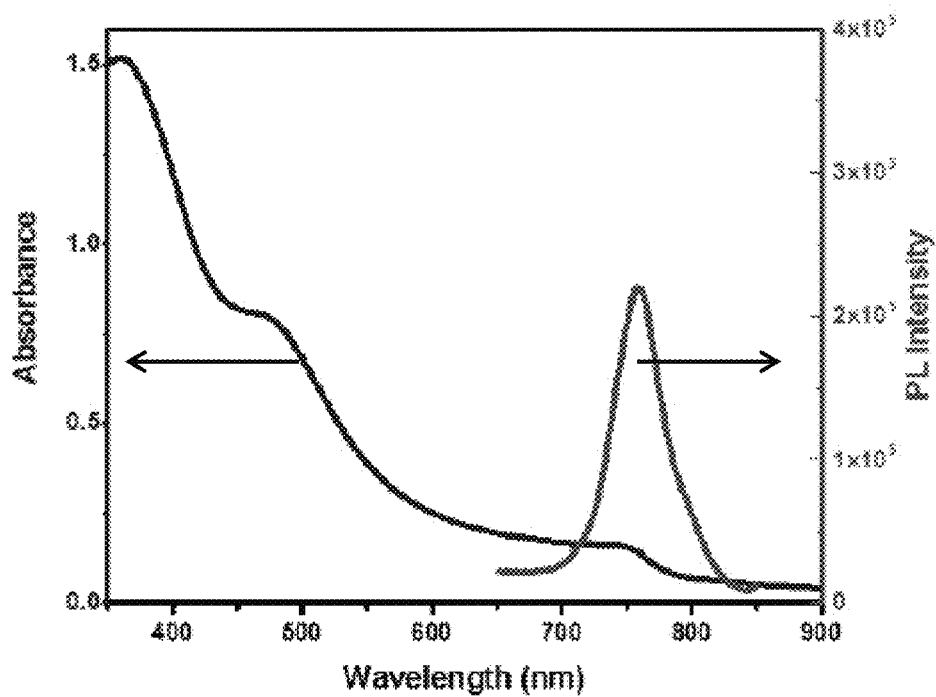
FIG. 8A is a plot of absorbance (in arbitrary units or a.u.)/photoluminescence (PL) intensity (counts) as a function of wavelength (in nanometers or nm) showing the absorption of $MAPbI_3$ according to various embodiments.
Figure 8B:
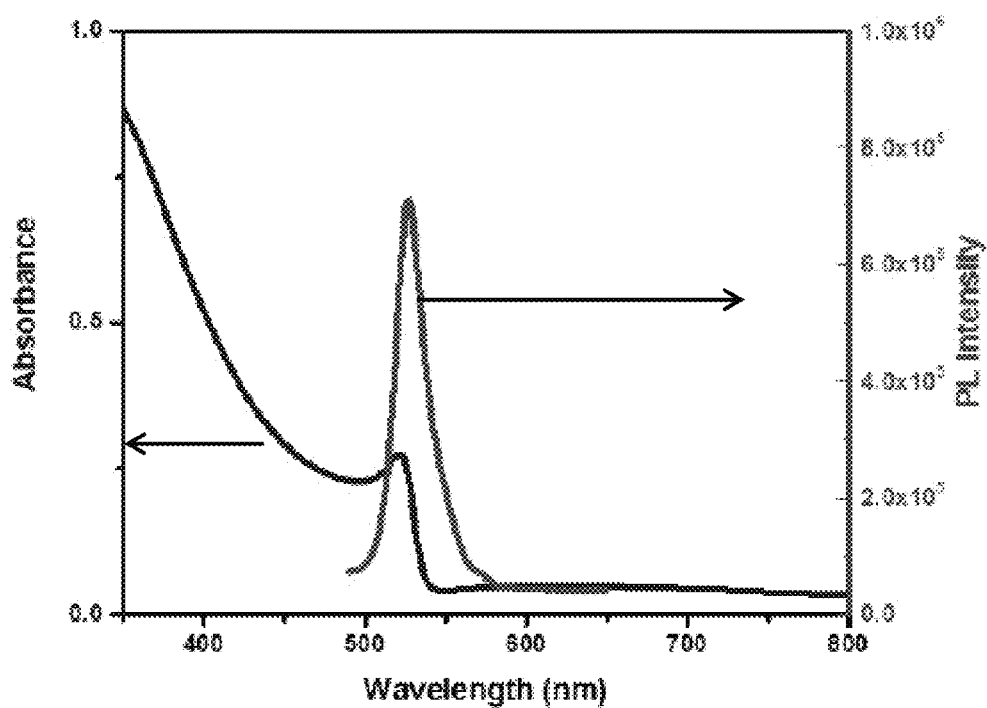
FIG. 8B is a plot of absorbance (in arbitrary units or a.u.)/photoluminescence (PL) intensity (counts) as a function of wavelength (in nanometers or nm) showing the absorption of $MAPbBr_3$ according to various embodiments.
Figure 8C:
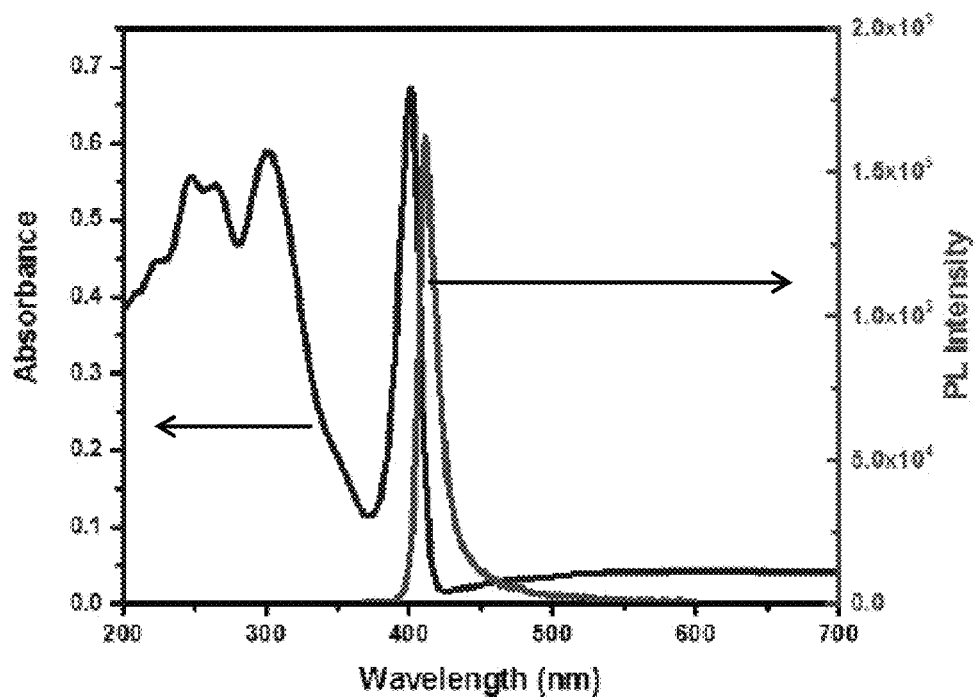
FIG. 8C is a plot of absorbance (in arbitrary units or a.u.)/photoluminescence (PL) intensity (counts) as a function of wavelength (in nanometers or nm) showing the absorption of $(NBT)_2PbBr_4$ according to various embodiments.
Figure 8D:
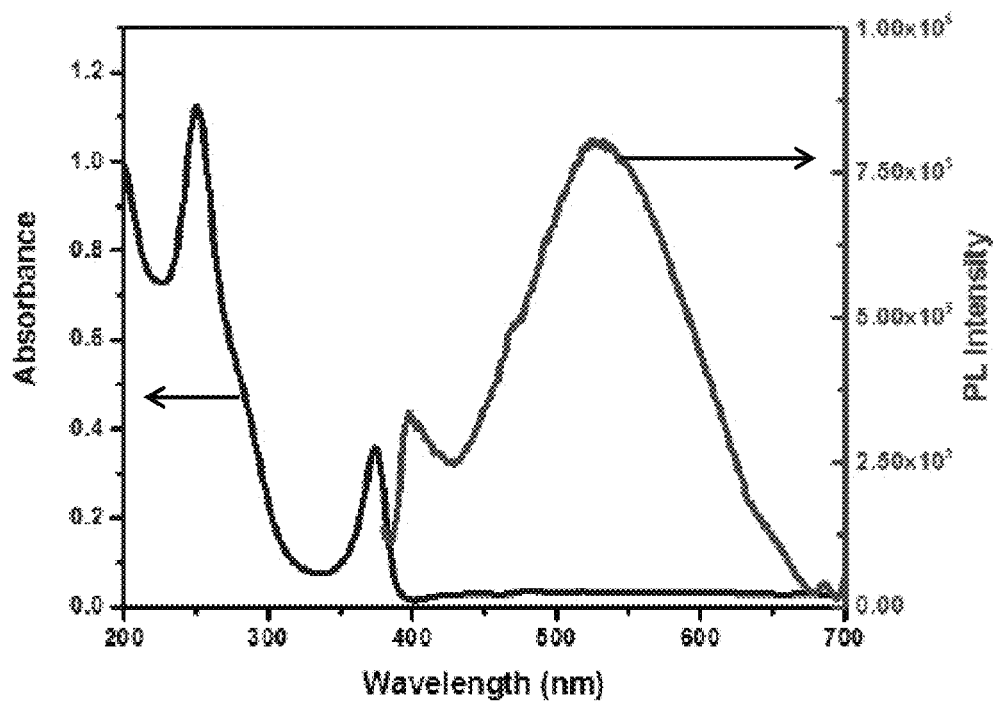
FIG. 8D is a plot of absorbance (in arbitrary units or a.u.)/photoluminescence (PL) intensity (counts) as a function of wavelength (in nanometers or nm) showing the absorption of $(EDBE)PbBr_4$ according to various embodiments.

The emissive properties of the hybrid perovskite can be tuned by changing the dimensionality and composition of the material. FIG. 8A is a plot 800a of absorbance (in arbitrary units or a.u.)/photoluminescence (PL) intensity (counts) as a function of wavelength (in nanometers or nm) showing the absorption of $MAPbI_3$ according to various embodiments. FIG. 8B is a plot 800b of absorbance (in arbitrary units or a.u.)/photoluminescence (PL) intensity (counts) as a function of wavelength (in nanometers or nm) showing the absorption of $MAPbBr_3$ according to various embodiments. FIG. 8C is a plot 800c of absorbance (in arbitrary units or a.u.)/photoluminescence (PL) intensity (counts) as a function of wavelength (in nanometers or nm) showing the absorption of $(NBT)_2PbBr_4$ according to various embodiments. FIG. 8D is a plot 800d of absorbance (in arbitrary units or a.u.)/photoluminescence (PL) intensity (counts) as a function of wavelength (in nanometers or nm) showing the absorption of $(EDBE)PbBr_4$ according to various embodiments.

For example, the bandgap of the 3D $MAPbX_3$ can be tuned by changing the halide and the correspondent emission can be shifted across the visible spectrum: FIGS. 8A-B show the photoluminescence of $MAPbI_3$ and $MAPbBr_3$ peaking at 760 nm and 530 nm, respectively. On the other hand, 2D perovskites may be engineered to have extremely narrowband excitonic emission (with full width at half maximum—FWHM—$\approx$20 nm) or extremely broadband, white-light luminescence with FWHM up to 200 nm: this is exemplified by the narrowband, blue emitter $(NBT)_2PbBr_4$ and the white-light emitter $(EDBE)PbBr_4$ shown in FIGS. 8C-D respectively.

The nanopatterning of perovskite films may further boost the tuning possibilities for application in light emitting devices. For example, the nanostructure may allow the fabrication of RGB pixel on white light emitters or enhance the emission of narrow PL bands by Purcell enhancement. Such mechanism shall be applicable to perovskite with different dimensionality (including their corresponding quantum dots). Additionally surface gratings and nanopatterning may allow engineering light management such as: controlling directivity and light extraction characteristics in light emitting devices; reducing emission threshold in perovskites lasers; enhancing photon recycling in photovoltaics; developing advanced emitting device concepts such as perovskite lasing spasers.

Top-performing perovskite based solar cells have now reached power conversion efficiencies above 20%, relying on cost-effective manufacturing process applicable to both rigid and flexible patterning (F. Fu et al, Nat. Energy 2016, 2, 16190).

Semi-transparent perovskite solar cells are attracting increasing attention for application in photovoltaic windows or building façades. Nanopatterning of the perovskite film may allow the fabrication of semi-transparent cells with colour tunable on demand to meet architectural and design needs. Moreover, perovskite texturing may improve capturing of light which is not at orthogonal incidence with benefit for the performance of building-integrated solar cells and indoor photovoltaic applications.

Figure 9A:
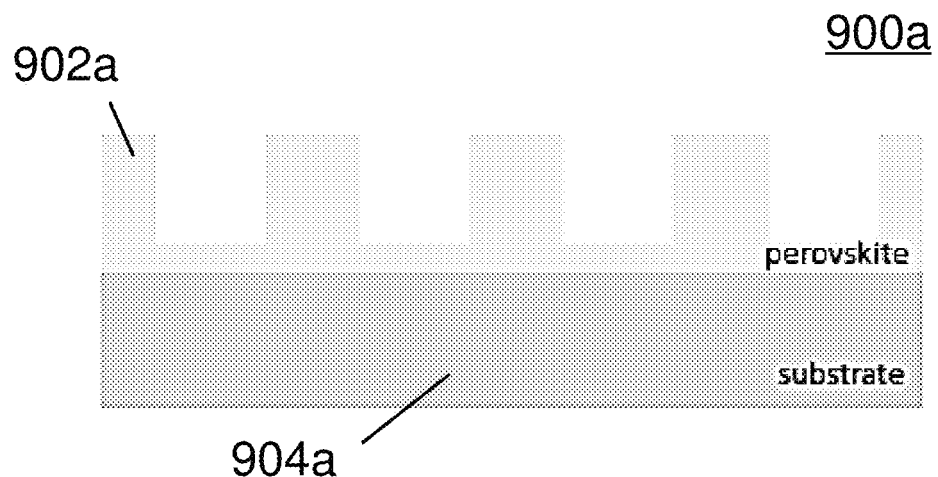
FIG. 9A shows a device including a halide perovskite structure according to various embodiments.

FIG. 9A shows a device 900a including a halide perovskite structure 902a according to various embodiments. The halide perovskite structure 902a, such as a halide perovskite film, may be patterned. The device 900a may further include a substrate 904a, and the patterned halide perovskite structure 902a, may be on or over the substrate 904a. The patterned surface of the halide perovskite structure 902a may face away from the substrate 904a.

Figure 9B:
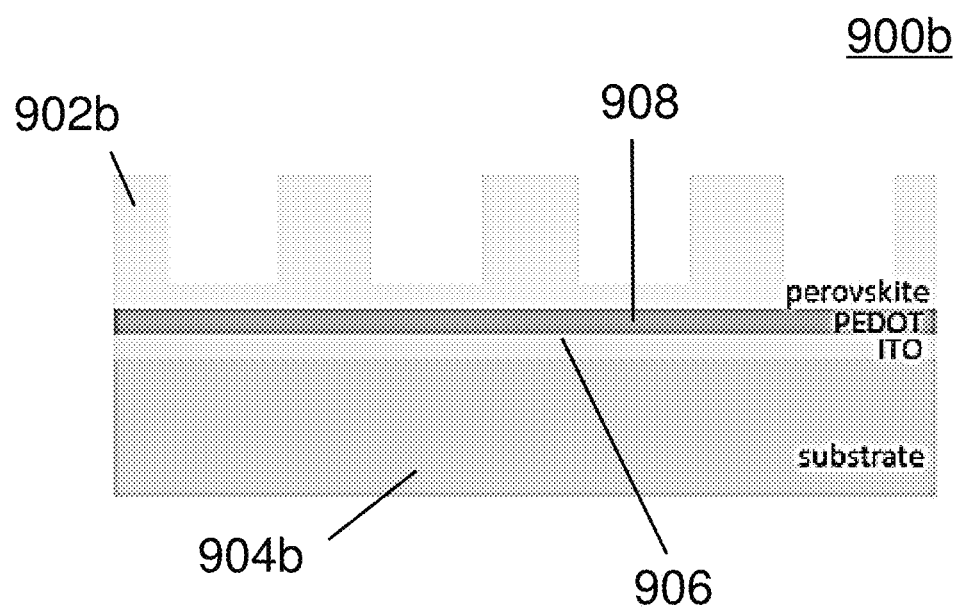
FIG. 9B shows a further device including a halide perovskite structure according to various embodiments.

FIG. 9B shows a further device 900b including a halide perovskite structure 902b according to various embodiments. The halide perovskite structure 902b, such as a halide perovskite film, may be patterned. The device 900b may further include a substrate 904b, and the patterned halide perovskite structure 902b may be over the substrate 904b. The patterned surface of the halide perovskite structure 902b may face away from the substrate 904b. The device 900b may further include a transparent conducting layer 906 (e.g. an indium tin oxide (ITO) layer) and a charge injection layer 908 (e.g poly(3,4-ethylenedioxythiophene) (PEDOT) layer) between the substrate 904b and the halide perovskite structure 902b. The transparent conducting layer 906 may be on or over the substrate 904b. The charge injection layer 908 may be on or over the transparent conducting layer 906. The halide perovskite structure 902b may be on or over the charge injection layer 908.

Figure 9C:
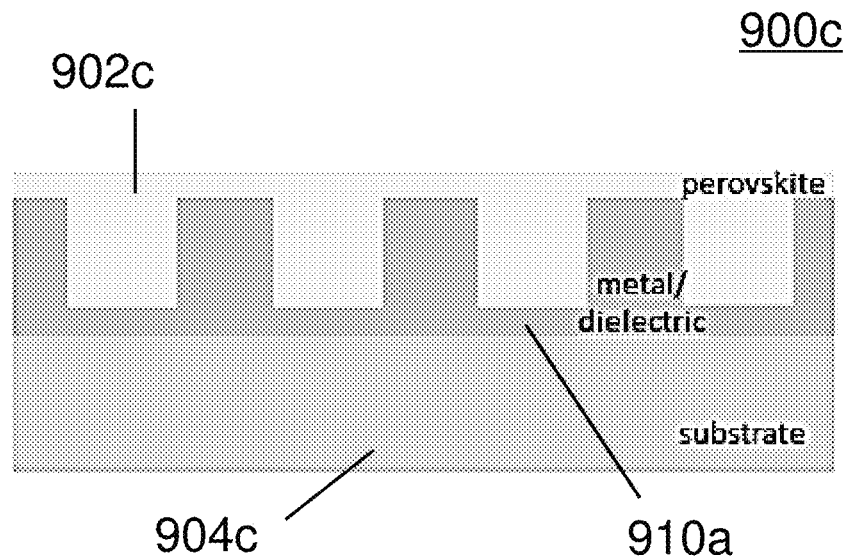
FIG. 9C shows a further device including a halide perovskite structure according to various embodiments.

FIG. 9C shows a further device 900c including a halide perovskite structure 902c according to various embodiments. The halide perovskite structure 902c, such as a halide perovskite film, may be patterned. The further device 900c may also include a substrate 904c, and the halide perovskite structure 902c may be above the substrate 904c. The patterned surface of the halide perovskite structure 902c may face towards the substrate 904c. The further device 900c may further include a further layer 910a between the halide perovskite structure 902c and the substrate 904c. The further layer 910a may be on or above the substrate 904c, and the halide perovskite structure 902c may be on or above the further layer 910a. The further layer 910a may be in contact with the patterned surface of the halide perovskite structure 902c, i.e. the surface including or having the pattern. A first surface of the further layer 910a may be in contact with the surface of the halide perovskite structure 902c including or having the pattern. A second surface of the further layer 910a opposite the first surface may be in contact with the substrate 904c. The further layer 910a may include a dielectric or a metal. The halide perovskite structure 902c may be formed on the metasurface of the further layer by spin-coating. The further layer 910a may be patterned by negative milling.

Figure 9D:
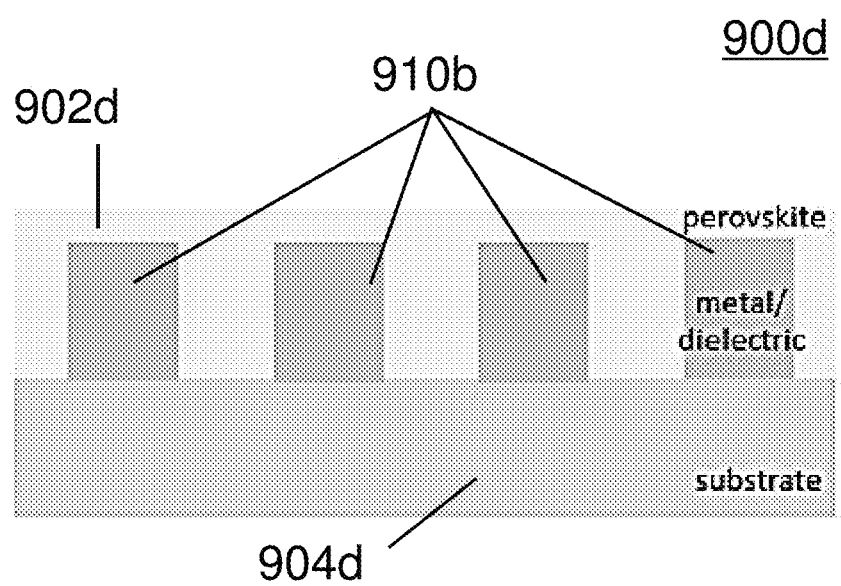
FIG. 9D shows a further device including a halide perovskite structure according to various embodiments.

FIG. 9D shows a further device 900d including a halide perovskite structure 902d according to various embodiments. The halide perovskite structure 902d, such as a halide perovskite film, may be patterned. The further device 900d may also include a substrate 904d, and the halide perovskite structure 902d may be above or at least partially in contact with the substrate 904d. The further device 900d may further include a further layer 910b between the halide perovskite structure 902d and the substrate 904d. The further layer 910b may be on the substrate 904d, and the further layer 910b may include openings such as through holes so that a portion of the halide perovskite structure 902d may be comprised in the openings. The halide perovskite structure 902d may be in contact with the substrate 904d through the openings. The further layer 910b may include a dielectric or a metal. The halide perovskite structure 902d may be formed on the metasurface of the further layer 910b by spin-coating. The further layer 910b may be patterned by positive milling.

Various embodiments may include or involve direct pattering of perovskites with focused ion beam milling. Various other embodiments may include or involve hybridization of perovskites with metasurfaces. Various embodiments may include metamaterial designs that extend beyond simple gratings or slits borrowing from the very extensive library of designs available. FIG. 9B shows a design that involves combination of multilayer structures which may allow the device 900b to be used as light emitting LED devices. Nanopatterning may be used to increase dielectric response of the perovskite resonators by controlling refractive index of active bottom layers 906, 908. FIG. 9C-D show two additional design concepts based on hybrid metamaterials/perovskites structures where the metamaterials can either be metallic (plasmonic) or dielectric.

Figure 10:
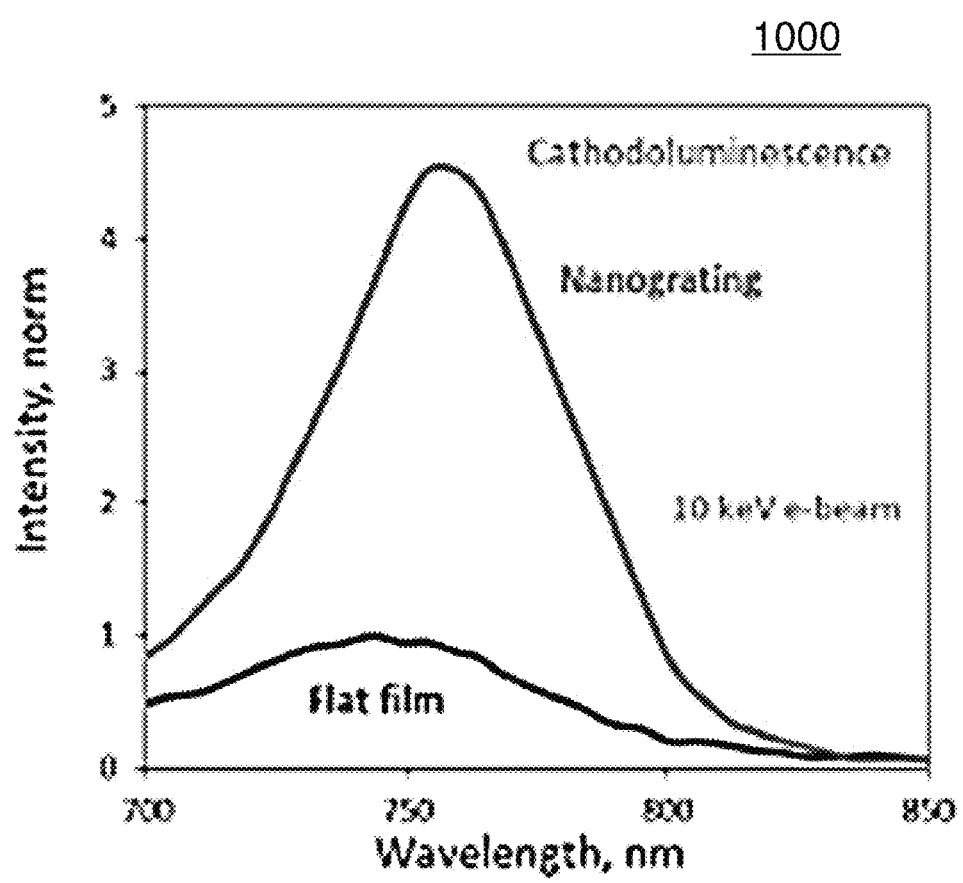
FIG. 10 is a plot of normalized (norm) intensity (in arbitrary units or a.u.) as a function of wavelength (in nanometers or nm) showing cathodoluminescence emission of perovskite nanograting according to various embodiments.

Various embodiments may be configured to enhance luminescence. In addition to enhancement of photoluminescence, various embodiments may alternatively or additionally be configured to exhibit cathodoluminescence or scintillation enhancement. FIG. 10 is a plot 1000 of normalized (norm) intensity (in arbitrary units or a.u.) as a function of wavelength (in nanometers or nm) showing cathodoluminescence emission of perovskite nanograting according to various embodiments. The perovskite nanograting may have a 350 nm period. When excited with a 10 keV electron beam, the nanograting may exhibit an almost five-fold enhancement compared to an unstructured film, using unpolarised detection.

One of the perovskite compounds tested is $(EDBE)PbBr_4$. The $(EDBE)PbBr_4$ may exhibit a broadband (white) photoluminescence and therefore may be a suitable candidate to engineer tunability of the emitted light.

Figure 11A:
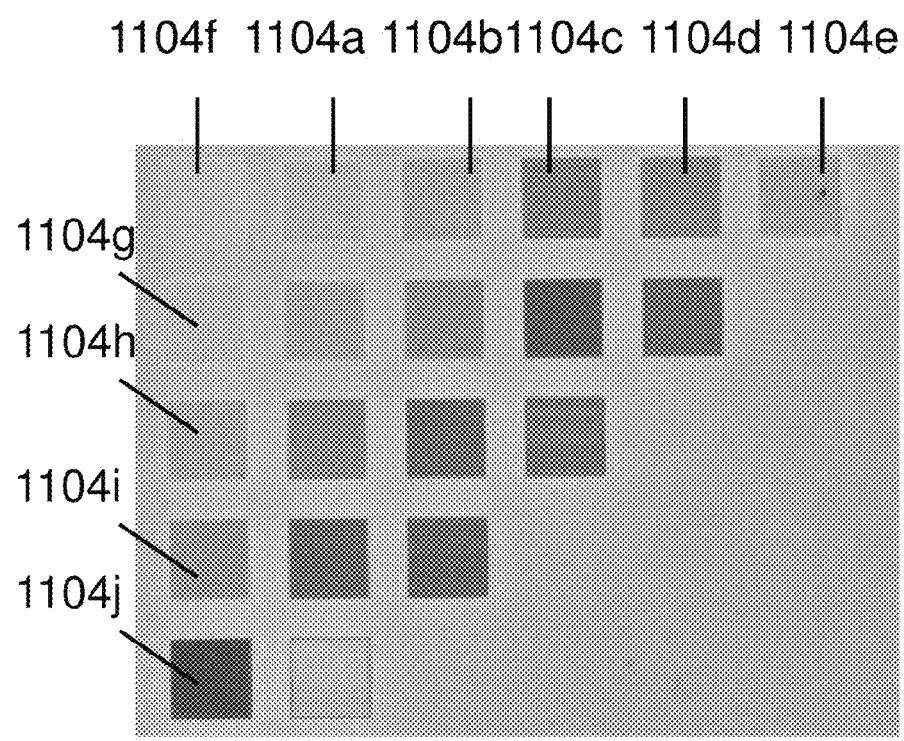
FIG. 11A is an optical image taken under the microscope of nanograting metamaterials carved on $(EDBE)PbBr_4$ on indium tin oxide (ITO)/glass substrate according to various embodiments.
Figure 11B:
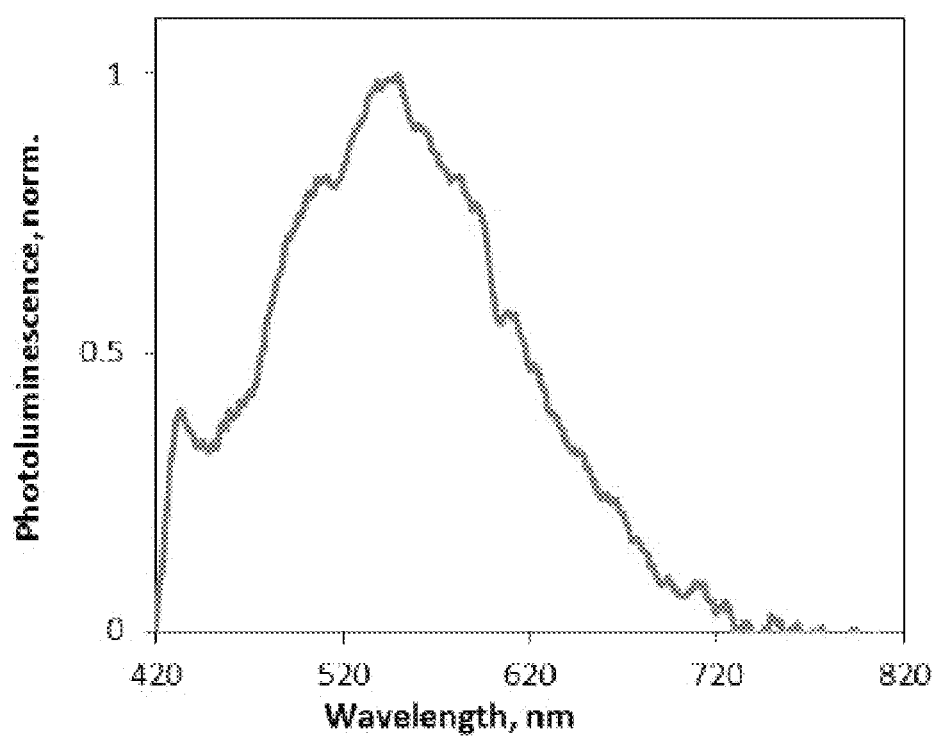
FIG. 11B is a plot of normalized (norm) luminescence (in arbitrary units or a.u.) as a function of wavelength (in nanometers or nm) showing broadband luminescence of the $(EDBE)PbBr_4$ unstructured film according to various embodiments.

FIG. 11A is an optical image 1100a taken under the microscope of nanograting metamaterials carved on (EDBE)$PbBr_4$ on indium tin oxide (ITO)/glass substrate according to various embodiments. FIG. 11B is a plot 1100b of normalized (norm) luminescence (in arbitrary units or a.u.) as a function of wavelength (in nanometers or nm) showing broadband luminescence of the (EDBE)$PbBr_4$ unstructured film according to various embodiments.

Figure 11C:
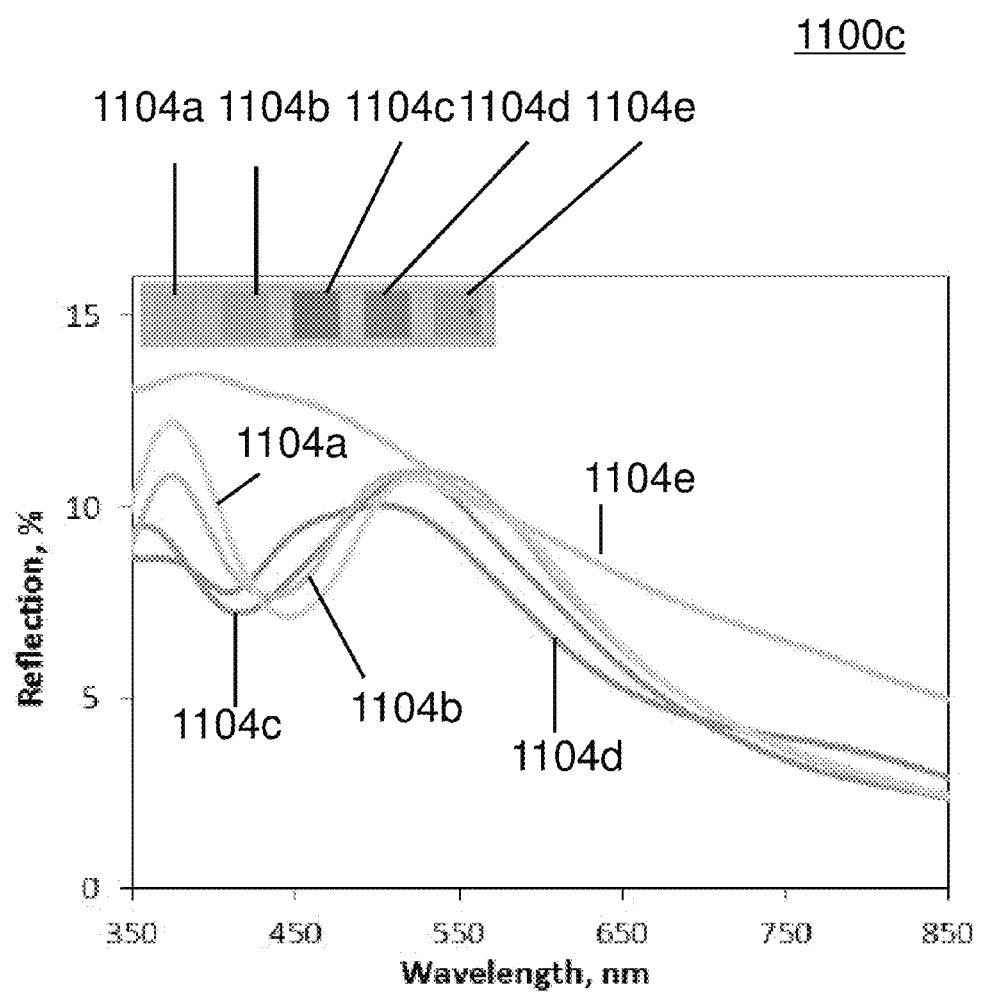
FIG. 11C is a plot of percentage reflection (in percent or %) as a function of wavelength (in nanometers or nm) showing the reflection spectra with tunable resonances for the $(EDBE)PbBr_4$ nanogratings according to various embodiments of the top horizontal line in the optical image of FIG. 11A.
Figure 11D:
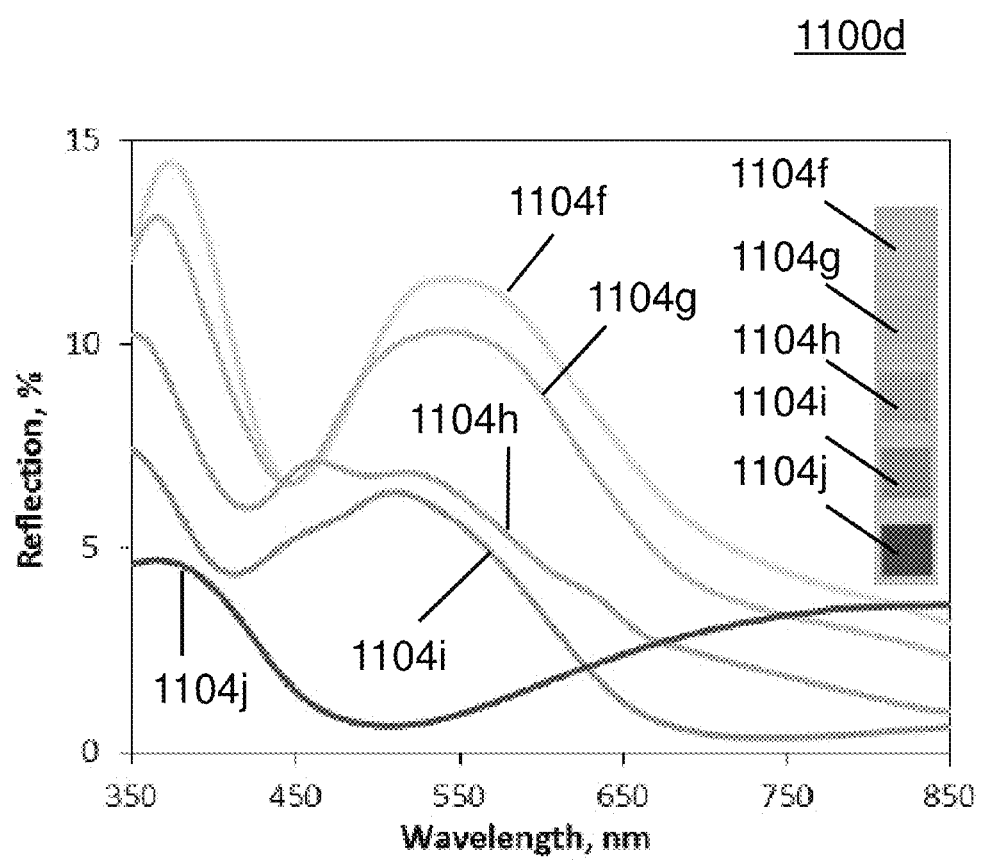
FIG. 11D is a plot of percentage reflection (in percent or %) as a function of wavelength (in nanometers or nm) showing the reflection spectra with tunable resonances for the $(EDBE)PbBr_4$ nanogratings according to various embodiments of the left-most vertical line in the optical image of FIG. 11A.

FIG. 11C is a plot 1100c of percentage reflection (in percent or %) as a function of wavelength (in nanometers or nm) showing the reflection spectra with tunable resonances for the (EDBE)$PbBr_4$ nanogratings according to various embodiments of the top horizontal line in the optical image 1100a of FIG. 11A. The reflection spectra of the various nanogratings 1104a-e are labelled. FIG. 11D is a plot 1100d of percentage reflection (in percent or %) as a function of wavelength (in nanometers or nm) showing the reflection spectra with tunable resonances for the (EDBE)PbBr$_4$ nanogratings according to various embodiments of the leftmost vertical line in the optical image 1100a of FIG. 11A. The reflection spectra of the various nanogratings 1104f-j are labelled.

Various embodiments may involve various lithographic techniques that can yield large area pattering maintaining the required nanometric feature size. Such techniques may be employed widely in industrial settings. Various embodiments may include or involve nanoimprint lithography and/or electron beam/photo lithography. Specific processing recipes may need to be developed to take into account compatibility with perovskite materials.

Nanoimprint lithography (NIL) may involve or include the replication of nanopatterned mould by directly embossing the material which has to be nanostructured or indirect transfer of the pattern on a master mould via sacrificial layers. Commonly applied to thermoplastics, such technique may be transferrable to the nanopatterning of perovskite thin films.

Figure 12A:
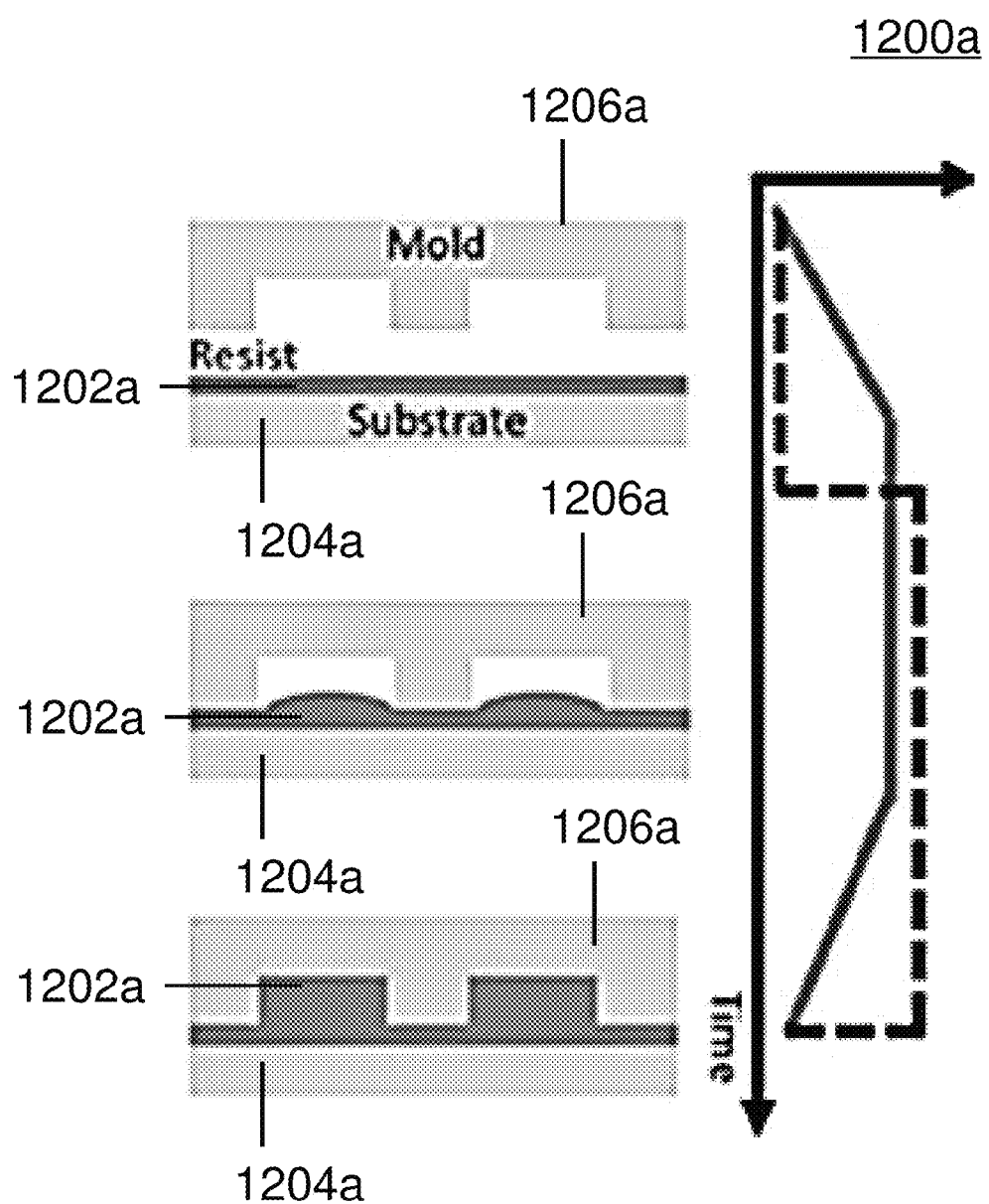
FIG. 12A shows an illustration of thermal nanoimprint lithography (T-NIL) which may be used to pattern halide perovskite structures according to various embodiments.
Figure 12B:
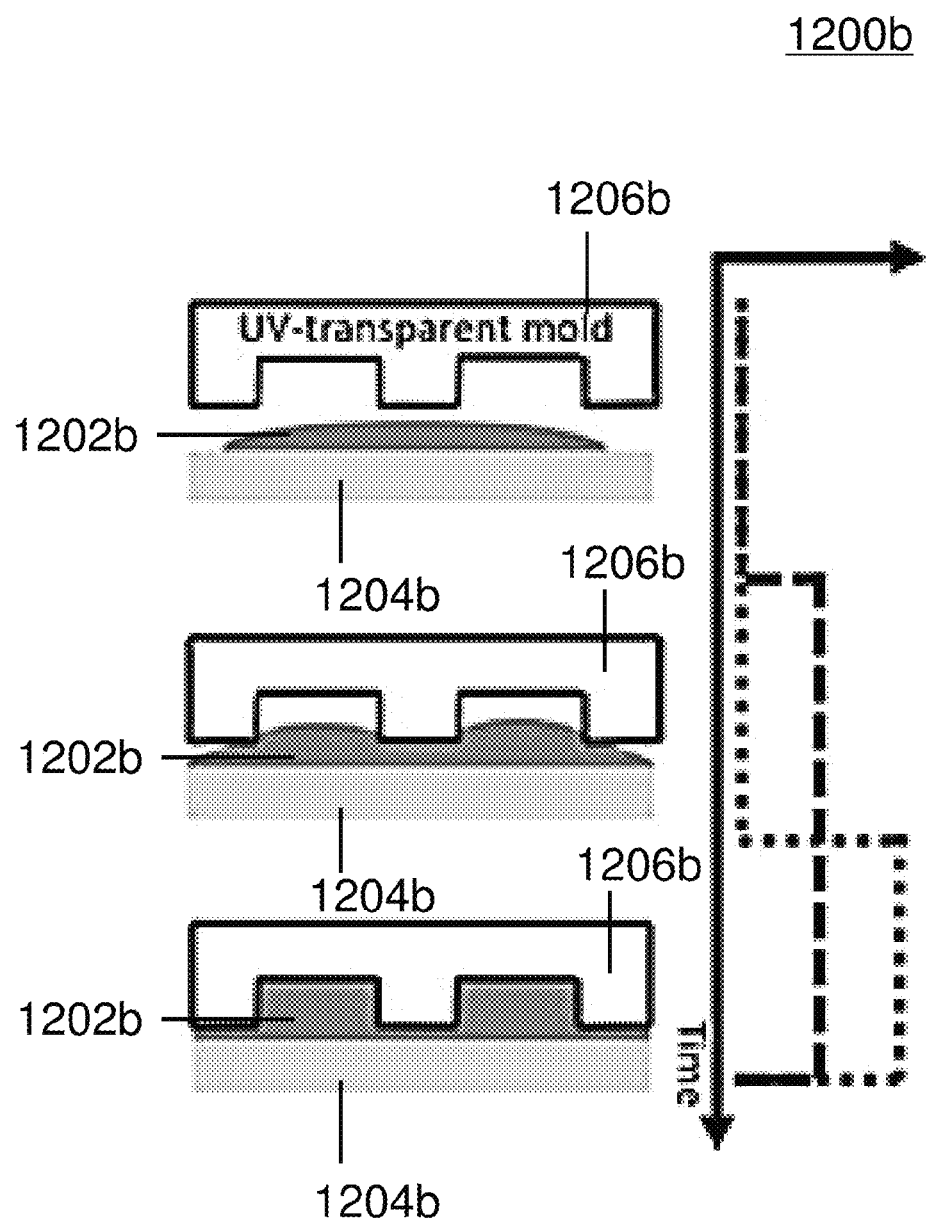
FIG. 12B shows an illustration of ultraviolet nanoimprint lithography (UV-NIL) which may be used to pattern halide perovskite structures according to various embodiments.
Figure 12C:
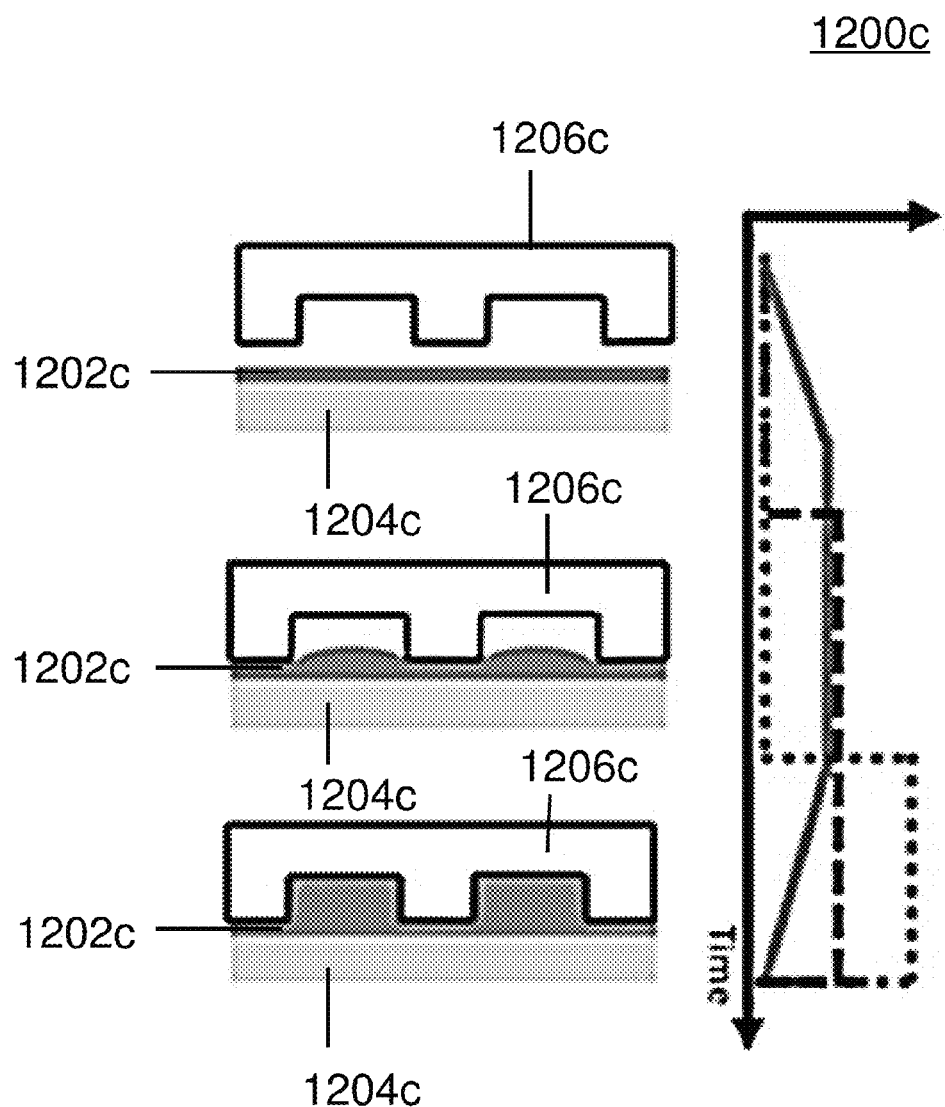
FIG. 12C shows an illustration of simultaneous thermal-ultraviolet nanoimprint lithography (STU-NIL) which may be used to pattern halide perovskite structures according to various embodiments.

FIGS. 12A-C illustrate several nanoimprint lithographic techniques (P. Lova et al., *Organic & Hybrid Photonic Crystals*, D. Comoretto (Ed.), 2015, Springer (ISBN 978-3-319-16579-0, pp. 187-212, DOI: 10.1007/978-3-319-16580-6_9) which may be used to pattern halide perovskite structures according to various embodiments. FIG. 12A shows an illustration 1200a of thermal nanoimprint lithography (T-NIL) which may be used to pattern halide perovskite structures according to various embodiments. FIG. 12B shows an illustration 1200b of ultraviolet nanoimprint lithography (UV-NIL) which may be used to pattern halide perovskite structures according to various embodiments. FIG. 12C shows an illustration 1200c of simultaneous thermal-ultraviolet nanoimprint lithography (STU-NIL) which may be used to pattern halide perovskite structures according to various embodiments. The plots on the side of FIGS. 12A-C represent the variation of temperature (solid continuous line), pressure (dashed line)), and/or ultraviolet intensity (dotted line) with time during the various nanoimprinting.

A film of resist 1202a-c may be deposited on a substrate 1204a-c. The resist 1202a-c may be heated above its glass transition temperature (Tg) in T-NIL, or softened via ultraviolet radiation in UV-NIL, or simultaneously softened using heat and ultraviolet radiation in STU-NIL.

A prepatterned mould 1206a-c may then press on the softened polymer 1202a-c. The polymer 1202a-c may flow within the mould features, thus allowing for pattern transfer. After cooling, the mould 1206a-c may be lifted up revealing the nanopatterned film 1202a-c.

Photolithography techniques may use light to impress a pattern onto a photoresist, while electron beam (e-beam) lithography may use free-electrons to impress a pattern onto e-beam resist. The photoresist or e-beam resist may be on or over a substrate. While photolithography may make use of a mask to transfer the pattern, e-beam lithography may be a maskless process. A series of chemical treatments may be necessary to engrave the exposure pattern into the material underneath the resist and finally remove the resist. One issue is that it may be difficult to find a series of suitable orthogonal solvents to deposit and remove the resist as well as to etch the perovskite material underneath. Various embodiments may involve directly impressing the pattern onto an unstructured perovskite film to form a patterned perovskite structure, i.e. without the use of resists.

Figure 13:
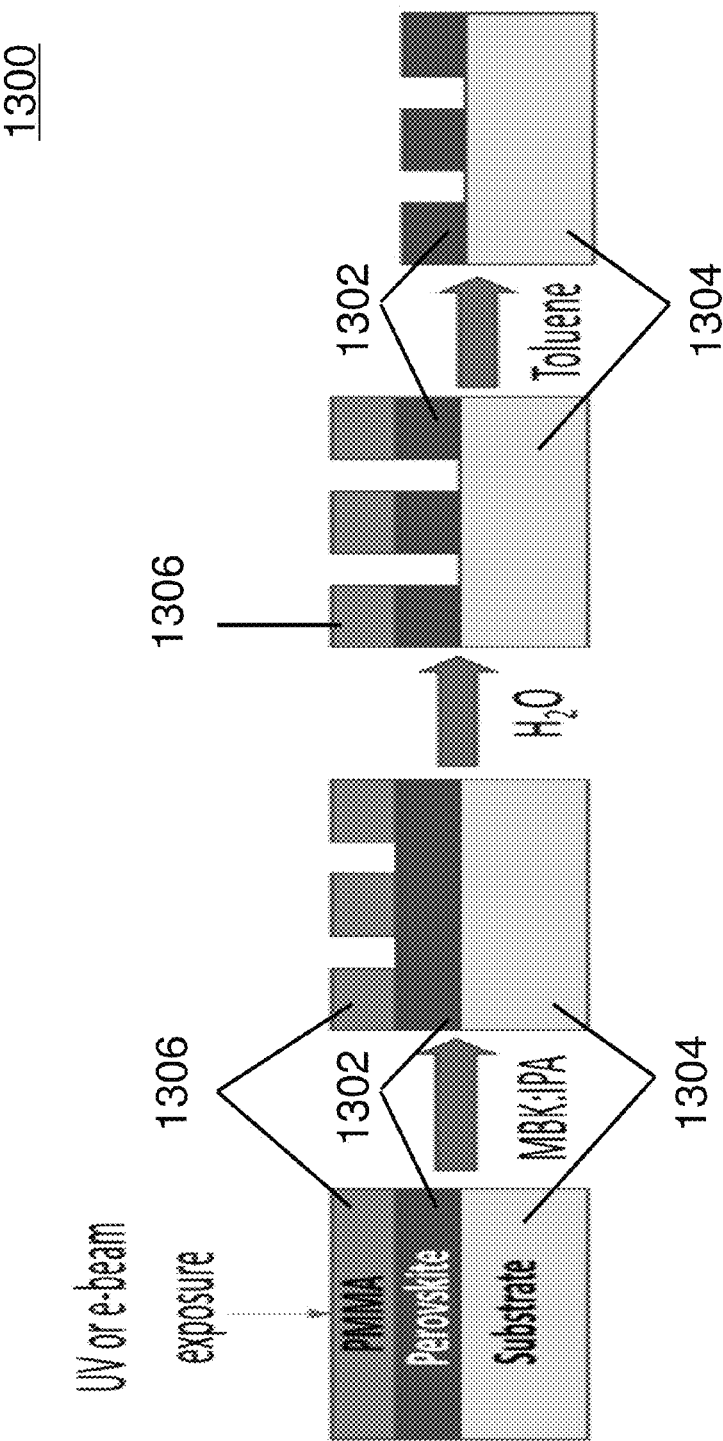
FIG. 13 is a schematic illustrating a method of forming a pattern on a halide perovskite structure according to various embodiments.

FIG. 13 is a schematic 1300 illustrating a method of forming a pattern on a halide perovskite structure 1302 according to various embodiments. FIG. 13 shows forming a continuous unpatterned halide perovskite layer or film 1302 on a substrate 1304. A resist 1306 may be formed on the halide perovskite layer or film 1302. In various embodiments, poly(methyl methacrylate) (PMMA) may be used as the resist 1306. A solution of PMMA dissolved in toluene may be deposited on the halide perovskite layer or film 1302 to form the resist.

After UV or e-beam exposure, the resist 1306 may be patterned by developing with a solvent mixture of methyl butyl ketone (MBK) and isopropyl alcohol (IPA) in a ratio of 1:3. Portions of the underlying halide perovskite layer or film 1302 may be covered by the patterned resist 1306, while other portions of the halide perovskite layer or film 1302 may be exposed. The resist 1306 may serve as a mask for the underlying halide perovskite layer or film 1302.

The exposed portions of the perovskite layer or film 1302 may then be etched using water (H$_2$O). The patterned resist 1036 may be removed using toluene to form the patterned halide perovskite structure 1302 on the substrate 1304.

Other methods of forming patterns on halide perovskite structures may include microcontact printing, nanoembossing, focused ion beam milling and/or reactive etching.

Various embodiments may relate to all-dielectric, solution-processed perovskite metasurfaces, with structural color and radiative emission properties tunable on demand. Patterned perovskite structures such as nanogratings and nanoslits may be simple, versatile structures to engineer Mie optical resonances and dramatically change light absorption and emission in perovskite subwavelength films.

The perovskite metasurfaces may be formed or produced over large areas through structuring techniques such as nanoimprint lithography, microcontact printing, and/or nanoembossing. The perovskite metasurfaces may be formed or produced via self-assembly.

These low-cost mass manufacturing alternatives to ion beam milling and reactive etching techniques, may minimize process related degradation and contamination in the active perovskite layer during patterning, which may ensure long-term stability of the fabricated structures.

Moreover, the advancement of synthetic strategies may provide new ways to achieve long-term stability, like in recent 2D perovskites with Ruddlesden-Popper Phases. This may open up several opportunities for light management in large-area metal-organic perovskite devices.

For instance, the tunability of the vibrant structural color demonstrated across the entire visible palette may be used to increase the power conversion efficiency of broadband solar cells or vary the appearance of semitransparent, building integrated photovoltaics.

Purcell enhancement of photo-/electroluminescence may be exploited to improve the efficiency of large-area hybrid perovskite LEDs. Purcell enhancement may also be extended to the emerging class of white light-emitting perovskite compounds (e.g., EDBEPbX$_4$, where X=Cl, Br) to realize full-color active displays with a single emissive material.

Dielectric metasurfaces may offer the possibility to design mode confinement and polarization dependence of the optical response, which may be exploited to further optimize light absorption in solar cells and improve light extraction and directivity of light-emitting devices and displays.

Figure 14A:
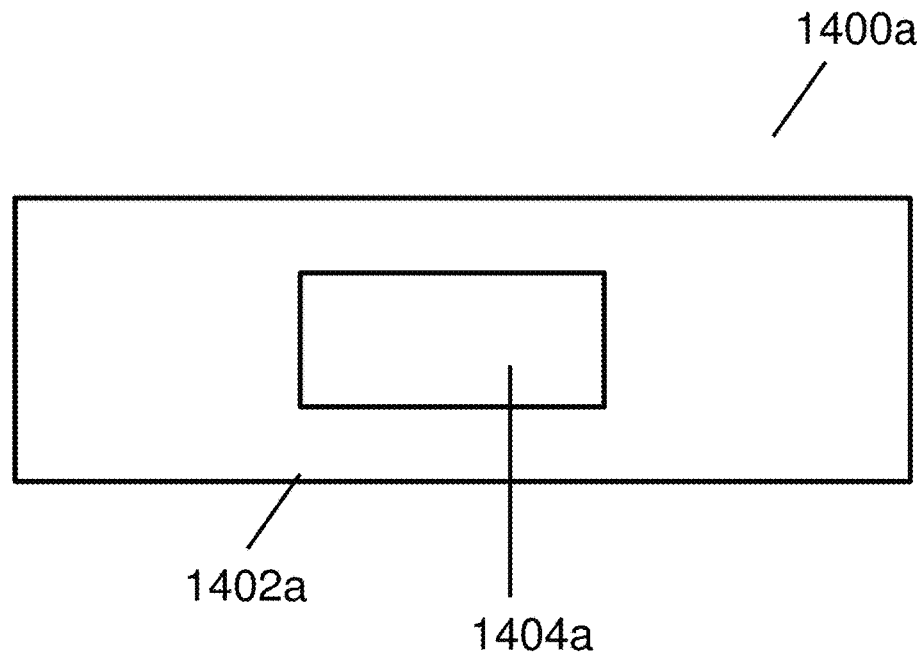
FIG. 14A illustrates a device according to various embodiments.
Figure 14B:
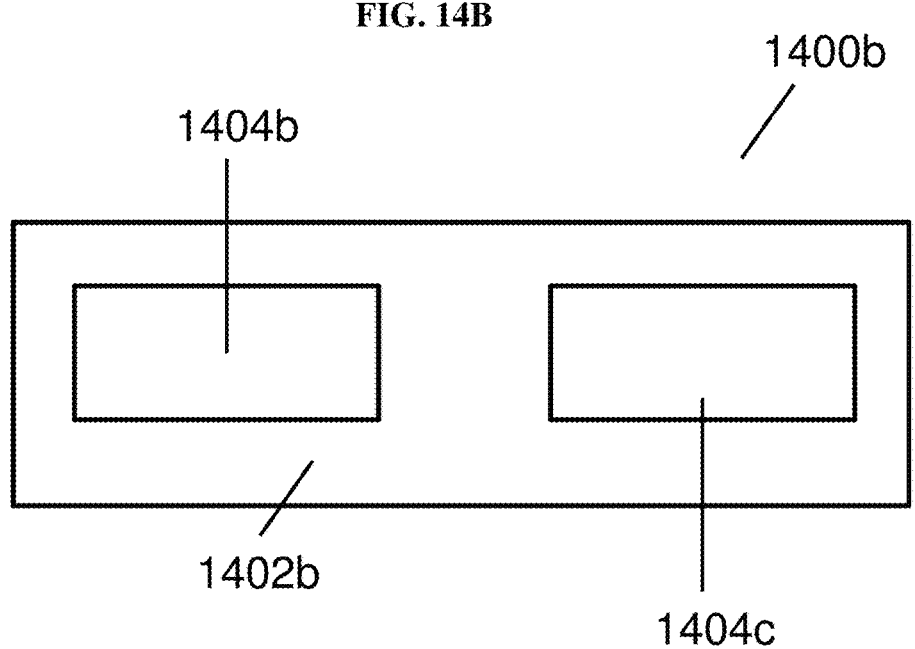
FIG. 14B illustrates a device according to various other embodiments.

FIG. 14A illustrates a device 1400a according to various embodiments. The device 1400a may include a halide perovskite structure 1402a including a pattern 1404a. FIG. 14B illustrates a device 1400b according to various other embodiments. The device 1400b may include a halide perovskite structure 1402b including a first pattern 1404b and a second pattern 1404c different from the first pattern 1404b. The device 1400a and/or the device 1400b may include one or more further additional patterns. The halide perovskite structure 1402a and/or the halide perovskite structure 1402b may include a halide perovskite material. The one or more further additional patterns may be the same as or may be different from the first pattern 1404a and/or the second pattern 1404b. The one or more further additional patterns may be configured to provide optical light(s) of the same colour as first pattern 1404a and/or the second pattern 1404b, or may be configured to provide optical lights(s) of a different colour from the first pattern 1404a and/or the second pattern 1404b.

In various embodiments, the device 1400a may be configured to provide an optical light of a predetermined wavelength, e.g. of a predetermined colour. The patterned halide perovskite structure 1402a, i.e. the halide perovskite structure 1402a including the pattern 1404a, may be configured to provide the optical light when energy is provided to the halide perovskite structure 1402a, such as when a (source) light is incident on the pattern 1404a, or when electrical energy is provided to the patterned halide perovskite structure 1402a. The predetermined wavelength may be dependent on one or more parameters of the pattern 1404a, such as a period or spacing between neighboring nanostructures of the pattern 1404a, or a depth of the nanostructures.

Similarly, the device 1400b may be configured to provide a first optical light of a first wavelength and a second optical light of a second wavelength. The patterned halide perovskite structure 1402b, i.e. the halide perovskite structure 1402b including the first pattern 1404b and the second pattern 1404c, may be configured so that the first pattern 1404b is configured to provide the first optical light of the first wavelength and the second pattern 1404c is configured to provide the second optical light of the second wavelength when energy is provided to the halide perovskite structure 1402a, such as when a (source) light is incident on the first pattern 1404b and the second pattern 1404c, or when electrical energy is provided to the patterned halide perovskite structure 1402b. The first wavelength may be dependent on one or more parameters of the first pattern 1404b, such as a period or spacing between neighboring nanostructures of the first pattern 1404b, or a depth of the nanostructures. The second wavelength may be dependent on one or more parameters of the second pattern 1404c, such as a period or spacing between neighboring nanostructures of the second pattern 1404c, or a depth of the nanostructures.

Providing the optical light of a predetermined wavelength as described herein may include providing optical light of a predetermined range of wavelengths. For instance, the first optical light may be of a first predetermined range of wavelengths, and the second optical light may be of a second predetermined range of wavelengths. The source light may be of a single wavelength or a range of wavelengths. When the halide perovskite structure is configured to reflect the source light to provide the optical light(s), the source light may be or may include an entire visible spectrum. When the halide perovskite structure is configured to absorb the source light and emit the optical light(s), one wavelength may be used to excite the halide perovskite structure, and the optical light(s) emitted by the halide perovskite structure may each be of a predetermined range of wavelengths.

In other words, the device 1400a, 1400b may include a patterned halide perovskite structure 1402a, 1402b configured to emit or radiate a certain wavelength or a certain range of wavelengths upon the halide perovskite structure 1402a, 1402b being pumped by a pump source, such as a source light or an electrical source. In various embodiments, the device 1400a, 1400b may be configured to provide luminescence such as photoluminescence and/or electroluminescence.

When a source light is provided or directed to the halide perovskite structure 1402a, 1402b, the halide perovskite structure 1402a, 1402b or the patterns 1404a, 1404b and/or 1404c may be configured to absorb the source light, and further configured to radiate the respective optical lights. The absorption and radiation (or emission/reflection) may be carried out using Mie resonances. Reflection and absorption may be tuned by resonant effects.

The device 1400a, 1400b may thus be configured to emit one or more coloured optical lights when energy is provided to the halide perovskite structure 1402a, 1404b. The halide perovskite structure 1402a, 1402b or the patterns 1404a, 1404b and/or 1404c may be configured to emit one or more coloured optical lights when energy is provided to the halide perovskite structure 1402a, 1404b. Different patterns, e.g. with different depths and/or periods, may result in provision or radiation of optical light of different colours.

Tuning of a parameter of a pattern may affect the light absorption and radiation (or emission/reflection). Tuning of a parameter of a pattern may affect efficiency and/or directivity of absorption and radiation (or emission/reflection). In other words, tuning may affect in-coupling and out-coupling efficiency and/or directivity. In-coupling directivity may refer to the dependence of absorption on angle of incidence. Out-coupling directivity may refer to the spatial distribution of emitted intensity.

For the device 1400b, the pattern 1404b may be different from the pattern 1404c.

In various embodiments, for the device 1400b, an emission rate of the first optical light may be different from an emission rate of the second optical light. The emission rate of the first optical light may be different from the emission rate of the second optical light due to Purcell effect. A polarization response of the first pattern 1404a may be different from a polarization response of the second pattern 1404b.

In various embodiments, light absorption may be enhanced by the Purcell effect. The efficiency for absorption/emission of a single colour may be higher than from simple colour filtering.

For the device 1400a, the pattern 1404a may include a plurality of nanostructures such as nano-slits, nano-bars, nano-grooves, nano-circles, nano-squares, nano-triangles, nano-rings (e.g. split-rings or asymmetrical split-rings, or any other shapes, or any combination thereof. The pattern 1404a may be a periodic pattern or a non-periodic pattern. A periodic pattern may have a uniform period (i.e. with equal or uniform spacings between neighbouring nanostructures throughout the pattern).

For the device 1400b, the first pattern 1404b may include a plurality of nano-slits, nano-bars, nano-grooves, nano-circles, nano-squares, nano-triangles, nano-rings (e.g. split-rings or asymmetrical split-rings, or any other shapes, or any combination thereof. The second pattern 1404c may include a plurality of nano-slits, nano-bars, nano-grooves, nano-circles, nano-squares, nano-triangles, nano-rings (e.g. split-rings or asymmetrical split-rings, or any other shapes, or any combination thereof. The first pattern 1404b may be a periodic pattern or a non-periodic pattern. The second pattern 1404c may be a periodic pattern or a non-periodic pattern. The period of the first pattern 1404b may be different from the period of the second pattern 1404c.

Additionally or alternatively, a depth of the first pattern 1404b may be different from a depth of the second pattern 1404c. Additionally or alternatively, an orientation of the first pattern 1404b may be different from an orientation of the second pattern 1404c.

In various embodiments, the period of the second pattern 1404c may be greater than the period of the first pattern 1404b. The second wavelength may be greater than the first wavelength. In other words, there may be red-shifting in the wavelength emitted or provided by the pattern when the period increases or when the neighbouring nanostructures are spaced further apart.

In various embodiments, a depth of the second pattern 1404c may be greater than a depth of the first pattern 1404b. The second wavelength may be smaller than the first wavelength. In other words, there may be blue-shifting in the wavelength emitted or provided by the pattern when the depth increases.

The first optical light of the first wavelength may be of a first colour. The second optical light of the first wavelength may be of a second colour. In various embodiments, the first optical light may include a first range of wavelengths, and may include a first range of colours. The second optical light may include a second range of wavelengths, and may include a second range of colours. The first range of wavelengths may or may not overlap with the second range of wavelengths.

In various embodiments, the halide perovskite material (of the first device 1400a or the second device 1400b) may be a multi-dimensional halide perovskite material. The halide perovskite material may be a two dimensional halide perovskite material or a three dimensional halide perovskite material. Alternatively, the halide perovskite material may be a one dimensional halide perovskite material or a zero dimensional halide perovskite material. Zero dimensional, one dimensional, or two dimensional halide perovskite materials may generally be referred to as low dimensional halide perovskite materials. The halide perovskite material may be a layered perovskite of the Ruddlesden-Popper phase. In various embodiments, the halide perovskite material may be a mixed halide perovskite material, such as a halide perovskite material including two-dimensional halide perovskite(s) and three-dimensional halide perovskite(s).

A three-dimensional halide perovskite material may be represented by general formula $AMX_3$, where A is a monopositive organic or inorganic ion, M is a divalent metal cation, and X is a halide (anion). The inorganic ion may be an alkali metal ion, such as Li+, Na$^+$, K$^+$, Rb$^+$ or Cs$^+$. The divalent metal cation may be a cation of a Group IV element (such as Ge$^{2+}$, Sn$^{2+}$ or Pb$^{2+}$), a cation of a transition metal or a cation of a rare earth metal. The halide (anion) may be F$^-$, Cl$^-$, Br$^-$ or I$^-$.

In various embodiments, a low dimensional perovskite material may be any one of a series of <100> oriented perovskite materials, and may be represented by the general formula $B_2A_{n-1}M_nX_{3n+1}$, where A is an organic or inorganic ion, M is a cation, X is a halide (anion), n may be any natural number, and B is a bulky cation compared to the size of the cubooctahedral cavities of the perovskite material.

In various other embodiments, a low dimensional perovskite material may be any one of a series of <110>-oriented perovskite materials, and may be represented by the general formula $B_2A_mM_mX_{3m+2}$, where A is an organic or inorganic ion, M is a cation, X is a halide (anion), m may be any natural number, and B is a bulky cation compared to the size of the cubooctahedral cavities of the perovskite material.

In yet various other embodiments, a low dimensional perovskite material may be any one of a series of <111>-oriented perovskite materials, and may be represented by the general formula $B_2A_{q-1}M_qX_{3q+3}$, wherein A is an organic or inorganic ion, M is a trivalent metal cation, X is a halide (anion), q may be any natural number, and B may be a bulky cation compared to the size of the cubooctahedral cavities of the perovskite material.

In general, the halide perovskite material may be any suitable halide perovskite material. The halide perovskite material may be any halide perovskite material described in D. B. Mitzi et al., J. Chem. Soc., Dalton Trans., 2001, 1-12, which is incorporated herein.

The device 1400a, 1400b may further include a further layer in contact with a surface of the halide perovskite structure 1402a, 1402b including the pattern 1404a, or the first pattern 1404b and the second pattern 1404c. The further layer may include a suitable metal or a suitable dielectric. The device 1400a, 1400b may further include a substrate such that the halide perovskite structure 1402a, 1402b is over the substrate.

The device 1400a, 1400b may further include a transparent conducting layer (including e.g. ITO) and a charge injection layer (including e.g. PEDOT) between the substrate and the halide perovskite structure 1402a, 1402b.

In various embodiments, the pattern 1404a, or the first pattern 1404b and the second pattern 1404c, may be formed by focused ion beam milling, nanoimprint lithography (e.g. thermal nanoimprint lithography, ultraviolet nanoimprint lithography or simultaneous thermal-ultraviolet nanoimprint lithography), optical lithography, self-assembly, interference lithography, stencil lithography, direct inject printing, or electron beam lithography. Other methods of forming patterns on halide perovskite structures may include microcontact printing, nanoembossing, and/or reactive etching.

The device 1400a, 1400b may be a light emitting diode, or a light emitting field effect transistor, or a scintillator.

In various embodiments, the two or more different patterns of a device may form structured pixels. The multiple pixels may be used simultaneously to achieve red-green-blue (RGB) displays on a single layer, with potentially higher efficiency than polarization or colour filtering, and/or lower production costs.

In various other embodiments, the device 1400a may be configured to generate electrical energy when an optical light is provided to the device 1400a including the patterned halide perovskite structure 1402a, i.e. the halide perovskite structure 1402a including the pattern 1404a. In various other embodiments, the device 1400b may be configured to generate electrical energy when an optical light is provided to the device 1400b including the patterned halide perovskite structure 1402b, i.e. the halide perovskite structure 1402b including the first pattern 1404b and the second pattern 1404c.

The device 1400a, 1400b may be a solar cell, or a phototransistor, or a photoswitch, or a photodetector. The device 1400a, 1400b may also include a first electrode and a second electrode in contact with the halide perovskite structure 1402a, 1402b.

By tuning reflection and absorption through varying a parameter of the pattern(s), the desired power conversion efficiency (absorption, mobility etc.), transparency and/or colour may be achieved. Various embodiments may be integrated with photovoltaics to achieve these objectives.

Multiple structures may be used simultaneously to optimize solar cell efficiency and appearance. Various embodiments may relate to semi-transparent and tandem photovoltaic cells (to match appearance or bandgap requirements of top cells). Various embodiments may relate to specific colour-blind photodetectors to reduce noise (similar to filtering, but with resonant enhancement of absorption).

Figure 15A:
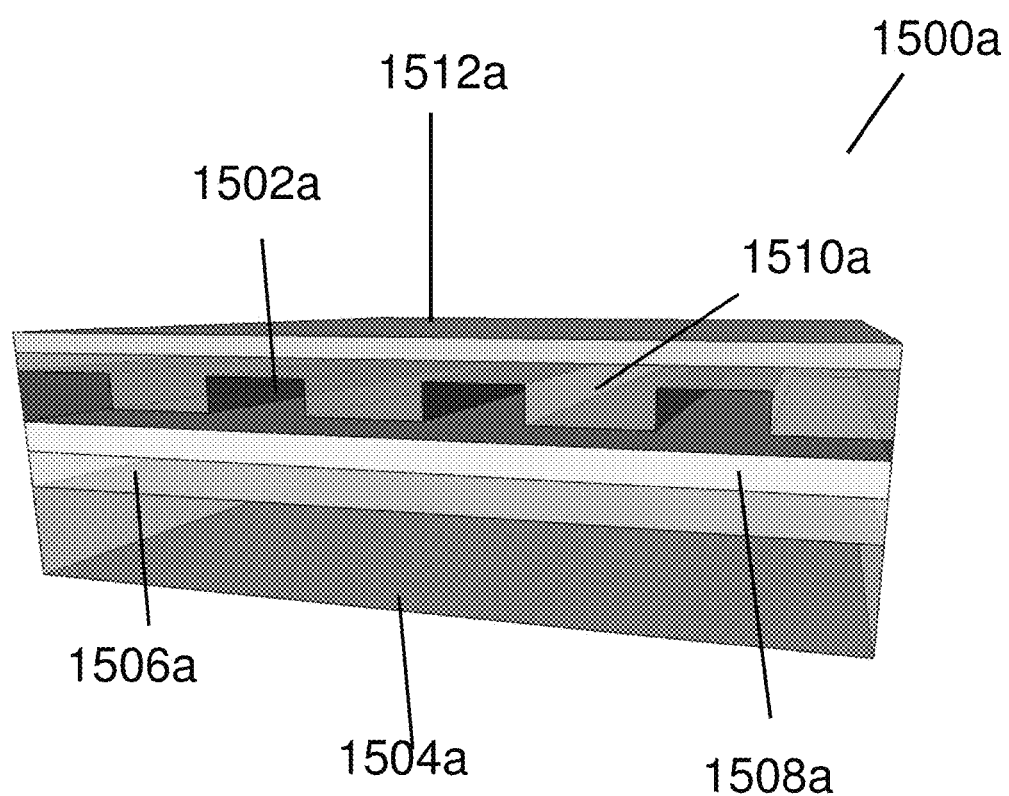
FIG. 15A shows a device according to various embodiments.

FIG. 15A shows a device 1500a according to various embodiments. The device 1500a may be a solar cell or a light emitting diode. The device 1500a may include a halide perovskite structure 1502a. The halide perovskite structure 1502a may include one, two or more patterns. The device 1500a may include a substrate 1504a, a conductive oxide layer 1506a (including a conductive oxide such as ITO) on the substrate 1504a, and an electron transporting layer 1508a (including an electron transporting material such as titanium oxide or $TiO_2$) on the conductive oxide layer 1506a. The patterned halide perovskite structure 1502a may be on the electron transporting layer 1508a. The device 1500a may also include a hole transporting layer 1510a (including a hole transporting material such as spiro-MeOTAD ($N^2,N^2,N^{2'},N2',N^7,N^7,N^{7'},N^{7'}$-octakis(4-methoxyphenyl)-9,9'-spirobi[9H-fluorene]-2,2',7,7'-tetramine)) on the patterned halide perovskite structure 1502a. The device 1500a may additionally include an electrode 1512a on the hole transporting layer 1510a. The electrode 1512a may include a suitable metal such as gold.

The electron transporting layer 1508a and the hole transporting layer 1510a may be interchangeable. In various embodiments, the patterned halide perovskite structure 1502a may be on the hole transporting layer 1510a, and the electron transporting layer 1508a may be on the patterned halide perovskite structure 1502a.

The surface of the halide perovskite structure 1502a having the one, two or more patterns may be in contact with the hole transporting layer 1510a (as shown in FIG. 15A), or may be in contact with the electron transporting layer 1508a.

Figure 15B:
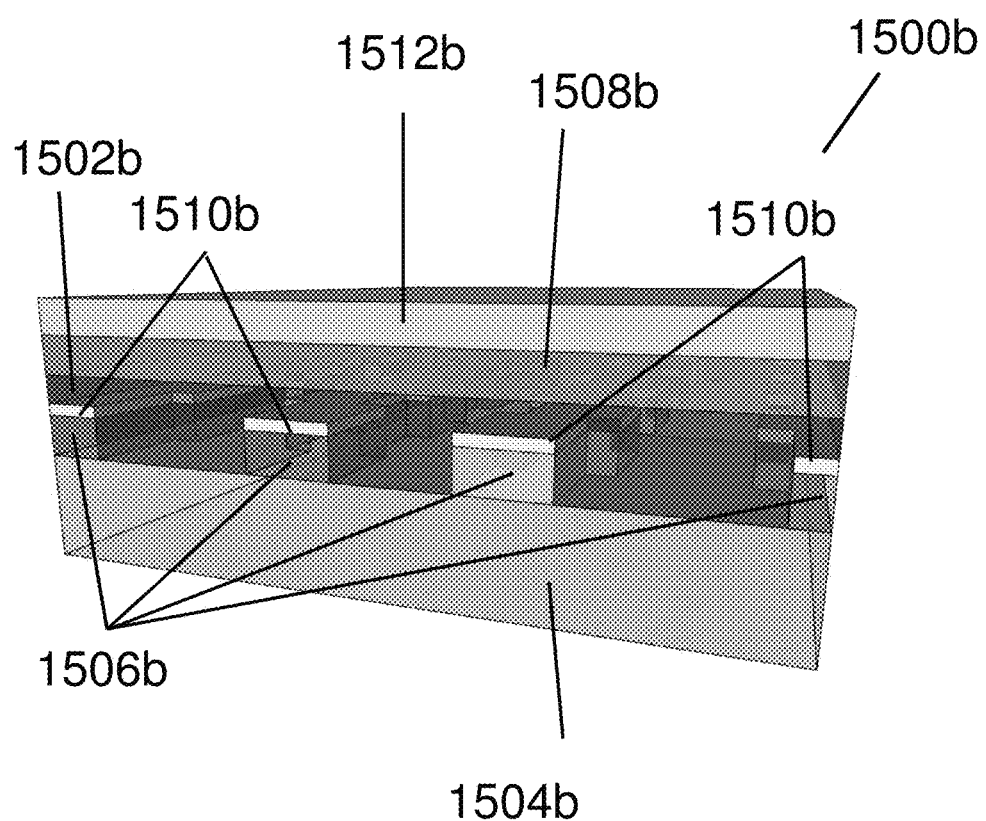
FIG. 15B shows a device according to various embodiments.

FIG. 15B shows a device 1500b according to various embodiments. The device 1500b may be a solar cell or a light emitting diode. The device 1500b may include a halide perovskite structure 1502b. The halide perovskite structure 1502b may include one, two or more patterns. The device 1500b may include a substrate 1504b, a conductive oxide layer 1506b (including a conductive oxide such as ITO) on the substrate 1504b, and a hole transporting layer 1510b (including a hole transporting material such as poly(3,4-ethylenedioxythiophene) polystyrene sulfonate or PEDOT:PSS) on the conductive oxide layer 1506b. The conductive oxide layer 1506b may be patterned which may allow electrical connectivity and optical resonance to be achieved simultaneously. The conductive oxide layer 1506b and the hole transporting layer 1510b may be patterned so that a portion of the halide perovskite structure 1502b is in contact with the substrate 1504b. The device 1500b may also include an electron transporting layer 1508b (including an electron transporting material such as phenyl-C61-butyric acid methyl ester or PCBM) on the halide perovskite structure 1502b, and an electrode 1512b on the electron transporting layer 1508b. The electrode 1512b may include a suitable metal such as silver.

The electron transporting layer 1508b and the hole transporting layer 1510b may be interchangeable. The halide perovskite structure 1502b may be on the electron transporting layer 1508b, and the hole transporting layer 1510b may be on the halide perovskite structure 1502b.

Figure 16:
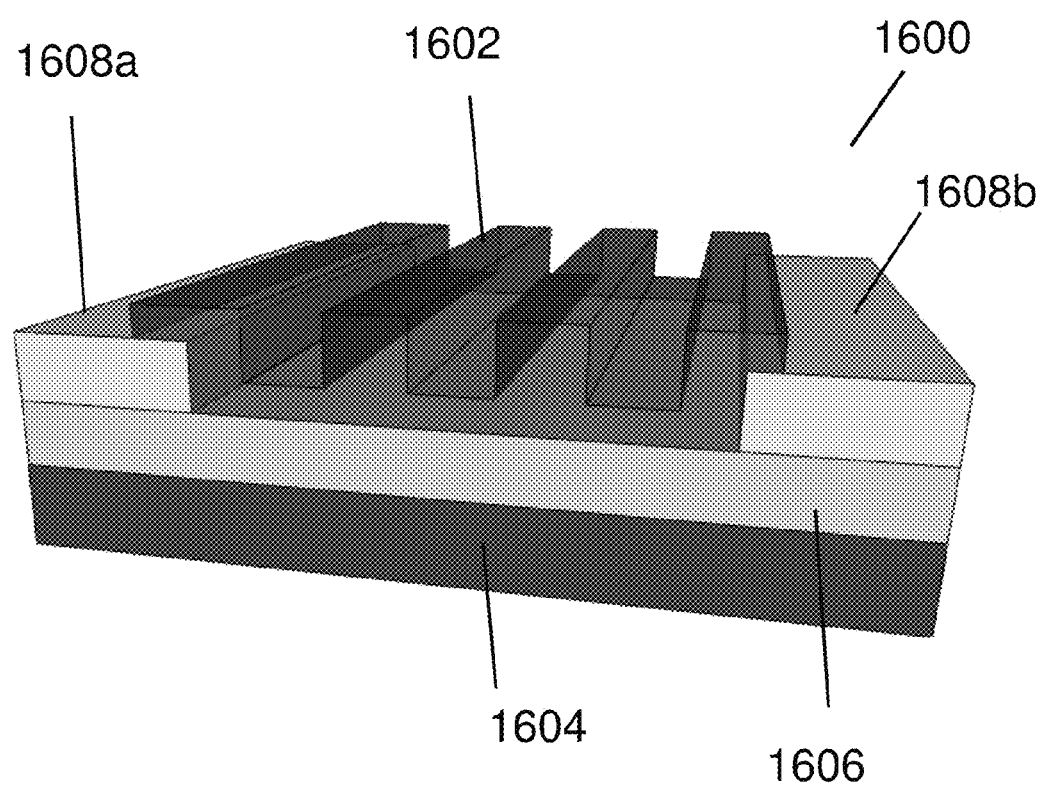
FIG. 16 shows another device according to various embodiments. The device may be a three terminal device such as a light emitting field effect transistor (FET) or a phototransistor.

FIG. 16 shows another device 1600 according to various embodiments. The device 1600 may be a three terminal device such as a light emitting field effect transistor (FET) or a phototransistor.

The device 1600 may include a substrate 1604, which may include doped silicon such as p-type silicon. The substrate 1604 may act as a gate during operation. The device 1600 may also include a dielectric layer 1606 (including a dielectric material such as silicon oxide or $SiO_2$) on the substrate 1604, and a patterned halide perovskite structure 1602 on the dielectric layer 1606. The patterned halide perovskite structure 1602 may include one, two or more patterns. The device 1600 may further include a first electrode 1608a on a first lateral side of the patterned halide perovskite structure 1602, and a second electrode 1608b on the second lateral side of the patterned halide perovskite structure 1602 opposite the first lateral side. The first electrode 1608a and the second electrode 1608b may be on the dielectric layer 1606 and may be in contact with the patterned halide perovskite structure 1602. In various embodiments, the first electrode 1608a may be the source electrode and the second electrode 1608b may be the drain electrode. In various other embodiments, the first electrode 1608a may be the drain electrode and the second electrode 1608b may be the source electrode.

In various embodiments, the substrate 1604 may be patterned to form a patterned back gate. In various embodiments, the dielectric layer 1606 may be transparent or semitransparent. The dielectric layer 1606 may include a transparent or semitransparent material.

In various embodiments, a device such as a photodetector may be provided. The device may include a substrate such as glass, a patterned halide perovskite structure on the substrate, and two electrodes on the substrate and in contact with lateral sides of the patterned halide perovskite structure. The electrodes may include a metal such as gold.

In various embodiments, a device such as scintillator may include a patterned halide perovskite structure, such as a patterned perovskite film or crystal. The patterned halide perovskite structure may be configured to absorb X-rays and re-emit low-energy photons (e.g. visible). A conventional (e.g. APD) photodetector may be provided to collect the down-converted photons. The scintillator may be configured to enhance the X-ray induced luminescence yield by structuring (i.e. via Purcell enhancement). The scintillator may be tuned so that the emission wavelength of the structured perovskite luminescence matches the maximum responsivity of the photodetector (e.g. the conventional APD operating at visible or near-IR wavelength). The scintillator may not include or require electrodes or contacts.

In various embodiments, the halide perovskite structure may be a structured bulk halide perovskite crystal. In various embodiments, the halide perovskite structure may be a thin halide perovskite film.

In various embodiments, an optical system may be provided. The optical system may include a device as described herein for providing an optical light having a predetermined wavelength, or for providing a first optical light of a first wavelength and a second optical light of a second wavelength.

For instance, the device may include a halide perovskite structure including a pattern configured to provide the optical light having a predetermined wavelength, upon a (source) light incident on the pattern.

Alternatively, the device may include a halide perovskite structure including a first pattern and a second pattern different from the first pattern, so that the first pattern is configured to provide the first optical light of the first wavelength and the second pattern is configured to provide the second optical light of a second wave length different from the first wavelength, upon a (source) light incident on the first pattern and the second pattern.

The device may further include an optical source configured to emit the (source) light.

FIG. 17 is a schematic 1700 showing a method of forming a device for providing optical light according to various embodiments.

The method may include, in 1702, forming a pattern on a halide perovskite structure. The method may include forming the pattern on the halide perovskite structure so that the pattern is configured to provide an optical light of a predetermined wavelength upon a (source) light incident on the pattern, or upon electrical energy provided to the patterned halide perovskite structure. The predetermined wavelength of the optical light provided may be dependent on one or more parameters of the pattern formed.

The pattern may be formed by focused ion beam milling, nanoimprint lithography, optical lithography, and/or electron beam lithography. The pattern may additionally or alternatively be formed by microcontact printing, nanoembossing, self-assembly, interference lithography, stencil lithography, direct inject printing, and/or reactive etching.

FIG. 18 is a schematic 1800 showing a method of forming a device for providing a first optical light of a first wavelength and a second optical light of a second wavelength according to various embodiments. The method may include, in 1802, forming a first pattern and a second pattern on a halide perovskite structure, the second pattern different from the first pattern, so that the first pattern is configured to provide the first optical light of the first wavelength and the second pattern is configured to provide the second optical light of a second wave length different from the first wavelength, upon a light incident on the first pattern and the second pattern, or upon electrical energy provided to the patterned halide perovskite structure.

The first wavelength may be dependent on one or more parameters of the first pattern, and the second wavelength may be dependent on one or more parameters of the second pattern.

The first pattern and the second pattern may be formed by focused ion beam milling, nanoimprint lithography, optical lithography, and/or electron beam lithography. The first pattern and the second pattern may additionally or alternatively be formed by microcontact printing, nanoembossing, and/or reactive etching.

In various embodiments, a method of forming a device for providing electrical energy may be provided. The method may include forming a pattern on a halide perovskite structure so that an optical light incident on the pattern may provide electrical energy. The method may further include forming a first electrode and a second electrode in contact with the halide perovskite structure. The pattern may be formed by focused ion beam milling, nanoimprint lithography, optical lithography, and/or electron beam lithography.

Various embodiments may relate to a device formed by a method as described herein.

FIG. 19 is a schematic 1900 showing a method of operating a device according in various embodiments. The method may include, in 1902, directing a (source) light to a halide perovskite structure.

In various embodiments, the method may be a method of operating the device to provide optical light of a predetermined wavelength. In various embodiments, the method may include directing the (source) light to the halide perovskite structure, the halide perovskite structure comprising a pattern, so that the pattern provides the optical light of the predetermined wavelength.

In various embodiments, the method may be a method of operating the device to provide a first optical light of a first wavelength and a second optical light of a second wavelength. In various embodiments, the method may include directing the (source) light to the halide perovskite structure, the halide perovskite structure comprising a first pattern and a second pattern different from the first pattern, so that the first pattern provides the first optical light of the first wavelength and the second pattern provides the second optical light of a second wave length different from the first wavelength, upon the light incident on the first pattern and the second pattern.

The first optical light of the first wavelength may be of a first colour, and the second optical light of the second wavelength is of a second colour different from the first colour. A period of the first pattern is different from a period of the second pattern.

FIG. 20 is a schematic 2000 showing a method of providing a first optical light of a first wavelength and a second optical light of a second wavelength according to various embodiments. The method may include, in 2002, directing a (source) light to a first halide perovskite structure including a halide perovskite material, the first halide perovskite structure including a first pattern so that the first pattern provides the first optical light of the first wavelength upon the light incident on the first pattern. The method may further include, in 2004, directing the (source) light to a second halide perovskite structure including the halide perovskite material, the second halide perovskite structure including a second pattern different from the first pattern so that the second pattern provides the second optical light of a second wave length different from the first wavelength upon the light incident on the second pattern.

FIG. 21 is a schematic 2100 showing a method of operating a device according to various embodiments. The method may include in 2102, providing or supplying electrical energy to a halide perovskite structure. The halide perovskite structure may include one or more patterns. The one or more patterns may each provide an optical light of a predetermined wavelength when electrical energy is provided or supplied.

FIG. 22 is a schematic 2200 showing a method of operating a device according to various embodiments. The method may be a method of operating the device to provide or generate electrical energy, or to detect an optical light. The method may include, in 1902, directing an optical light to a halide perovskite structure. The optical light may be of a predetermined wavelength. The halide perovskite structure may include one or more patterns.

Electrical energy may be provided or generated by the device when the optical light is incident onto the device.

In various embodiments, the method may include determining the wavelength of optical light based on the electrical energy generated.

Experimental Section

Synthesis of Methylammonium Iodide (MAI):

hydroiodic acid (57% wt (percentage weight) in water, Sigma-Aldrich) was slowly dropped into a methylamine solution ($CH_3NH_2$, 40% in methanol, Tokyo Chemical Industry, Co., Ltd) in 1:1 molar ratio. After 2 h of reaction in an ice-cooled bath, the solvent was removed with a rotary evaporator. The resulting powder was dissolved in hot ethanol and recrystallized with diethylether (×6 times) for purification. The resulting MAI white powder was died in vacuum oven and stored under $N_2$.

Deposition of Perovskite Films and Characterization:

Methylammonium lead iodide $MAPbI_3$ was deposited by spin-coating using lead acetate trihydrate ($Pb(Ac)_2 \cdot 3H_2O$, 99.999%, Sigma-Aldrich) as inorganic precursor. Dimethylformamide (DMF) solutions with concentration 20% wt of $Pb(Ac)_2 \cdot 3H_2O$ and excess of MAI (3 equivalents) were prepared and left under magnetic stirring at 100° C. The mixed hot solution was spin-coated on glass substrate at 5000 rpm, 30 s. The resulting film was then annealed on hotplate at 100° C. for 10 minutes. X-ray diffraction characterization was performed on a BRUKER D8 ADVANCE with Bragg-Brentano geometry using Cu Kα radiation (α=1.54,056 Å), step increment of 0.02° and 1 s of acquisition time. The ultraviolet-visible-near infrared (UV-Vis-NIR) spectrophotometer (UV3600, Shimadzu) equipped with integrating sphere was used for optical characterization of the unstructured films.

Focused Ion Beam Milling:

Arrays of nano-slit and grating metasurfaces were patterned on a spin-coated perovskite film on a quartz substrate using a Helios 600 NanoLab Focused Ion beam (FIB). Currents used were ≤19 pA. The lateral dimension of each fabricated sample was 20×20 μm.

Optical Characterization

Ellipsometry:

The optical constants of the perovskite film and substrate were determined from spectroscopic ellipsometry measurements using a J. A. Woollam alpha-SE ellipsometer. Analysis and modeling of the ellipsometry data was done using the J. A. Woollam CompleteEASE software. The ellipsometry data were collected in the spectral range 400-800 nm, at three different angles (65°, 70°, and 75°). First, the optical constants of the quartz substrate were determined by performing ellipsometry measurements on it and modeling the data using a Cauchy dispersion formula. Subsequently, ellipsometry measurements were performed on the perovskite sample (200 nm thick $CH_3NH_3PbI_3$ film) deposited on the quartz substrate and its optical constants were determined by fitting the ellipsometry data using a B-spline model that describes the real and imaginary parts of optical constant as continuous functions of wavelength obeying the Kramers-Kronig relations. The optical constants of the perovskite film in literature were used as the starting point for the B-spline model.

Microspectrophotometry:

The normal-incidence reflection characteristics of the perovskite metasurfaces were quantified, for incident polarizations parallel and perpendicular to the grating and slit lines (TE and TM orientations, respectively), using a microspectrophotometer (Jasco MV2000), through an ×36 objective with a circular sampling aperture size of 15 μm×15 μm.

Photoluminescence:

Microphotoluminescence measurements were performed using free space excitation and collection through a visible-near infrared microscope objective (Olympus 80×, NA=0.90). The samples were excited with a ps-pulsed laser diode emitting at 640±5 nm wavelength with 10 MHz repetition rate, focused to a beam size of 2 μm. Luminescence was detected using a Peltier-cooled photomultiplier tube (Hamamatsu H7422 series) coupled to a grating spectrometer (Edinburgh Instruments F900 and Bentham TMS300). Time-resolved decay traces were acquired by a time-correlated single photon counting acquisition module (Edinburgh Instruments, TCC900) at selected wavelength of 760±5 nm.

Numerical Simulations

DFT simulations: The electronic structure and optical response calculations of tetragonal-phase $CH_3NH_3PbI_3$ were performed by the Perdew-Burke-Ernzerhof (PBE) generalized gradient approximation (GGA) using Quantum ESPRESSO (QE) package. The norm-conserving Troullier-Martins pseudopotentials including full-relativistic effect were used to describe electron-ion interactions with electronic orbitals of H ($1s^1$); N and C ($2s^2$, $2p^2$); I ($5s^2$, $5p^5$); and Pb ($5d^{10}$, $6s^2$, $6p^2$). Plane-wave basis set cutoffs of the wave functions and the augmented density was set to be 60 and 400 Ry, respectively, and the 6×6×6 was chosen for sampling the Brillouin zone of tetragonal-phase $CH_3NH_3PbI_3$. The atomic relaxation calculations were performed until the residual atomic forces were less than 0.05 eV/Å. Based on the electronic wavefunctions of ground state obtained from QE package, the optical transitions were calculated using the Bethe-Salpeter equations (BSE) with the YAMBO code. The imaginary part of the optical response was calculated by evaluating direct electronic transitions between occupied and higher-energy 80 unoccupied electronic states as obtained from $$\varepsilon'(\omega) \propto \sum_S |\sum_{cvk} A_{vck}^S \frac{\langle ck|p_i|vk \rangle}{\epsilon_{ck} - \epsilon_{vk}}| \delta(\Omega^S - \hbar\omega - \Gamma)$$

where $\langle ck|p_i|vk \rangle$ are the dipole matrix elements for electronic transitions from valence to conduction states. The real part can then be calculated via the Kramers-Kronig relation, $$\varepsilon'(\omega) = 1 + \frac{2}{\pi} P \int_0^\infty \frac{\varepsilon''(\omega')\omega' d\omega'}{\omega'^2 - \omega^2}.$$

Spin-orbital coupling interactions and the spinor wave functions were also included as input for the optical response calculations.

Comsol Simulations:

Field profiles (in Comsol MultiPhysics) assumes a lossless non-dispersive refractive index of 1.45 for the silica substrate, normally incident narrowband plane wave illumination and, by virtue of periodic boundary conditions and a grating pattern of infinite extent in the xy plane.

Finite Element Simulations:

Reflection spectra and field maps were generated by full-wave electromagnetic simulations using COMSOL Multiphysics. Experimental ellipsometric values were used to describe both the silica substrate and the perovskite film. The samples were described as infinitely extended by using periodic boundary conditions and illuminated at normal incidence. Within these simulations, the film thickness had to be varied to obtain a good fit to the data of different experimental sets, which may reflect the intrinsic variability of the perovskite films across the substrate, sample-to-sample variability of the thickness, or actual variation of the thickness induced by the ion milling process.

The emission spectra were simulated by placing an array of infinitesimally small dipoles within the perovskite film, with spectral distribution mimicking the steady-state PL spectrum of the flat perovskite film. The total emission power was determined by averaging individual dipole contributions at each wavelength, weighted by the simulated field intensity generated at the dipole position by the pump beam (λ=640 nm) to account for the absorption.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A device for providing a first optical light of a first wavelength and a second optical light of a second wavelength, the device comprising:
   a halide perovskite film comprising a first pattern and a second pattern on a surface on the halide perovskite film, the second pattern different from the first pattern, so that the first pattern is configured to provide the first optical light of the first wavelength and the second pattern is configured to provide the second optical light of a second wavelength different from the first wavelength, upon a light incident on the first pattern and the second pattern;
   wherein the first pattern is configured to provide the first optical light by absorbing the light to radiate the first optical light;
   wherein the second pattern is configured to provide the second optical light by absorbing the light to radiate the second optical light; and
   wherein the halide perovskite film comprises a halide perovskite material.

2. The device according to claim 1,
   wherein an emission rate of the first optical light is different from an emission rate of the second optical light.

3. The device according to claim 2,
   wherein the emission rate of the first optical light is different from the emission rate of the second optical light due to Purcell effect.

4. The device according to claim 2,
   wherein a polarization response of the first pattern is different from a polarization response of the second pattern.

5. The device according to claim 1,
   wherein the first pattern comprises a plurality of nano-slits, nano-bars, nano-grooves, nano-circles, nano-squares, nano-triangles, or nano-rings; and
   wherein the second pattern comprises a plurality of nano-slits, nano-bars, nano-grooves, nano-circles, nano-squares, nano-triangles, or nano-rings.

6. The device according to claim 1,
   wherein the first pattern is a periodic pattern; and
   wherein the second pattern is a periodic pattern.

7. The device according to claim 1,
   wherein the first pattern is a non-periodic pattern; and
   wherein the second pattern is a non-periodic pattern.

8. The device according to claim 1,
   wherein a period of the first pattern is different from a period of the second pattern.

9. The device according to claim 1,
   wherein a depth of the first pattern is different from a depth of the second pattern.

10. The device according to claim 6,
    wherein the period of the second pattern is greater than the period of the first pattern; and wherein the second wavelength is greater than the first wavelength.

11. The device according to claim 1,
    wherein the first optical light of the first wavelength is of a first colour; and
    wherein the second optical light of the second wavelength is of a second colour different from the first colour.

12. The device according to claim 1,
    wherein the halide perovskite material is a two dimensional halide perovskite material.

13. The device according to claim 1,
    wherein the halide perovskite material is a three dimensional halide perovskite material.

14. The device according to claim 6,
    wherein the three-dimensional halide perovskite material is represented by general formula AMX3, where A is a monopositive organic or inorganic ion, M is a divalent metal cation, and X is a halide.

15. The device according to claim 11,
    wherein the inorganic ion may be an alkali metal ion.

16. The device according to claim 11,
    wherein the divalent metal cation is a cation of a Group IV element, a cation of a transition metal or a cation of a rare earth metal.

17. The device according to claim 1, further comprising:
    a further layer in contact with a surface of the halide perovskite film comprising the first pattern and the second pattern.

18. The device according to claim 17,
    wherein the further layer comprises a suitable metal or a suitable dielectric.

19. The device according to claim 1, further comprising:
    a substrate such that the halide perovskite film is over the substrate.

20. The device according to claim 19, further comprising:
    a transparent conducting layer and a charge injection layer between the substrate and the halide perovskite film.

21. The device according to claim 1,
    wherein the first pattern and the second pattern are formed by focused ion beam milling, nanoimprint lithography, optical lithography, or electron beam lithography.

22. An optical system comprising:
    a device for providing a first optical light of a first wavelength and a second optical light of a second wavelength, the device comprising:
    a halide perovskite film comprising a first pattern and a second pattern on a surface of the film, the second pattern different from the first pattern, so that the first pattern is configured to provide the first optical light of the first wavelength and the second pattern is configured to provide the second optical light of a second wave length different from the first wavelength, upon a light incident on the first pattern and the second pattern; and
    an optical source configured to emit the light;
    wherein the first pattern is configured to provide the first optical light by absorbing the light to radiate the first optical light;
    wherein the second pattern is configured to provide the second optical light by absorbing the light to radiate the second optical light; and
    wherein the halide perovskite film comprises a halide perovskite material.

23. A method of forming a device for providing a first optical light of a first wavelength and a second optical light of a second wavelength, the method comprising:

forming a first pattern and a second pattern on a surface of a halide perovskite film, the second pattern different from the first pattern, so that the first pattern is configured to provide the first optical light of the first wavelength and the second pattern is configured to provide the second optical light of a second wave length different from the first wavelength, upon a light incident on the first pattern and the second pattern;

wherein the first pattern is configured to provide the first optical light by absorbing the light to radiate the first optical light;

wherein the second pattern is configured to provide the second optical light by absorbing the light to radiate the second optical light; and wherein the halide perovskite film comprises a halide perovskite material.

24. The method according to claim 23, wherein the first pattern and the second pattern are formed by focused ion beam milling, nanoimprint lithography, optical lithography, or electron beam lithography.

25. A method of operating a device to provide a first optical light of a first wavelength and a second optical light of a second wavelength, the method comprising:

directing a light to a halide perovskite film, the halide perovskite film comprising a first pattern and a second pattern on a surface of the halide perovskite film, the second pattern different from the first pattern, so that the first pattern provides the first optical light of the first wavelength and the second pattern provides the second optical light of a second wave length different from the first wavelength, upon the light incident on the first pattern and the second pattern;

wherein the first pattern is configured to provide the first optical light by absorbing the light to radiate the first optical light;

wherein the second pattern is configured to provide the second optical light by absorbing the light to radiate the second optical light; and wherein the halide perovskite film comprises a halide perovskite material.

26. The method according to claim 25, wherein the first optical light of the first wavelength is of a first colour; and wherein the second optical light of the second wavelength is of a second colour different from the first colour.

27. The method according to claim 25, wherein a period of the first pattern is different from a period of the second pattern.

* * * * *